US008412546B2

(12) United States Patent
Smith et al.

(10) Patent No.: US 8,412,546 B2
(45) Date of Patent: Apr. 2, 2013

(54) METHOD AND APPARATUS FOR TRACKING REPAIR FACILITY PERFORMANCE FOR REPAIRS RELATING TO REPLACEMENT RENTAL VEHICLE TRANSACTIONS

(75) Inventors: David G. Smith, Wildwood, MO (US); Owen R. Miller, Wildwood, MO (US); Trent Tinsley, Eureka, MO (US)

(73) Assignee: The Crawford Group, Inc., St. Louis, MO (US)

(*) Notice: Subject to any disclaimer, the term of this patent is extended or adjusted under 35 U.S.C. 154(b) by 0 days.

(21) Appl. No.: 13/447,428

(22) Filed: Apr. 16, 2012

(65) Prior Publication Data

US 2012/0203580 A1 Aug. 9, 2012

Related U.S. Application Data

(63) Continuation of application No. 12/179,071, filed on Jul. 24, 2008, now Pat. No. 8,160,907.

(60) Provisional application No. 60/951,889, filed on Jul. 25, 2007.

(51) Int. Cl.
*G06Q 99/00* (2006.01)

(52) U.S. Cl. ................ 705/5; 705/6; 705/7.11; 705/305

(58) Field of Classification Search .................. 705/5, 6, 705/7.11, 305
See application file for complete search history.

(56) References Cited

U.S. PATENT DOCUMENTS

| | | | |
|---|---|---|---|
| 3,665,397 | A | 5/1972 | Di Napoli et al. |
| 4,788,643 | A | 11/1988 | Trippe et al. |
| 4,831,526 | A | 5/1989 | Luchs et al. |
| 4,858,121 | A | 8/1989 | Barber et al. |
| 4,899,292 | A | 2/1990 | Montagna et al. |
| 4,916,611 | A | 4/1990 | Doyle, Jr. et al. |
| 4,931,932 | A | 6/1990 | Dalnekoff et al. |
| 5,058,044 | A | 10/1991 | Stewart et al. |
| 5,182,705 | A | 1/1993 | Barr et al. |
| 5,210,687 | A | 5/1993 | Wolfberg et al. |
| 5,216,592 | A | 6/1993 | Mann et al. |
| 5,224,034 | A | 6/1993 | Katz et al. |
| 5,237,499 | A | 8/1993 | Garback |
| 5,253,165 | A | 10/1993 | Leiseca et al. |
| 5,289,369 | A | 2/1994 | Hirshberg |
| 5,309,355 | A | 5/1994 | Lockwood |
| 5,311,425 | A | 5/1994 | Inada et al. |
| 5,369,570 | A | 11/1994 | Parad |
| 5,422,809 | A | 6/1995 | Griffin et al. |
| 5,432,904 | A | 7/1995 | Wong |

(Continued)

FOREIGN PATENT DOCUMENTS

| | | |
|---|---|---|
| JP | 2001344490 | 12/2001 |
| JP | 2002074126 | 3/2002 |

(Continued)

OTHER PUBLICATIONS

Rosen, Cheryl, "OTA Debuts Data Protocol", Business Travel News, Jan. 10, 2000.

(Continued)

*Primary Examiner* — Akiba Allen
(74) *Attorney, Agent, or Firm* — Thompson Coburn LLP

(57) ABSTRACT

Systems and methods for tracking repair facility performance in a replacement rental vehicle context are disclosed. Various operations for adding and subtracting credits from a repair facility virtual bank account are disclosed. Adjustments to credit totals can be based on repair facility performance with regard to an individual vehicle repair or a plurality of vehicle repairs.

46 Claims, 45 Drawing Sheets

U.S. PATENT DOCUMENTS

| | | | | |
|---|---|---|---|---|
| 5,465,206 | A | 11/1995 | Hilt et al. | |
| 5,504,674 | A | 4/1996 | Chen et al. | |
| 5,544,040 | A | 8/1996 | Gerbaulet et al. | |
| 5,550,734 | A | 8/1996 | Tarter et al. | |
| 5,557,515 | A | 9/1996 | Abbruzzese et al. | |
| 5,570,283 | A | 10/1996 | Shoolery et al. | |
| 5,581,461 | A | 12/1996 | Coll et al. | |
| 5,586,312 | A | 12/1996 | Johnson et al. | |
| 5,644,721 | A | 7/1997 | Chung et al. | |
| 5,664,207 | A | 9/1997 | Crumpler et al. | |
| 5,666,493 | A | 9/1997 | Wojcik et al. | |
| 5,712,989 | A | 1/1998 | Johnson et al. | |
| 5,721,913 | A | 2/1998 | Ackroff et al. | |
| 5,724,520 | A | 3/1998 | Goheen | |
| 5,726,885 | A | 3/1998 | Klein et al. | |
| 5,732,398 | A | 3/1998 | Tagawa | |
| 5,734,823 | A | 3/1998 | Saigh et al. | |
| 5,758,329 | A | 5/1998 | Wojcik et al. | |
| 5,758,341 | A | 5/1998 | Voss | |
| 5,764,981 | A | 6/1998 | Brice et al. | |
| 5,781,892 | A | 7/1998 | Hunt et al. | |
| 5,794,207 | A | 8/1998 | Walker et al. | |
| 5,799,289 | A | 8/1998 | Fukushima et al. | |
| 5,808,894 | A | 9/1998 | Wiens et al. | |
| 5,809,478 | A | 9/1998 | Greco et al. | |
| 5,812,067 | A | 9/1998 | Bergholz et al. | |
| 5,818,715 | A | 10/1998 | Marshall et al. | |
| 5,832,451 | A | 11/1998 | Flake et al. | |
| 5,832,454 | A | 11/1998 | Jafri et al. | |
| 5,839,112 | A | 11/1998 | Schreitmueller et al. | |
| 5,839,114 | A | 11/1998 | Lynch et al. | |
| 5,842,176 | A | 11/1998 | Hunt et al. | |
| 5,845,077 | A | 12/1998 | Fawcett | |
| 5,847,957 | A | 12/1998 | Cohen et al. | |
| 5,862,346 | A | 1/1999 | Kley et al. | |
| 5,864,818 | A | 1/1999 | Feldman | |
| 5,890,129 | A | 3/1999 | Spurgeon | |
| 5,893,904 | A | 4/1999 | Harris et al. | |
| 5,897,620 | A | 4/1999 | Walker et al. | |
| 5,903,873 | A | 5/1999 | Peterson et al. | |
| 5,909,581 | A | 6/1999 | Park | |
| 5,915,241 | A | 6/1999 | Giannini | |
| 5,918,215 | A | 6/1999 | Yoshioka et al. | |
| 5,923,552 | A | 7/1999 | Brown et al. | |
| 5,926,798 | A | 7/1999 | Carter et al. | |
| 5,931,878 | A | 8/1999 | Chapin, Jr. | |
| 5,933,810 | A | 8/1999 | Okawa et al. | |
| 5,948,040 | A | 9/1999 | DeLorme et al. | |
| 5,950,169 | A | 9/1999 | Borghesi et al. | |
| 5,953,706 | A | 9/1999 | Patel | |
| 5,956,706 | A | 9/1999 | Carey et al. | |
| 5,983,200 | A | 11/1999 | Slotznick | |
| 6,006,148 | A | 12/1999 | Strong | |
| 6,006,201 | A | 12/1999 | Berent et al. | |
| 6,018,627 | A | 1/2000 | Iyengar et al. | |
| 6,023,679 | A | 2/2000 | Acebo et al. | |
| 6,049,671 | A | 4/2000 | Slivka et al. | |
| 6,049,774 | A | 4/2000 | Roy | |
| 6,061,691 | A | 5/2000 | Fox | |
| 6,073,214 | A | 6/2000 | Fawcett | |
| 6,076,066 | A | 6/2000 | DiRienzo et al. | |
| 6,076,067 | A | 6/2000 | Jacobs et al. | |
| 6,085,169 | A | 7/2000 | Walker et al. | |
| 6,085,170 | A | 7/2000 | Tsukuda et al. | |
| 6,088,677 | A | 7/2000 | Spurgeon | |
| 6,094,640 | A | 7/2000 | Goheen | |
| 6,094,679 | A | 7/2000 | Teng et al. | |
| 6,112,185 | A | 8/2000 | Walker et al. | |
| 6,119,149 | A | 9/2000 | Notani | |
| 6,122,642 | A | 9/2000 | Mehovic | |
| 6,125,384 | A | 9/2000 | Brandt et al. | |
| 6,144,990 | A | 11/2000 | Brandt et al. | |
| 6,148,290 | A | 11/2000 | Dan et al. | |
| 6,167,567 | A | 12/2000 | Chiles et al. | |
| 6,175,832 | B1 | 1/2001 | Luzzi et al. | |
| 6,185,540 | B1 | 2/2001 | Schreitmueller et al. | |
| 6,240,365 | B1 | 5/2001 | Bunn | |
| 6,263,322 | B1 | 7/2001 | Kirkevold et al. | |
| 6,282,517 | B1 | 8/2001 | Wolfe et al. | |
| 6,308,120 | B1 | 10/2001 | Good | |
| 6,327,617 | B1 | 12/2001 | Fawcett | |
| 6,332,163 | B1 | 12/2001 | Bowman-Amuah | |
| 6,334,146 | B1 | 12/2001 | Parasnis et al. | |
| 6,347,398 | B1 | 2/2002 | Parthasarathy et al. | |
| 6,360,205 | B1 | 3/2002 | Iyengar et al. | |
| 6,381,617 | B1 | 4/2002 | Frolund et al. | |
| 6,389,431 | B1 | 5/2002 | Frolund et al. | |
| 6,397,191 | B1 | 5/2002 | Notani et al. | |
| 6,418,554 | B1 | 7/2002 | Delo et al. | |
| 6,477,452 | B2 | 11/2002 | Good | |
| 6,567,783 | B1 | 5/2003 | Notani et al. | |
| 6,594,633 | B1 | 7/2003 | Broerman | |
| 6,609,050 | B2 | 8/2003 | Li | |
| 6,654,770 | B2 | 11/2003 | Kaufman | |
| 6,694,234 | B2 | 2/2004 | Lockwood et al. | |
| 6,732,358 | B1 | 5/2004 | Siefert | |
| 6,757,698 | B2 | 6/2004 | McBride et al. | |
| 6,802,061 | B1 | 10/2004 | Parthasarathy et al. | |
| 6,910,040 | B2 | 6/2005 | Emmick et al. | |
| 6,965,886 | B2 | 11/2005 | Govrin et al. | |
| 6,968,388 | B1 | 11/2005 | Fuldseth et al. | |
| 6,976,251 | B2 | 12/2005 | Meyerson | |
| 7,020,620 | B1 | 3/2006 | Bargnes et al. | |
| 7,050,986 | B1 | 5/2006 | Vance et al. | |
| 7,062,765 | B1 | 6/2006 | Pitzel et al. | |
| 7,089,588 | B2 | 8/2006 | Schaefer et al. | |
| 7,136,821 | B1 | 11/2006 | Kohavi et al. | |
| 7,145,998 | B1 | 12/2006 | Holder et al. | |
| 7,275,038 | B1 | 9/2007 | Weinstock et al. | |
| 7,324,951 | B2 | 1/2008 | Renwick et al. | |
| 7,328,166 | B1 | 2/2008 | Geoghegan et al. | |
| 7,899,690 | B1 | 3/2011 | Weinstock et al. | |
| 8,160,906 | B2 | 4/2012 | Smith et al. | |
| 8,160,907 | B2 | 4/2012 | Smith et al. | |
| 2001/0008998 | A1 | 7/2001 | Tamaki et al. | |
| 2001/0010058 | A1 | 7/2001 | Mittal | |
| 2001/0018661 | A1 | 8/2001 | Sato et al. | |
| 2001/0027420 | A1 | 10/2001 | Boublik et al. | |
| 2001/0027439 | A1 | 10/2001 | Holtzman et al. | |
| 2001/0027483 | A1 | 10/2001 | Gupta et al. | |
| 2001/0037224 | A1 | 11/2001 | Eldridge et al. | |
| 2001/0037255 | A1 | 11/2001 | Tambay et al. | |
| 2001/0037298 | A1 | 11/2001 | Ehrman et al. | |
| 2001/0044811 | A1 | 11/2001 | Ballantyne et al. | |
| 2001/0056361 | A1 | 12/2001 | Sendouda | |
| 2002/0002478 | A1 | 1/2002 | Swart et al. | |
| 2002/0007289 | A1 | 1/2002 | Malin et al. | |
| 2002/0010781 | A1 | 1/2002 | Tuatini | |
| 2002/0013767 | A1 | 1/2002 | Katz | |
| 2002/0019821 | A1 | 2/2002 | Rosenbluth | |
| 2002/0022979 | A1 | 2/2002 | Whipp et al. | |
| 2002/0026336 | A1 | 2/2002 | Eizenburg et al. | |
| 2002/0026337 | A1 | 2/2002 | Sasaki | |
| 2002/0032626 | A1 | 3/2002 | DeWolf et al. | |
| 2002/0032706 | A1 | 3/2002 | Perla et al. | |
| 2002/0032790 | A1 | 3/2002 | Linderman | |
| 2002/0035488 | A1 | 3/2002 | Aquila et al. | |
| 2002/0042849 | A1 | 4/2002 | Ho et al. | |
| 2002/0046301 | A1 | 4/2002 | Shannon et al. | |
| 2002/0059345 | A1 | 5/2002 | Wang et al. | |
| 2002/0072938 | A1 | 6/2002 | Black et al. | |
| 2002/0073012 | A1 | 6/2002 | Lowell et al. | |
| 2002/0077871 | A1 | 6/2002 | Udelhoven et al. | |
| 2002/0082912 | A1 | 6/2002 | Batachia et al. | |
| 2002/0087374 | A1 | 7/2002 | Boubez et al. | |
| 2002/0091533 | A1 | 7/2002 | Ims et al. | |
| 2002/0095319 | A1 | 7/2002 | Swart et al. | |
| 2002/0099575 | A1 * | 7/2002 | Hubbard et al. | 705/5 |
| 2002/0099613 | A1 | 7/2002 | Swart et al. | |
| 2002/0111846 | A1 | 8/2002 | Singer | |
| 2002/0120459 | A1 | 8/2002 | Dick et al. | |
| 2002/0120776 | A1 | 8/2002 | Eggebraaten et al. | |
| 2002/0129021 | A1 | 9/2002 | Brown | |
| 2002/0143644 | A1 | 10/2002 | Tosun et al. | |
| 2002/0143819 | A1 | 10/2002 | Han et al. | |
| 2002/0152100 | A1 | 10/2002 | Chen et al. | |
| 2002/0156693 | A1 | 10/2002 | Stewart et al. | |

| | | | | |
|---|---|---|---|---|
| 2002/0184219 | A1 | 12/2002 | Preisig et al. | |
| 2002/0186144 | A1 | 12/2002 | Meunier | |
| 2002/0194219 | A1 | 12/2002 | Bradley et al. | |
| 2002/0198743 | A1 | 12/2002 | Ariathurai et al. | |
| 2003/0004746 | A1 | 1/2003 | Kheirolomoom et al. | |
| 2003/0005181 | A1 | 1/2003 | Bau et al. | |
| 2003/0014295 | A1 | 1/2003 | Brookes et al. | |
| 2003/0014442 | A1 | 1/2003 | Shiigi et al. | |
| 2003/0014733 | A1 | 1/2003 | Ringseth et al. | |
| 2003/0023463 | A1 | 1/2003 | Dombroski et al. | |
| 2003/0023957 | A1 | 1/2003 | Bau et al. | |
| 2003/0028404 | A1 | 2/2003 | Herron et al. | |
| 2003/0028533 | A1 | 2/2003 | Bata et al. | |
| 2003/0033369 | A1 | 2/2003 | Bernhard | |
| 2003/0036930 | A1 | 2/2003 | Matos et al. | |
| 2003/0036966 | A1 | 2/2003 | Amra et al. | |
| 2003/0050942 | A1 | 3/2003 | Ruellan et al. | |
| 2003/0055868 | A1 | 3/2003 | Fletcher et al. | |
| 2003/0074423 | A1 | 4/2003 | Mayberry et al. | |
| 2003/0093402 | A1 | 5/2003 | Upton | |
| 2003/0093403 | A1 | 5/2003 | Upton | |
| 2003/0093470 | A1 | 5/2003 | Upton | |
| 2003/0093575 | A1 | 5/2003 | Upton | |
| 2003/0097286 | A1 | 5/2003 | Skeen | |
| 2003/0101190 | A1 | 5/2003 | Horvitz et al. | |
| 2003/0110315 | A1 | 6/2003 | Upton | |
| 2003/0114967 | A1 | 6/2003 | Good | |
| 2003/0115548 | A1 | 6/2003 | Melgar | |
| 2003/0115572 | A1 | 6/2003 | Zondervan et al. | |
| 2003/0120464 | A1 | 6/2003 | Taft et al. | |
| 2003/0120502 | A1 | 6/2003 | Robb et al. | |
| 2003/0120665 | A1 | 6/2003 | Fox et al. | |
| 2003/0125992 | A1 | 7/2003 | Rogers et al. | |
| 2003/0126063 | A1 | 7/2003 | Reuter et al. | |
| 2003/0131073 | A1 | 7/2003 | Lucovsky et al. | |
| 2003/0135584 | A1 | 7/2003 | Roberts et al. | |
| 2003/0145047 | A1 | 7/2003 | Upton | |
| 2003/0145067 | A1 | 7/2003 | Cover et al. | |
| 2003/0149600 | A1 | 8/2003 | Williams | |
| 2003/0154111 | A1 | 8/2003 | Dutra et al. | |
| 2004/0001575 | A1 | 1/2004 | Tang | |
| 2004/0039612 | A1 | 2/2004 | Fitzgerald et al. | |
| 2004/0054600 | A1 | 3/2004 | Shike et al. | |
| 2004/0075581 | A1 | 4/2004 | Staniszewski | |
| 2004/0243423 | A1 | 12/2004 | Rix et al. | |
| 2004/0243619 | A1 | 12/2004 | Kelly et al. | |
| 2005/0021378 | A1 | 1/2005 | Weinstock et al. | |
| 2005/0091087 | A1 | 4/2005 | Smith et al. | |
| 2005/0119921 | A1 | 6/2005 | Fitzgerald et al. | |
| 2005/0125261 | A1 | 6/2005 | Adegan | |
| 2005/0144048 | A1 | 6/2005 | Belanger et al. | |
| 2005/0187833 | A1 | 8/2005 | Royer et al. | |
| 2005/0197866 | A1 | 9/2005 | Salcedo et al. | |
| 2005/0246206 | A1 | 11/2005 | Obora et al. | |
| 2006/0031041 | A1 | 2/2006 | Afshar et al. | |
| 2006/0035692 | A1 | 2/2006 | Kirby et al. | |
| 2006/0140348 | A1* | 6/2006 | Wallace et al. | 379/29.01 |
| 2006/0190273 | A1 | 8/2006 | Wilbrink et al. | |
| 2007/0174081 | A1 | 7/2007 | Smith et al. | |
| 2007/0198311 | A1 | 8/2007 | Menendez et al. | |
| 2007/0203777 | A1 | 8/2007 | Berkey et al. | |
| 2007/0239494 | A1 | 10/2007 | Stephens et al. | |
| 2007/0260496 | A1 | 11/2007 | Weinstock et al. | |
| 2007/0271124 | A1 | 11/2007 | Weinstock et al. | |
| 2007/0271125 | A1 | 11/2007 | Weinstock et al. | |
| 2007/0271128 | A1 | 11/2007 | Bolling | |
| 2007/0294116 | A1 | 12/2007 | Stephens et al. | |
| 2008/0010105 | A1 | 1/2008 | Rose et al. | |
| 2008/0046261 | A1 | 2/2008 | Cunningham | |
| 2008/0097798 | A1 | 4/2008 | DeVallance et al. | |
| 2008/0133281 | A1 | 6/2008 | Bolt et al. | |
| 2008/0140460 | A1* | 6/2008 | Smith et al. | 705/5 |
| 2008/0162199 | A1 | 7/2008 | Smith et al. | |
| 2008/0243562 | A1 | 10/2008 | Weinstock et al. | |
| 2008/0243563 | A1 | 10/2008 | Weinstock et al. | |
| 2008/0249814 | A1 | 10/2008 | Weinstock et al. | |
| 2009/0018859 | A1 | 1/2009 | Purifoy et al. | |
| 2009/0030747 | A1 | 1/2009 | Smith et al. | |
| 2010/0023352 | A1 | 1/2010 | Smith et al. | |
| 2012/0197672 | A1 | 8/2012 | Smith et al. | |
| 2012/0203581 | A1 | 8/2012 | Smith et al. | |
| 2012/0203582 | A1 | 8/2012 | Smith et al. | |

FOREIGN PATENT DOCUMENTS

| | | | |
|---|---|---|---|
| WO | 0052601 | A1 | 9/2000 |
| WO | 02057873 | | 7/2002 |
| WO | 02067079 | | 8/2002 |
| WO | 02067175 | A2 | 8/2002 |
| WO | 02080646 | | 10/2002 |
| WO | 02097700 | A2 | 12/2002 |

OTHER PUBLICATIONS

Rosen, Cheryl, "OTA Publishes XML Data Standard", Business Travel News, pp. 1-2, Mar. 20, 2000.
Spreadsheet Calculator Form for Allstate, 14 pages, File Creation Date of May 6, 2007.
Spreadsheet Calculator Form to Estimate Formula Days, 9 pages, File Creation Date of Jan. 16, 2006.
The ARMS Connection, Safeco/Enterprise Rent-A-Car, pp. 1-4.
The Connection, State Farm Insurance/Enterprise Rent-A-Car, Rental Process Automation and Procedures, pp. 1-3.
The Hertz Corporation, 1998.
Travel Agent, "Many Ways to Sell", Oct. 2, 1995, vol. 0, No. 0, p. 36.
TSD Brochure, "Are You Comparing Apples to Apples When Choosing Rental Software", p. 1-3.
TSD Brochure, Rent 2000 from TSD, Rental Management Software, Revolutionize the Way You Do Business with the Proven Solution, p. 1-2.
TSD Brochure, Rent 2000 from TSD, Rental Management Software, Revolutionize the Way You Do Business, p. 1-29.
U.S. Appl. No. 60/527,762, filed Dec. 9, 2003 (Adegan).
U.S. Appl. No. 60/692,886, filed Jun. 21, 2005 (Kelly et al.).
U.S. Appl. No. 60/828,540, filed Oct. 5, 2006 (Smith et al.).
U.S. Appl. No. 09/564,911, filed May 4, 2000 (Williams).
U.S. Appl. No. 09/698,491, filed Oct. 27, 2000 (Menendez et al.).
U.S. Appl. No. 09/698,502, filed Oct. 27, 2000 (Menendez et al.).
U.S. Appl. No. 09/698,552, filed Oct. 27, 2000 (Menendez et al.).
U.S. Appl. No. 11/472,168, filed Jun. 21, 2006 (Kelly et al.).
Wustner et al., "Converting Business Documents: A Classification of Problems and Solutions Using XML/XSLT", Advanced Issues of E-Commerce and Web-Based Information Systems, Jun. 26-28, 2002, Proceedings of the Fourth IEEE International Workshop, Piscataway, NJ, US, IEEE, 8 pages.
www.Hertz.com (archived Feb. 29, 2000).
Yenckel, "For This Cyberspace Visitor, Once Is More Than Enough", Feb. 11, 1996, p. E.01, The Washington Post (Pre-1997 Fulltext), ISSN 01908286.
"ARMS Automotive Web Service Process Overview", 8 pages, 2004.
"Cieca Estimate Management Standard", Version 2.01, Feb. 3, 1999 and Jun. 19, 2001, 54 pp.
"Communicating Status Updates Just Got Easier", 2 pages, Creation Date of Oct. 26, 2006.
"Enterprise ARMS Your Shop With the Competitive Edge", 2 pages, Creation Date of Oct. 2007.
"Fix Auto WEB-CMS Repair Delay Form", 3 pages, 2004.
"Information on Hertz Corporation"; Sep. 24, 2002; pp. 1-61.
"Rental Management for Vehicle Replacement Rentals", National Electronic Data Interchange Transaction Set Implementation Guide, 272/824, Jul. 2000.
"Rental Management Invoicing and Application Advice for Vehicle Replacement Rentals", National Electronic Data Interchange Transaction Set Implementation Guide, 811/824, Jul. 2000.
"Rental Management Remittance Advice for Vehicle Replacement Rentals", National Electronic Data Interchange Transaction Set Implementation Guide, 820, Jul. 2000.
"Welcome to the Hertz Interactive Reservation Process"; Mar. 3, 2000; pp. 62-27.
"What Is Windows Communication Foundation?", downloaded from http://msdn.microsoft.com/en-us/library/ms731082(printer).aspx on Aug. 27, 2008, 6 pages.
10K Report; Agency Rent-A-Car Inc.; Report No. 0127651; Section Heading: Part I, Item 1. Business; Jan. 31, 1994; p. 4 of 54.

ABC Insurance Company/EngineRoar, pp. 1-2.
ARMS 400 Demonstration, p. 1-67.
ARMS Claims Internet Quick Reference Guide, Oct. 1999.
ARMS Electronic Callback System Demonstration, pp. 1-22, 1998.
ARMS Overview, pp. 1-10.
ARMS Technology, Jul. 2000.
ARMS/400—Automated Rental Management System, pp. 1-8, 1995.
ARMS/400 Automated Rental Management System, Copyright 1998.
ARMS/400 Automated Rental Management System, Copyright 1999.
ARMS/400 User Manual, 1999.
Automated Rentals, Unwrapped, pp. 1-7, Oct. 1995.
Bluebird Auto Rental Systems, "Are You Buried Under an Evergrowing Mountain of Paper?".
Bluebird Auto Rental Systems, Business Description & Products.
CarTemps Rent-A-Car; "CarTemps DIRECT" information; publication date unknown.
CarTemps Rent-A-Car; "CarTemps MPOWERENT Management System"; Instruction Manual; Copyright 2000; v1.1; publication date unknown.
CLIP, "Servlets: CGI the Java Way", Byte, May 1, 1998, pp. 55-56, vol. 23, No. 5, McGraw-Hill, Inc., St. Peterborough, US.
Collision Industry Electronic Commerce Association Business Message Specification Schema, Jul. 30, 2003.
Copyright Chronicle Publishing Company, May 2, 1997, "Booking a room, vehicle for vacation via the Net", Pantagraph, C.1.
Curbera et al., "Unraveling the Web Services Web: An Introduction to SOAP, WSDL, and UDDI", IEEE Internet Computing, Mar. 1, 2002, pp. 86-93, vol. 6, No. 2, IEEE Service Center, New York, NY, US.
CynCast Powering Integration, 9 pages.
D.P. General Use Programs, AACB10 Consolidated Callback Maintenance, Apr. 1994, pp. 1-4.
Darrah, "Hi-Tech Streamlines Car Rental Process", Feb. 1999, p. 29, vol. 66, Issue 2.
Data Warehouse & Analyzer Quick Sheet, Jun. 2000, pp. 1-2.
Dollar Rent A Car Systems, Inc., pp. 1-5, 1998.
ECARS—Enterprise Computer Assisted Rental System, AACJ01 Callbacks, pp. 1-9, Jul. 1, 1997.
ECARS 2000 Customer Profile, Chapters 1-16.
EngineRoar.com, pp. 3-76.
Enterprise Computer Assisted Rental System Workbook, Dec. 1996.
Enterprise Computer Assisted Rental System Workbook, Sep. 1997.
Enterprise Network and Physical Connections Overview, 1995, pp. 1-5.
Enterprise Rent-A-Car ARMS—Vehicle Messaging System, Project Charter, Oct. 15, 1998, pp. 1-7.
Enterprise Rent-A-Car Company ARMS—Vehicle Messaging System Overview, May 16, 2001, p. 1-35.
Enterprise Rent-A-Car Company ARMS—Vehicle Messaging System Phase II Project Charter, Aug. 20, 1999, p. 1-6.
Enterprise Rent-A-Car Company, ARMS Basics and Concepts, vol. 1, Chapter 1-4, Feb. 24, 1998.
Enterprise Rent-A-Car Company, ARMS Basics and Concepts, vol. 1, Chapters 1-4, Jun. 10, 1998.
Enterprise Rent-A-Car Company, Functional Specification, pp. 1-2, Nov. 1999.
Enterprise Rent-A-Car, ARMS Online Reporting, Project Charter, Version 1.0, Aug. 20, 1999, pp. 1-7.
Everything You Need to Know About ARMS Automotive, 2000, pp. 1-8.
Fix Auto Collision, EMS Web Agent 1.0, White Paper, Version 1.0, Draft 01, Dec. 9, 2003, pp. 1-18.
Fix Auto, downloaded from https://www.fixauto.com/default.aspx, Sep. 14, 2006, 20 pages.
Graham et al., "Building Web Services with Java?: Making Sense of XML, SOAP, WSDL, and UDDI", Internet Citation, Dec. 12, 2001, Retrieved from the Internet: <URL:http://proquest.safaribooksonline.com/0672321815>.
http://www.eautoclaims.com, pp. 1-11, Apr. 8, 2000.
http://www.hertz.com/InteractionRes/htm/isexckge.htm, pp. 1-2, Mar. 20, 1997.
Interactions, "Electronic Connections", p. 3, Mar. 15, 1995.
Interactions, ARMS Update, vol. 6, Issue 2, Feb. 1997.
Interactions, ARMS, vol. 3, No. 6, Mar. 15, 1994.
Interactions, Published especially for our Farmers adjusters, 1994.
Interactions, Special Edition, Nov. 1992.
Interactions, Special Edition, vol. 1, No. 4, Aug. 1992.
Interactions, vol. 1, No. 3, Jul. 1992.
Interactions, vol. 1, No. 5, Sep. 1992.
Interactions, vol. 1, No. 8, Dec. 1992.
Interactions, vol. 2, No. 1, Jan. 1993.
Interactions, vol. 2, No. 11, Oct. 1, 1993.
Interactions, vol. 2, No. 13, Nov. 1, 1993.
Interactions, vol. 2, No. 14, Nov. 15, 1993.
Interactions, vol. 2, No. 5, May 1993.
Interactions, vol. 2, No. 7, Jul. 1993.
Interactions, vol. 2, No. 8, Aug. 1993.
Interactions, vol. 3, No. 1, Jan. 1, 1994.
Interactions, vol. 3, No. 1, Jan. 15, 1994.
Interactions, vol. 3, No. 10, May 15, 1994.
Interactions, vol. 3, No. 11, Jun. 1, 1994.
Interactions, vol. 3, No. 12, Jun. 15, 1994.
Interactions, vol. 3, No. 14, Jul. 15, 1994.
Interactions, vol. 3, No. 15, Aug. 1, 1994.
Interactions, vol. 3, No. 16, Aug. 15, 1994.
Interactions, vol. 3, No. 21, Nov. 1, 1994.
Interactions, vol. 3, No. 23, Dec. 1, 1994.
Interactions, vol. 3, No. 8, Apr. 15, 1994.
Interactions, vol. 4, Issue 14, Jul. 15, 1995.
Interactions, vol. 4, Issue 16, Aug. 15, 1995.
Interactions, vol. 4, Issue 19, Oct. 1, 1995.
Interactions, vol. 4, Issue 21, Nov. 1, 1995.
Interactions, vol. 4, Issue 24, Dec. 15, 1995.
Interactions, vol. 4, No. 3, Feb. 1, 1995.
Interactions, vol. 4, No. 6, Mar. 15, 1995.
Interactions, vol. 4, No. 9, May 1, 1995.
Interactions, vol. 5, Issue 1, Jan. 1, 1996.
Interactions, vol. 5, Issue 13, Oct. 1, 1996.
Interactions, vol. 5, Issue 14, Nov. 1, 1996.
Interactions, vol. 5, Issue 2, Jan. 15, 1996.
Interactions, vol. 5, Issue 4, Feb. 15, 1996.
Interactions, vol. 6, Issue 12, Dec. 1997.
Interactions, vol. 6, Issue 8, Aug. 1997.
Interactions, vol. 7, Issue 1, Jan. 1998.
Interactions, vol. 7, Issue 12, Dec. 1998.
Interactions, vol. 7, Issue 5, May 1998.
Interactions, vol. 7, Issue 7, Jul. 1998.
Interactions, vol. 7, Issue 8, Aug. 1998.
Interactions, vol. 8, Issue 7, Jul. 1999.
Interactions, vol. 8, Issue 8, Aug. 1999.
Interactions, vol. 8, Issue 9, Sep. 1999.
Interactions, vol. 9, Issue 2, Feb. 2000.
Interactions, vol. 9, Issue 3, Mar. 2000.
Interactions, vol. 9, Issue 5, May 2000.
International Preliminary Report on Patentability (Chapter I) for PCT/US2008/071063 issued Feb. 4, 2010.
International Search Report for PCT/US2007/025327 dated May 21, 2008.
Internet Networking Architecture, 1999.
Introducing ARMS Claims, Jun. 2000, pp. 1-6.
IS General Use Programs—Section 19, AACB34 Callback Fax Customization, Mar. 5, 1998.
Lone Star Rental Systems, EZ Traker™, Your Complete Auto Rental Management Solution.
Lorentz, Jeff, Functional Specification, Internet Application Development, ARMS Automotive, pp. 1-3.
Milligan, Michael, "OTA targets mid-January to release e-commerce protocol", Travel Weekly, Jan. 10, 2000.
Net rentacar.com User Guide, pp. 1-19.
Notice of Allowance for U.S. Appl. No. 11/747,645 dated Dec. 28, 2011.
Office Action for CA Application No. 2416840 dated Jan. 7, 2005.
Office Action for CA Application No. 2416840 dated Mar. 5, 2010.

Office Action for EP Application No. 01273072.7 dated Apr. 11, 2004.
Office Action for U.S. Appl. No. 10/865,116 dated May 12, 2011.
Office Action for U.S. Appl. No. 10/865,116 dated Oct. 28, 2010.
Office Action for U.S. Appl. No. 11/747,645 dated Aug. 27, 2010.
Office Action for U.S. Appl. No. 11/823,782 dated Feb. 17, 2011.
Office Action for U.S. Appl. No. 11/929,277 dated Oct. 12, 2010.
Office Action for U.S. Appl. No. 11/929,350 dated Feb. 7, 2011.
Office Action for U.S. Appl. No. 11/929,473 dated Oct. 12, 2010.
Office Action for U.S. Appl. No. 12/178,037 dated Nov. 17, 2010.
Open Travel Alliance, "ebXML Uses Opentravel Alliance Specification for Early Tests", May 10, 2000.
Open Travel Alliance, "Open Travel Alliance Joins Forces with DISA", Sep. 9, 1999.
Open Travel Alliance, "Open Travel Alliance Names Board Officers", Sep. 2, 1999.
Open Travel Alliance, "OpenTravel Alliance's New XML Specification Creates a Common Customer Profile for Travelers", Feb. 29, 2000.
Open Travel Alliance, "White Paper", pp. 1-20, Feb. 2000.
Orion Systems, Ltd., pp. 1-36.
Orion Systems, Ltd., System Overview and Handheld Terminals, downloaded from www.orsys.com on Dec. 1, 1997, pp. 1-5.
Orion Systems, Ltd., System Overview with Screens and Reports, May 1996.
PC/ARMS Demonstration, pp. 1-45, 1995.
Preview Travel, Inc., Car Reservations, 1999.
Prosecution History for U.S. Appl. No. 09/641,820, now USPN 7,275,038, filed Aug. 18, 2000 (as of Apr. 20, 2011).
Prosecution History for U.S. Appl. No. 09/694,050, now USPN 7,899,690, filed Oct. 20, 2000—Part 1-3 (as of Apr. 20, 2011).
Prosecution History for U.S. Appl. No. 10/343,576, filed Jan. 31, 2003—Part 1-3 (as of Apr. 20, 2011).
Prosecution History for U.S. Appl. No. 11/609,844, filed Dec. 12, 2006 (as of Apr. 20, 2011).
Prosecution History for U.S. Appl. No. 11/868,266, filed Oct. 5, 2007 (as of Apr. 20, 2011).
Rental Redesign, Rental Management, RMS (Rental Management Services), Sep. 30, 1998, pp. 1-2.
Response to Office Action for CA Application 2416840 dated Sep. 3, 2010.
Response to Office Action for CA Application No. 2416840 dated Jul. 7, 2005.
Response to Office Action for EP Application No. 01273072.7 dated Aug. 30, 2005.
Response to Office Action for U.S. Appl. No. 11/747,645 dated Aug. 27, 2010.
Response to Office Action for U.S. Appl. No. 11/929,277 dated Oct. 12, 2010.
Notice of Allowance for U.S. Appl. No. 13/025,546 dated Jun. 25, 2012.
Office Action for U.S. Appl. No. 13/025,617 dated Apr. 27, 2012.
Office Action for U.S. Appl. No. 13/447,821 dated Oct. 11, 2012.

* cited by examiner

| Explanation (304) | Category (306) | Amount (308) |
|---|---|---|
| Explanation 1 | Adjustment | 3 days |
| Explanation 2 | Extension | 1 day |
| Explanation 3 | Extension | 5 days |
| ⋮ | ⋮ | ⋮ |
| Explanation i | Adjustment | 2 days |
| ⋮ | ⋮ | ⋮ |
| Explanation n | Adjustment | 2 days |

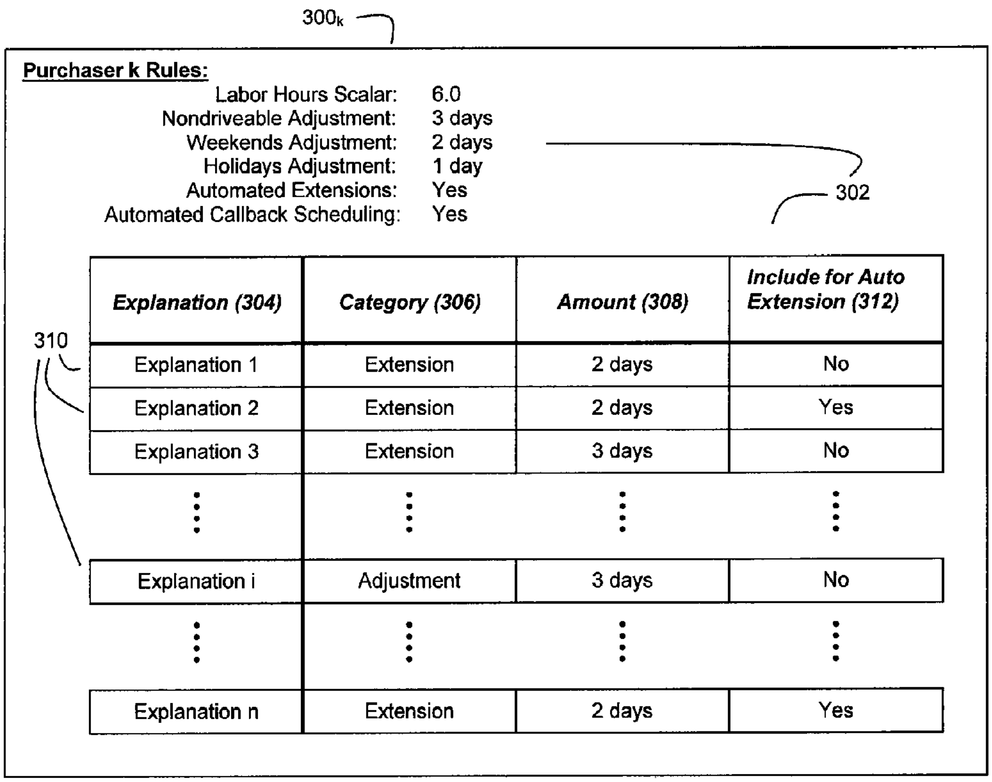

Figure 3(c)

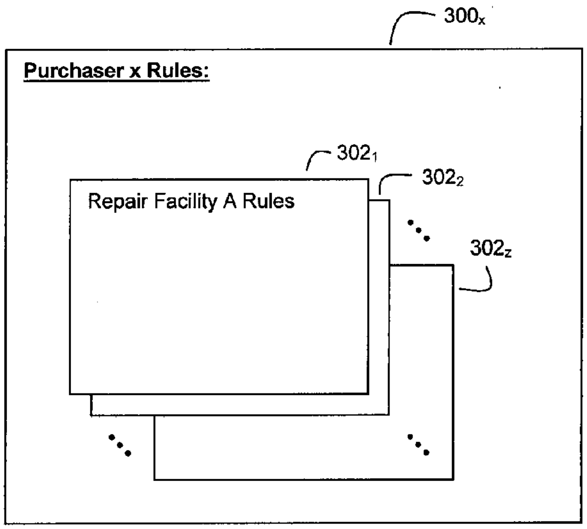

Figure 3(d)

Purchaser k Rules:

| | |
|---|---|
| Labor Hours Scalar: | 6.0 |
| Nondriveable Adjustment: | 3 days |
| Weekends Adjustment: | 2 days |
| Holidays Adjustment: | 1 day |
| Automated Extensions: | Yes |
| Automated Callback Scheduling: | Yes |

| Explanation (304) | Category (306) | Amount (308) | Include for Auto Extension (312) |
|---|---|---|---|
| Explanation 1 | Extension | 2 days | No |
| Explanation 2 | Extension | 2 days | Yes |
| Explanation 3 | Extension | 3 days | No |
| ⋮ | ⋮ | ⋮ | ⋮ |
| Explanation i | Adjustment | 3 days | No |
| ⋮ | ⋮ | ⋮ | ⋮ |
| Explanation n | Extension | 2 days | Yes |

$300_y$

Purchaser Y Rules

302

320

| Repairs Completed within TCD? (322) | Rental Vehicle Returned by LAD? (324) | Payor(s): |
|---|---|---|
| Yes | Yes | Purchaser pays 100% of reservation cost (326) |
| Yes | No | Purchaser pays portion of reservation cost up to LAD; Driver pays portion of reservation cost beyond LAD (328) |
| No | Yes | Purchaser pays portion of reservation cost up to TCD; Repair facility pays portion of reservation cost beyond TCD (330) |
| No | No | Purchaser pays portion of reservation cost up to TCD; repair facility pays portion of reservation cost from TCD to LAD; Driver pays portion of reservation cost beyond LAD (332) |

Purchaser j Callback Scheduling Rules

Scheduling Rules for Reservations Corresponding to Disabled Vehicles that are DRIVEABLE:

402

| Days Between LUD and DUD | Scheduled Callback Date |
|---|---|
| 0-2 Days | Same Day as LAD |
| 3-4 Days | 1 Day Before LAD |
| 5-7 Days | 2 Days Before LAD |
| 8+ Days | 3 Days Before LAD |

Scheduling Rules for Reservations Corresponding to Disabled Vehicles that are NONDRIVEABLE:

404

| Days Between LUD and DUD | Scheduled Callback Date |
|---|---|
| 0-1 Days | Same Day as LAD |
| 2-7 Days | 1 Day Before LAD |
| 8-14 Days | 3 Days Before LAD |
| 15-20 Days | 4 Days Before LAD |
| 21+ Days | 5 Days Before LAD |

Purchaser k Callback Scheduling Rules

Scheduling Rules for Reservations Corresponding to Disabled Vehicles that are DRIVEABLE:

402

| Number of Authorized Days | Scheduled Callback Date |
|---|---|
| 0-2 Days | Same Day as LAD |
| 3-5 Days | 1 Day Before LAD |
| 6-8 Days | 3 Days Before LAD |
| 9+ Days | 4 Days Before LAD |

Scheduling Rules for Reservations Corresponding to Disabled Vehicles that are NONDRIVEABLE:

404

| Number of Authorized Days | Scheduled Callback Date |
|---|---|
| 0-1 Days | Same Day as LAD |
| 2-8 Days | 1 Day Before LAD |
| 9-15 Days | 3 Days Before LAD |
| 16+ Days | 4 Days Before LAD |

Purchaser q Callback Scheduling Rules

406

| Days Between LUD and LAD | Scheduled Callback Date |
|---|---|
| 0-2 Days | Same Day as LAD |
| 3-5 Days | 1 Day Before LAD |
| 6-8 Days | 2 Days Before LAD |
| 9-14 Days | 3 Days Before LAD |
| 15+ Days | 4 Days Before LAD |

Repair Facility X Audit Report
mm/dd/yyy
Year-to-Date Statistics for Repairs Performed by Repair Facility X On Behalf of Insurance Company Y

| | Repair Facility X | Local Area Average | Industry Average | Local Area Rank | Industry Rank |
|---|---|---|---|---|---|
| Average Number of Rental Days for Reservations Corresponding to All Vehicles Repaired | ... | ... | ... | ... | ... |
| Average Number of Rental Days for Reservations Corresponding to Driveable Vehicles Repaired | ... | ... | ... | ... | ... |
| Average Number of Rental Days for Reservations Corresponding to Nondriveable Vehicles Repaired | ... | ... | ... | ... | ... |
| Percentage of All Repairs Completed within Initial Target Completion Date | ...% | ...% | ...% | ... | ... |
| Percentage of Repairs for Driveable Vehicles Completed within Initial Target Completion Date | ...% | ...% | ...% | ... | ... |
| Percentage of Repairs for Nondriveable Vehicles Completed within Initial Target Completion Date | ...% | ...% | ...% | ... | ... |
| Percentage of All Repairs Completed without Extensions | ...% | ...% | ...% | ... | ... |
| Percentage of Repairs for Driveable Vehicles Completed without Extensions | ...% | ...% | ...% | ... | ... |
| Percentage of Repairs for Nondriveable Vehicles Completed without Extensions | ...% | ...% | ...% | ... | ... |
| Average Number of Labor Hours to Repair Disabled Vehicle for All Repairs | ... | ... | ... | ... | ... |
| Average Number of Labor Hours to Repair Disabled Vehicle for Repairs to Driveable Vehicles | ... | ... | ... | ... | ... |
| Average Number of Labor Hours to Repair Disabled Vehicle for Repairs to Nondriveable Vehicles | ... | ... | ... | ... | ... |
| Average Length of Extension Period for All Repairs where Reservation Extensions Needed | ... | ... | ... | ... | ... |
| Average Length of Extension Period for All Repairs to Driveable Vehicles where Reservation Extensions Needed | ... | ... | ... | ... | ... |
| Average Length of Extension Period for All Repairs to Nondriveable Vehicles where Reservation Extensions Needed | ... | ... | ... | ... | ... |

Repair Facility X Audit Report
mm/dd/yyy
Year-to-Date Statistics for Repairs Performed by Repair Facility X On Behalf of Insurance Company Y

⋮

| | Repair Facility X | Local Area Average | Industry Average | Local Area Rank | Industry Rank |
|---|---|---|---|---|---|
| Average Adjustment Amount for All Repairs due to Adjustment Explanation 1 | ... | ... | ... | ... | ... |
| Average Adjustment Amount for Repairs to Driveable Vehicles due to Adjustment Explanation 1 | ... | ... | ... | ... | ... |
| Average Adjustment Amount for Repairs to Nondriveable Vehicles due to Adjustment Explanation 1 | ... | ... | ... | ... | ... |
| Average Adjustment Amount to All Repairs due to Adjustment Explanation 2 | ... | ... | ... | ... | ... |
| Average Adjustment Amount for Repairs to Driveable Vehicles due to Adjustment Explanation 2 | ... | ... | ... | ... | ... |
| Average Adjustment Amount for Repairs to Nondriveable Vehicles due to Adjustment Explanation 2 | ... | ... | ... | ... | ... |
| ⋮ | | | | | |
| Average Adjustment Amount to All Repairs due to Adjustment Explanation n | ... | ... | ... | ... | ... |
| Average Adjustment Amount for Repairs to Driveable Vehicles due to Adjustment Explanation n | ... | ... | ... | ... | ... |
| Average Adjustment Amount for Repairs to Nondriveable Vehicles due to Adjustment Explanation n | ... | ... | ... | ... | ... |

Repair Facility X Audit Report
mm/dd/yyy
Year-to-Date Statistics for Repairs Performed by Repair Facility X On Behalf of Insurance Company Y

⋮

| | Repair Facility X | Local Area Average | Industry Average | Local Area Rank | Industry Rank |
|---|---|---|---|---|---|
| Percentage of All Adjustments for All Repairs due to Adjustment Explanation 1 | ... % | ... % | ... % | ... | ... |
| Percentage of All Adjustments for Repairs to Driveable Vehicles due to Adjustment Explanation 1 | ... % | ... % | ... % | ... | ... |
| Percentage of All Adjustments for Repairs to Nondriveable Vehicles due to Adjustment Explanation 1 | ... % | ... % | ... % | ... | ... |
| Percentage of All Adjustments for All Repairs due to Adjustment Explanation 2 | ... % | ... % | ... % | ... | ... |
| Percentage of All Adjustments for Repairs to Driveable Vehicles due to Adjustment Explanation 2 | ... % | ... % | ... % | ... | ... |
| Percentage of All Adjustments for Repairs to Nondriveable Vehicles due to Adjustment Explanation 2 | ... % | ... % | ... % | ... | ... |
| ⋮ | | | | | |
| Percentage of All Adjustments for All Repairs due to Adjustment Explanation n | ... % | ... % | ... % | ... | ... |
| Percentage of All Adjustments for Repairs to Driveable Vehicles due to Adjustment Explanation n | ... % | ... % | ... % | ... | ... |
| Percentage of All Adjustments for Repairs to Nondriveable Vehicles due to Adjustment Explanation n | ... % | ... % | ... % | ... | ... |

Repair Facility X Audit Report
mm/dd/yyy
Year-to-Date Statistics for Repairs Performed by Repair Facility X On Behalf of Insurance Company Y

⋮

| | Repair Facility X | Local Area Average | Industry Average | Local Area Rank | Industry Rank |
|---|---|---|---|---|---|
| Average Extension Amount for All Repairs due to Extension Explanation 1 | ... | ... | ... | ... | ... |
| Average Extension Amount for Repairs to Driveable Vehicles due to Extension Explanation 1 | ... | ... | ... | ... | ... |
| Average Extension Amount for Repairs to Nondriveable Vehicles due to Extension Explanation 1 | ... | ... | ... | ... | ... |
| Average Extension Amount to All Repairs due to Extension Explanation 2 | ... | ... | ... | ... | ... |
| Average Extension Amount for Repairs to Driveable Vehicles due to Extension Explanation 2 | ... | ... | ... | ... | ... |
| Average Extension Amount for Repairs to Nondriveable Vehicles due to Extension Explanation 2 | ... | ... | ... | ... | ... |
| ⋮ | | | | | |
| Average Extension Amount to All Repairs due to Extension Explanation n | ... | ... | ... | ... | ... |
| Average Extension Amount for Repairs to Driveable Vehicles due to Extension Explanation n | ... | ... | ... | ... | ... |
| Average Extension Amount for Repairs to Nondriveable Vehicles due to Extension Explanation n | ... | ... | ... | ... | ... |

Repair Facility X Audit Report
mm/dd/yyy
Year-to-Date Statistics for Repairs Performed by Repair Facility X On Behalf of Insurance Company Y

⋮

| | Repair Facility X | Local Area Average | Industry Average | Local Area Rank | Industry Rank |
|---|---|---|---|---|---|
| Percentage of All Extensions for All Repairs due to Extension Explanation 1 | ... % | ... % | ... % | ... | ... |
| Percentage of All Extensions for Repairs to Driveable Vehicles due to Extension Explanation 1 | ... % | ... % | ... % | ... | ... |
| Percentage of All Extensions for Repairs to Nondriveable Vehicles due to Extension Explanation 1 | ... % | ... % | ... % | ... | ... |
| Percentage of All Extensions for All Repairs due to Extension Explanation 2 | ... % | ... % | ... % | ... | ... |
| Percentage of All Extensions for Repairs to Driveable Vehicles due to Extension Explanation 2 | ... % | ... % | ... % | ... | ... |
| Percentage of All Extensions for Repairs to Nondriveable Vehicles due to Extension Explanation 2 | ... % | ... % | ... % | ... | ... |

⋮

| | | | | | |
|---|---|---|---|---|---|
| Percentage of All Extensions for All Repairs due to Extension Explanation n | ... % | ... % | ... % | ... | ... |
| Percentage of All Extensions for Repairs to Driveable Vehicles due to Extension Explanation n | ... % | ... % | ... % | ... | ... |
| Percentage of All Extensions for Repairs to Nondriveable Vehicles due to Extension Explanation n | ... % | ... % | ... % | ... | ... |

Rental Company 1 Audit Report
mm/dd/yyy
Year-to-Date Statistics for Replacement Reservations Placed with Rental Company 1
by Insurance Company Y

|  | Rental Company 1 | Industry Average | Industry Rank |
|---|---|---|---|
| Average Replacement Rental Length | ... | ... | ... |
| Average Cost Per Day for All Replacement Rentals | ... | ... | ... |
| Average Cost Per Day for Replacement Rentals within Car Class 1 | ... | ... | ... |
| Average Cost Per Day for Replacement Rentals within Car Class 2 | ... | ... | ... |
| ⋮ | | | |
| Average Cost Per Day for Replacement Rentals within Car Class n | ... | ... | ... |
| Percentage of Callbacks Performed as Scheduled | ... % | ... % | ... |
| Percentage of Rentals That Go Beyond Last Authorized Day | ... % | ... % | ... |

Figure 8

Rental Company Audit Report
mm/dd/yyy
Year-to-Date Statistics for Replacement Reservations Placed with Rental Companies by Insurance Company Y

|  | Rental Company 1 | Rental Company 2 | ...... | Rental Company m | Industry Average |
|---|---|---|---|---|---|
| Average Replacement Rental Length | ... | ... |  | ... | ... |
| Average Cost Per Day for All Replacement Rentals | ... | ... |  | ... | ... |
| Average Cost Per Day for Replacement Rentals within Car Class 1 | ... | ... | ...... | ... | ... |
| Average Cost Per Day for Replacement Rentals within Car Class 2 | ... | ... |  | ... | ... |
| ⋮ | ⋮ | ⋮ |  | ⋮ | ⋮ |
| Average Cost Per Day for Replacement Rentals within Car Class n | ... | ... |  | ... | ... |
| Percentage of Callbacks Performed as Scheduled | ... % | ... % | ...... | ... % | ... % |
| Percentage of Rentals That Go Beyond Last Authorized Day | ... % | ... % |  | ... % | ... % |
| ⋮ | ⋮ | ⋮ |  | ⋮ | ⋮ |

Figure 9

Insurance Company Y Audit Report
mm/dd/yyy
Year-to-Date Statistics for Reservations Managed by Insurance Company Y

| | All Groups | Adjuster Group 1 | •••• | Adjuster Group n | Industry Average | Industry Rank |
|---|---|---|---|---|---|---|
| Average Replacement Rental Length | ... | ... | | ... | ... | ... |
| Average Number of Reservations Managed Per Week | ... | ... | | ... | ... | ... |
| Average Replacement Rental Cost | ... | ... | | ... | ... | ... |
| Average Amount of Initial Authorized Number of Days Per Replacement Rental | ... | ... | | ... | ... | ... |
| Average Amount of Total Authorized Number of Days Per Replacement Rental | ... | ... | | ... | ... | ... |
| Average Extension Amount per Replacement Rental | ... | ... | | ... | ... | ... |
| Average Extension Amount per Extension | ... | ... | •••• | ... | ... | ... |
| Percentage of Rentals that Go Beyond Last Authorized Day (for All Disabled Vehicles) | ... % | ... % | | ... % | ... % | ... |
| Percentage of Rentals that Go Beyond Last Authorized Day (for Driveable Vehicles) | ... % | ... % | | ... % | ... % | ... |
| Percentage of Rentals that Go Beyond Last Authorized Day (for Nondriveable Vehicles) | ... % | ... % | | ... % | ... % | ... |
| Percentage of Rentals that End 1 Day Prior to Last Authorized Day | ... % | ... % | | ... % | ... % | ... |
| Percentage of Rentals that End 2 Days Prior to Last Authorized Day | ... % | ... % | | ... % | ... % | ... |
| ⋮ | | | | | | |
| Percentage of Rentals that End 7 Days Prior to Last Authorized Day | ... % | ... % | •••• | ... % | ... % | ... |
| ⋮ | | | | | | |

Insurance Company Y Audit Report
mm/dd/yyy
Year-to-Date Statistics for Reservations Managed by Insurance Company Y

⋮

ADJUSTER GROUP 1:

| | Adjuster 1 | Adjuster 2 | •••• | Adjuster n | Group Total | Group Rank |
|---|---|---|---|---|---|---|
| Average Replacement Rental Length | ... | ... | | ... | ... | ... |
| Average Number of Reservations Managed Per Week | ... | ... | | ... | ... | ... |
| Average Replacement Rental Cost | ... | ... | | ... | ... | ... |
| Average Amount of Initial Authorized Number of Days Per Replacement Rental | ... | ... | | ... | ... | ... |
| Average Amount of Total Authorized Number of Days Per Replacement Rental | ... | ... | •••• | ... | ... | ... |
| Average Extension Amount per Replacement Rental | ... | ... | | ... | ... | ... |
| Average Extension Amount per Extension | ... | ... | | ... | ... | ... |
| Percentage of Rentals that Go Beyond Last Authorized Day (for All Disabled Vehicles) | ... % | ... % | | ... % | ... % | ... |
| Percentage of Rentals that Go Beyond Last Authorized Day (for Driveable Vehicles) | ... % | ... % | | ... % | ... % | ... |
| Percentage of Rentals that Go Beyond Last Authorized Day (for Nondriveable Vehicles) | ... % | ... % | | ... % | ... % | ... |
| Percentage of Rentals that End 1 Day Prior to Last Authorized Day | ... % | ... % | | ... % | ... % | ... |
| Percentage of Rentals that End 2 Days Prior to Last Authorized Day | ... % | ... % | | ... % | ... % | ... |
| ⋮ | | | | | | |
| Percentage of Rentals that End 7 Days Prior to Last Authorized Day | ... % | ... % | •••• | ... % | ... % | ... |

Insurance Company Y Audit Report
mm/dd/yyy
Year-to-Date Statistics for Reservations Managed by Insurance Company Y

⋮

ADJUSTER GROUP n:

| | Adjuster 1 | Adjuster 2 | •••• | Adjuster n | Group Total | Group Rank |
|---|---|---|---|---|---|---|
| Average Replacement Rental Length | ... | ... | | ... | ... | ... |
| Average Number of Reservations Managed Per Week | ... | ... | | ... | ... | ... |
| Average Replacement Rental Cost | ... | ... | | ... | ... | ... |
| Average Amount of Initial Authorized Number of Days Per Replacement Rental | ... | ... | | ... | ... | ... |
| Average Amount of Total Authorized Number of Days Per Replacement Rental | ... | ... | •••• | ... | ... | ... |
| Average Extension Amount per Replacement Rental | ... | ... | | ... | ... | ... |
| Average Extension Amount per Extension | ... | ... | | ... | ... | ... |
| Percentage of Rentals that Go Beyond Last Authorized Day (for All Disabled Vehicles) | ... % | ... % | | ... % | ... % | ... |
| Percentage of Rentals that Go Beyond Last Authorized Day (for Driveable Vehicles) | ... % | ... % | | ... % | ... % | ... |
| Percentage of Rentals that Go Beyond Last Authorized Day (for Nondriveable Vehicles) | ... % | ... % | | ... % | ... % | ... |
| Percentage of Rentals that End 1 Day Prior to Last Authorized Day | ... % | ... % | | ... % | ... % | ... |
| Percentage of Rentals that End 2 Days Prior to Last Authorized Day | ... % | ... % | | ... % | ... % | ... |
| ⋮ | | | | | | |
| Percentage of Rentals that End 7 Days Prior to Last Authorized Day | ... % | ... % | •••• | ... % | ... % | ... |

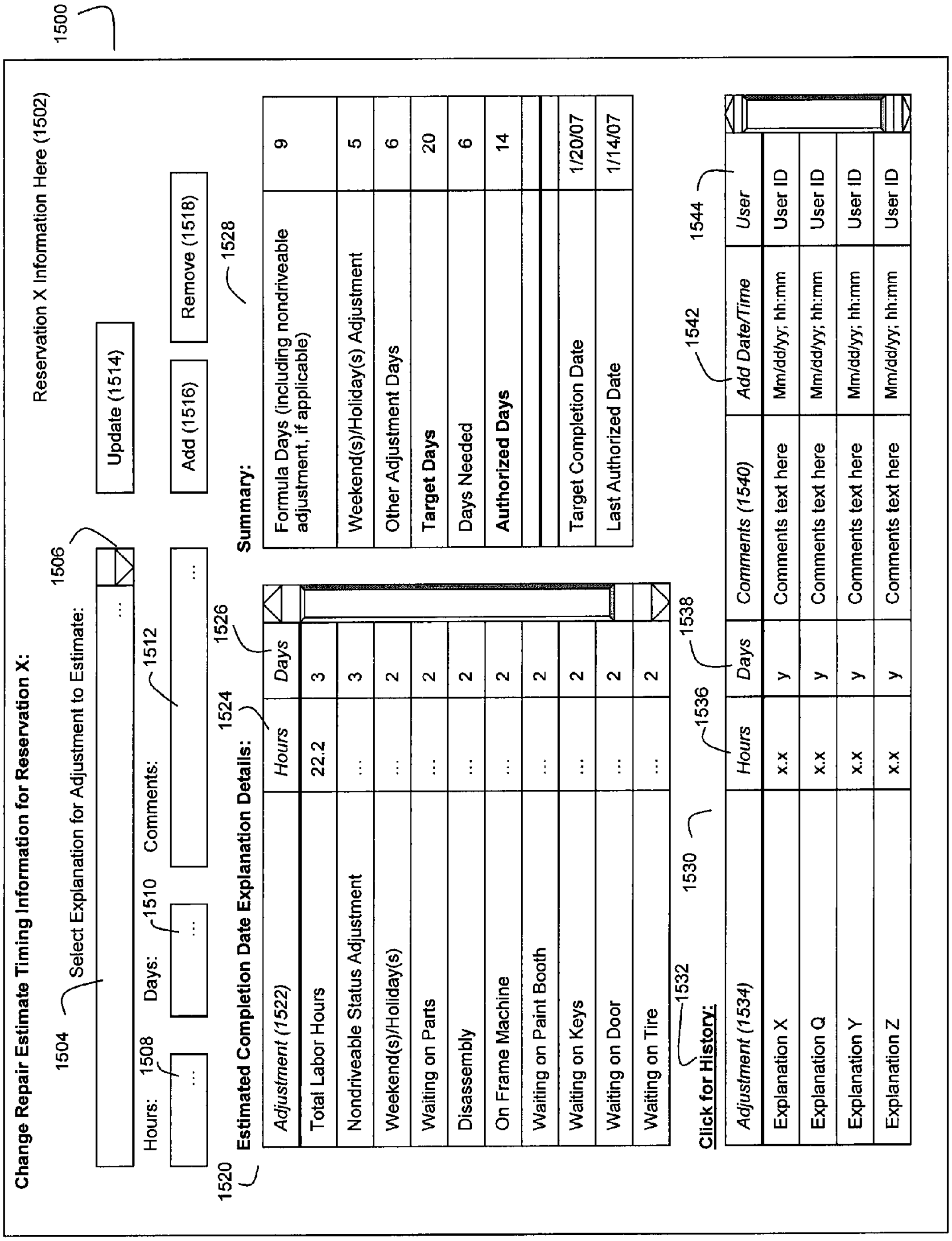

Figure 15(a)

Change Repair Estimate Timing Information for Reservation X:                                         Reservation X Information Here (1502)

1504 — Select Explanation for Adjustment to Estimate:

Hours: 1508 [...] Days: 1510 [...] Comments: 1512 [...]    1506

[Update (1514)]

1520

Estimated Completion Date Explanation Details:     1524   1526

| Adjustment (1522) | Hours | Days |
|---|---|---|
| Total Labor Hours | 22.2 | 3 |
| Nondriveable Status Adjustment | ... | 3 |
| Weekend(s)/Holiday(s) | ... | 2 |
| Waiting on Parts | ... | 2 |
| Disassembly | ... | 2 |
| On Frame Machine | ... | 2 |
| Waiting on Paint Booth | ... | 2 |
| Waiting on Keys | ... | 2 |
| Waiting on Door | ... | 2 |
| Waiting on Tire | ... | 2 |

[Add (1516)]   [Remove (1518)]    1528

Summary:

| Formula Days (including nondriveable adjustment, if applicable) | 9 |
|---|---|
| Weekend(s)/Holiday(s) Adjustment | 5 |
| Other Adjustment Days | 6 |
| **Target Days** | 20 |
| **Days Needed** | 6 |
| **Authorized Days** | 14 |
| Target Completion Date | 1/20/07 |
| Last Authorized Date | 1/14/07 |

1530

Click for History:   1532    1536   1538   1540   1542   1544

| Adjustment (1534) | Hours | Days | Comments (1540) | Add Date/Time | User |
|---|---|---|---|---|---|
| Explanation X | x.x | y | Comments text here | Mm/dd/yy; hh:mm | User ID |
| Explanation Q | x.x | y | Comments text here | Mm/dd/yy; hh:mm | User ID |
| Explanation Y | x.x | y | Comments text here | Mm/dd/yy; hh:mm | User ID |
| Explanation Z | x.x | y | Comments text here | Mm/dd/yy; hh:mm | User ID |

1500

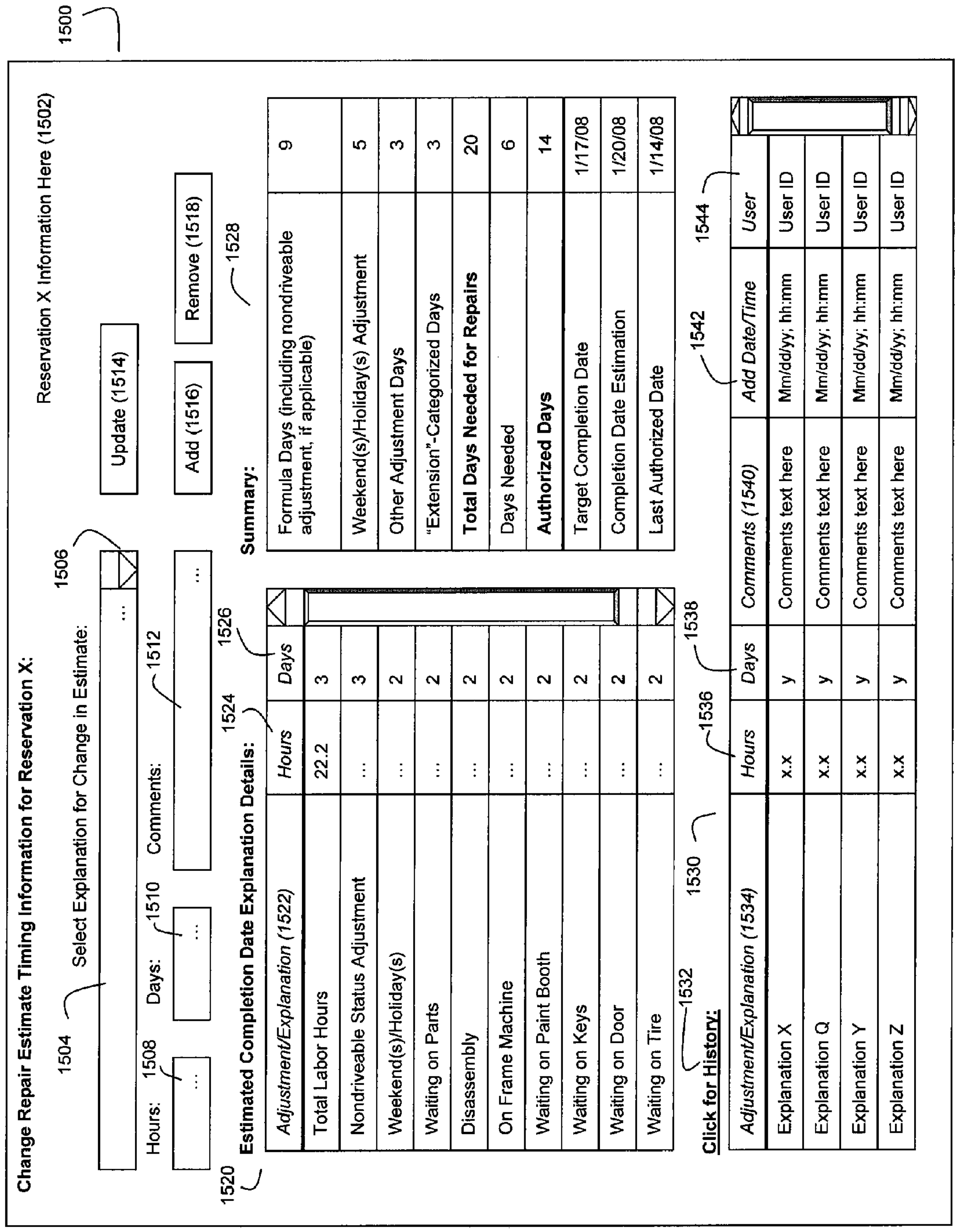

Figure 15(b)

Change Repair Estimate Timing Information for Reservation X:     Reservation X Information Here (1502)

1504 — Select Explanation for Change in Estimate:

Hours: 1508 [...]   Days: 1510 [...]   Comments: [1512 ...........]   1506 [▼]

[ Update (1514) ]

[ Add (1516) ]   [ Remove (1518) ]

1520 — Estimated Completion Date Explanation Details:   1524 1526   1528

| Adjustment/Explanation (1522) | Hours | Days |
|---|---|---|
| Total Labor Hours | 22.2 | 3 |
| Nondriveable Status Adjustment | ... | 3 |
| Weekend(s)/Holiday(s) | ... | 2 |
| Waiting on Parts | ... | 2 |
| Disassembly | ... | 2 |
| On Frame Machine | ... | 2 |
| Waiting on Paint Booth | ... | 2 |
| Waiting on Keys | ... | 2 |
| Waiting on Door | ... | 2 |
| Waiting on Tire | ... | 2 |

Summary:

| | |
|---|---|
| Formula Days (including nondriveable adjustment, if applicable) | 9 |
| Weekend(s)/Holiday(s) Adjustment | 5 |
| Other Adjustment Days | 3 |
| "Extension"-Categorized Days | 3 |
| **Total Days Needed for Repairs** | **20** |
| Days Needed | 6 |
| **Authorized Days** | **14** |
| Target Completion Date | 1/17/08 |
| Completion Date Estimation | 1/20/08 |
| Last Authorized Date | 1/14/08 |

1530 — Click for History:   1532   1536 1538   1540   1542   1544

| Adjustment/Explanation (1534) | Hours | Days | Comments (1540) | Add Date/Time | User |
|---|---|---|---|---|---|
| Explanation X | x.x | y | Comments text here | Mm/dd/yy; hh:mm | User ID |
| Explanation Q | x.x | y | Comments text here | Mm/dd/yy; hh:mm | User ID |
| Explanation Y | x.x | y | Comments text here | Mm/dd/yy; hh:mm | User ID |
| Explanation Z | x.x | y | Comments text here | Mm/dd/yy; hh:mm | User ID |

1500

| Create Reservation | Find a Customer | Action Items | Completed Actions | Reports | Admin | Help |

Choose Company

Claims Office: Office XYZ   Assigned to: All Users

Reporting: for All Users

Callbacks    For: January  2  2008     Process

To view your callback details, please select a repair facility's name:

A 3 | B 0 | C 0 | D 0 | E 0 | ...... | W 0 | X 5 | Y 0 | Z 0 | 0-9 0 | Total 25

| Repair Facility: | Telephone Number: | Number of Callbacks: |
|---|---|---|
| ABC Repair Shop | (555) 555-1234 | 3 |
| Joe's Body Shop | (555) 555-2345 | 2 |
| Repair Facility M | (555) 555-3456 | 10 |
| Repair Facility N | (555) 555-4567 | 1 |
| Repair Facility O | (555) 555-5678 | 4 |
| XYZ Auto Repairs | (555) 555-6789 | 5 |

Showing 1-6 of 6

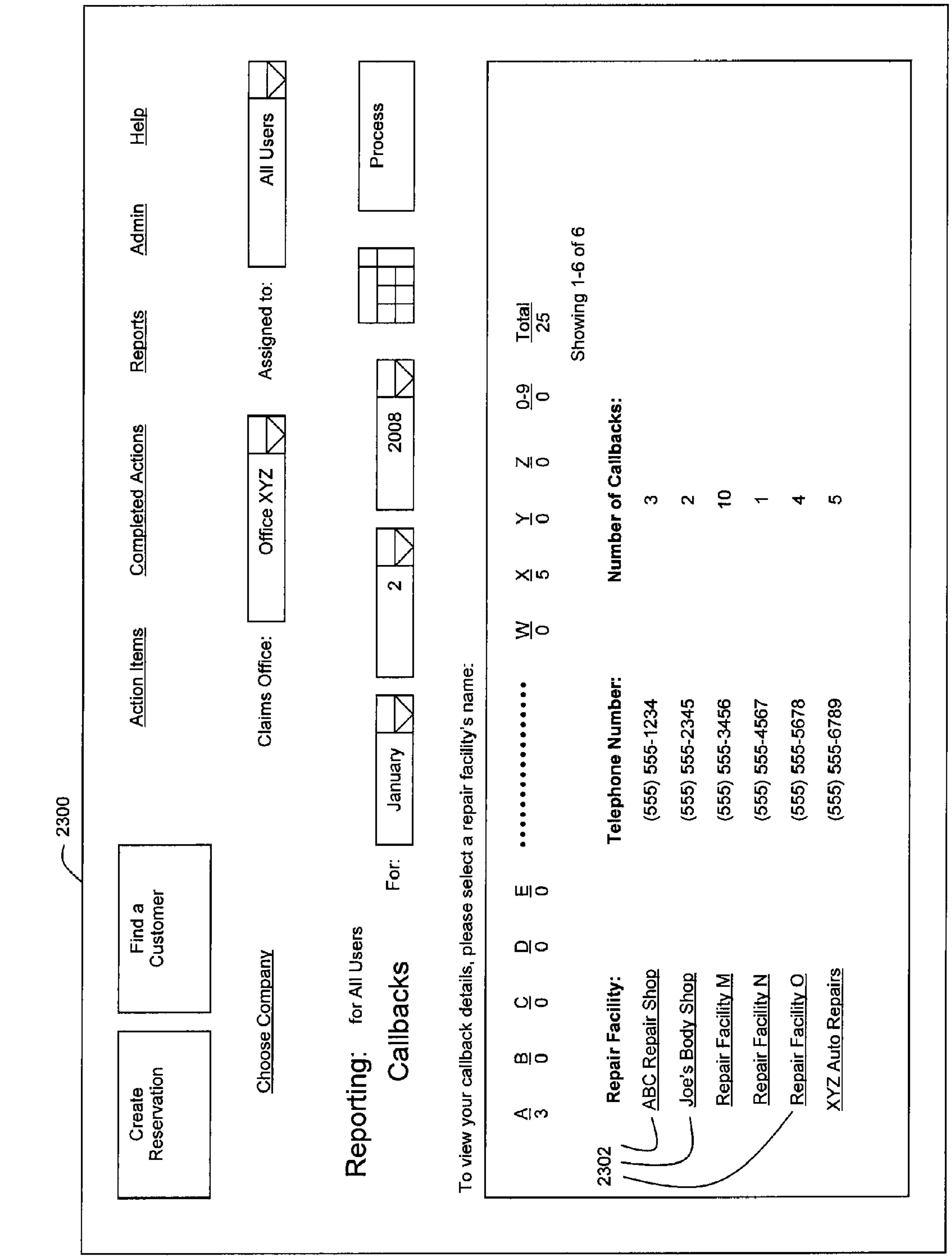

Figure 23

| Create Reservation | Find a Customer | Action Items | Completed Actions | Reports | Admin | Help |

Choose Company

ACTION ITEMS:

| Status | Action | Driver | Reservation Number | Purchaser/Reservation Manager |
|---|---|---|---|---|
| ! | Extension | J. Smith | 123456789-4321 | Insurance Company Y: J. Doe |
| ! | Reservation Auth | P. Jones | 234567890-9876 | Auto Dealer X: J. Roe |
| | | ....... | ....... | |
| ! | Extension | J.Q. Public | 987654321-1234 | Insurance Company Z: Adj Grp 5 |

2500

METHOD AND APPARATUS FOR TRACKING REPAIR FACILITY PERFORMANCE FOR REPAIRS RELATING TO REPLACEMENT RENTAL VEHICLE TRANSACTIONS

CROSS-REFERENCE AND PRIORITY CLAIM TO RELATED PATENT APPLICATIONS

This application is a continuation of pending patent application Ser. No. 12/179,071, filed Jul. 24, 2008, and entitled "System and Method for Allocating Replacement Vehicle Rental Costs Using a Virtual Bank of Repair Facility Credits", now U.S. Pat. No. 8,160,907, which claims priority to provisional patent application 60/951,889 filed Jul. 25, 2007, and entitled "System and Method for Allocating Replacement Vehicle Rental Costs Using a Virtual Bank of Repair Facility Credits", the entire disclosures of each of which are incorporated herein by reference.

This application is related to pending U.S. patent application Ser. No. 11/747,645, entitled "System and Method for Improved Rental Vehicle Reservation Management", filed May 11, 2007, the entire disclosure of which is incorporated herein by reference.

FIELD OF THE INVENTION

The present invention is generally directed toward the field of rental vehicle reservation management, particularly the management of replacement rental vehicle reservations.

BACKGROUND AND SUMMARY OF THE INVENTION

Drivers whose regular vehicles are disabled as a result of accidents or otherwise will often need to engage a rental vehicle while their regular vehicles are disabled. As the term is used herein, a vehicle may become disabled by either the driver having had an accident, thereby causing damage for a repair facility (e.g., body shop, mechanic, etc.) to fix, or by simply through mechanical failure, maintenance, or other similar desires or needs for changes requiring the custody of the vehicle to be relinquished to a repair facility. In many instances, an insurance company, automobile dealer, or fleet company will provide a rental vehicle to such drivers as part of the services provided through automobile insurance policies, dealer service policies, or fleet service policies. Such rental vehicles are referred to herein as "replacement rental vehicles" or "replacement vehicles". Replacement rental vehicles represent an important source of business for rental vehicle service providers given the large volumes of drivers whose regular vehicles become disabled (i.e., not fully operative) as a result of accidents, mechanical breakdowns, and other causes.

In this business chain, there are four primary parties—the first is the driver whose vehicle becomes disabled (thereby creating a need for a rental vehicle), the second is the purchaser of rental vehicle services who books a rental vehicle reservation on behalf of the driver (typically an insurance company, automobile dealer, etc.), the third is the rental vehicle service provider with which the purchaser books the rental vehicle reservation, and the fourth is the repair facility/body shop where the driver's disabled vehicle is repaired.

Given that the purchaser in this business chain often bears all or a portion of the costs for the rental vehicle reservation, the purchaser is highly desirous of business partners (namely, rental vehicle service providers and repair facilities) that can provide their services in a cost-efficient manner. Thus, it is desirable for rental vehicle service providers to coordinate their services with repair facilities such that drivers and purchasers can be promptly notified when repairs to the disabled vehicles have been completed and the need for the rental vehicle services have ended. By doing so, purchasers can reduce the number of instances where they unnecessarily pay for additional days of rental vehicle services, which given the high volume nature of the replacement rental vehicle business can have a significant effect on purchasers' bottom lines.

In an effort to serve the needs of purchasers, the assignee of the present invention has pioneered the development of business systems that can be used by purchasers to create and efficiently manage replacement rental vehicle reservations, as described in U.S. Pat. No. 7,275,038, pending U.S. patent application serial numbers. (1) Ser. No. 11/823,782, published as U.S. Patent Application Publication 2007/0260496, (2) Ser. No. 11/881,216, published as U.S. Patent Application Publication 2007/0271125, (3) Ser. No. 11/881,383, published as U.S. Patent Application Publication 2007/0271124, (4) Ser. No. 11/929,277, filed Oct. 30, 2007, and published as U.S. Patent Application Publication 2008/0243562, (5) Ser. No. 11/929,350, filed Oct. 30, 2007, and published as U.S. Patent Application Publication 2008/0243563, (6) Ser. No. 11/929,473, filed Oct. 30, 2007, and published as U.S. Patent Application Publication 2008/0249814, (7) Ser. No. 09/694,050, filed Oct. 20, 2000, (8) Ser. No. 10/028,073, filed Dec. 26, 2001, and published as 2003/0125992, (9) Ser. No. 10/865,116, filed Jun. 10, 2004, and published as 2005/0091087, (10) Ser. No. 11/868,266, published as U.S. Patent Application Publication 2008/0162199, (11) Ser. No. 11/550,614, published as U.S. Patent Application Publication 2008/0097798, (12) Ser. No. 11/609,844, published as U.S. Patent Application Publication 2007/0174081, (13) Ser. No. 11/747,645, published as U.S. Patent Application Publication 2008/0140460, and (14) Ser. No. 12/178,037, filed Jul. 23, 2008, and published as U.S. Patent Application Publication 2010/0023352, and PCT patent application PCT/US01/51437, filed Oct. 19, 2001, published as WO 02/067175, and for which U.S. national phase application Ser. No. 10/343,576 is currently pending. The entire disclosures of the above-referenced patent and patent applications are incorporated herein by reference.

With the preferred embodiment of the related Ser. No. 11/747,645 patent application, the inventors therein have further extended these pioneering efforts by increasing the automation with which term-related parameters of rental vehicle reservations can be managed by a computer system. As used herein, the phrase "term-related parameters" can be defined as those data elements of a rental vehicle reservation that are temporal in nature. Examples of term-related parameters for reservations whose values can be automatically computed in accordance with a preferred embodiment of the present invention include any or all of the following: (1) a target number of days (TD), which represents an estimate of the time needed by a repair facility to complete repairs to a disabled vehicle corresponding to a rental vehicle reservation, (2) a target completion date (TCD), which represents an estimation of the date on which a repair facility will complete repairs to a disabled vehicle corresponding to a rental vehicle reservation, (3) an authorization period for a rental vehicle reservation, which represents how long a purchaser has authorized a driver to rent a rental vehicle in accordance therewith, (4) a last authorized day or date (collectively, LAD) for a rental vehicle reservation, which represents the final day/date of the authorization period, and (5) a callback reminder date, which represents a scheduled date for a callback to be performed in connection with a rental vehicle reservation.

A "callback" refers to a communication to a party involved with a rental vehicle reservation to obtain information as to the status of some aspect of a rental vehicle reservation. Callbacks are typically performed at various times throughout the authorized term of a rental vehicle reservation. Callback communications can take the form of electronic data communications (emails, automated data transfers, faxes, etc.) or telephone calls. Callbacks are also preferably categorized into a plurality of different types, such as types that are defined by the recipient of the callback (e.g., repair facility callbacks, driver callbacks, purchaser callbacks, etc.). Callbacks can be performed by any of the parties involved in a rental vehicle reservation, but it is typically the case that a callback will be performed by an employee of the rental vehicle service provider (or by a computer system of the rental vehicle service provider) or by an employee of the purchaser (or by a computer system of the purchaser).

Purchasers such as insurance companies employ large numbers of personnel such as insurance adjusters to perform the day-to-day tasks of creating and managing replacement rental vehicle reservations. Among the burdens on adjusters as part of the reservation management process is deciding upon an appropriate authorization period for each rental vehicle reservation and then taking action to extend the authorization period for rental vehicle reservations as appropriate in the event of delays in repairs to the drivers' damaged vehicles. In addition to these reservation-related burdens, insurance adjusters must also perform a variety of other tasks as part of the insurance claims handling process, such as providing accurate descriptions as to the nature of loss and negotiating with insureds, claimants, and repair facilities regarding issues such as the value of loss and the repair costs. As explained hereinafter, the preferred embodiment of the present invention can greatly alleviate adjusters' rental vehicle reservation-related burdens, thereby allowing them more time to focus on other aspects of the claims process.

It is often the case that adjusters first create a rental vehicle reservation with a rental vehicle service provider before a repair facility has been able to inspect the disabled vehicle corresponding to the reservation. Thus, adjusters, when booking the reservation, will often either set an authorization period for the reservation that is only a rough estimation as to how long the driver will actually need to rent the replacement rental vehicle or set a short authorization period to account for the amount of time expected until repair estimate information becomes available. Given that the adjuster has not yet been informed by the repair facility as to how long repairs may take for the driver's disabled vehicle, such estimations will often need to be revised after the repair facility provides the adjuster with a repair estimate for the disabled vehicle. For example, it will often be the case that the repair estimate, when received, will indicate that a longer or shorter authorization period is needed. Furthermore, it may be the case that unexpected delays will occur during the repair process (e.g., parts being on backorder, etc.), in which case another need may arise to increase the authorization period for the reservation. In all of these instances, the adjuster typically needs to stay aware of how repairs are progressing for each damaged vehicle and then make a decision as to what the appropriate authorization period for the reservation should be. As explained hereinafter, the preferred embodiment of the present invention is directed toward improving and, preferably, automating this process from the adjuster's perspective.

To achieve such automation, disclosed herein as a preferred embodiment is a technique, preferably embodied by a software program, for processing vehicle repair data received from repair facilities and corresponding to rental vehicle reservations. Based on the received vehicle repair data, the software program automatically computes the TD and/or TCD for each reservation. Moreover, the software program is preferably configured to automatically update the computed TD and/or TCD values each time new vehicle repair data is received from the repair facility. The software program also preferably computes the TD and/or TCD values on the basis of a formula, wherein the terms of the formula can be defined via a set of purchaser-specific rules.

Furthermore, a software program is also preferably employed to automatically compute a new authorization period and/or LAD for a reservation based at least in part upon the computed TD and/or TCD values. In doing so, reservations can be automatically extended so that the authorization period and/or LAD therefor corresponds with the TD and/or TCD for repairs to the disabled vehicle. The software program is preferably configured to automatically update the authorization period and/or LAD each time there is a change in the TCD and/or TD. Moreover, purchaser-specific rules for automatic reservation extensions is preferably applied to each reservation by the software program to determine whether and for how long a reservation should be automatically extended.

In previous reservation management systems known to the inventors herein, reservation managers themselves have been required to mentally interpret any available vehicle repair data to mentally decide upon the appropriate values for the term-related reservation parameters. The reservation management computer system served merely to document the ultimate management decisions that were mentally reached by the reservation managers for the hundred of thousands of different reservation transactions. While various purchaser guidelines with respect to reservation management may have assisted their decision-making in this regard, reservation managers nevertheless, when using the predecessor systems, were required to fully understand such guidelines and accurately apply those guideline in vast numbers of different fact patterns.

By automating the computation of these term-related parameters for rental vehicle reservations, the preferred embodiment of the related Ser. No. 11/747,645 patent application can greatly alleviate the reservation management burdens placed on reservation management personnel such as insurance adjusters. Through automated computation of the TD and/or TCD terms, a reservation manager (such as an insurance adjuster) need not sift through various fields of vehicle repair data to estimate how long repairs to the disabled vehicle will take or communicate such as by placing telephone calls to repair facilities to learn of how various repairs are progressing. Further still, by automatically computing an authorization period and/or LAD for a reservation based on the computed TD and/or TCD terms, a reservation manager is alleviated from the burden of translating how each TD and/or TCD value affects the reservations corresponding thereto. Moreover, by configuring a software program to automatically extend rental vehicle reservations when certain conditions are met, the preferred embodiment of the present invention relieves a reservation manager from much of the extension-related burdens of managing rental vehicle reservations.

The inventors herein further disclose a new technique for allocating replacement rental vehicle reservation costs among the plurality of parties to the reservation. Typically, the purchaser (e.g., insurance company) will bear all or most of the costs for a replacement rental vehicle reservation. However, the inventors herein believe that purchasers of replacement rental vehicle services are desirous of a cost distribution policy whereby reservation costs that are attributable to delays in repair by the repair facility are allocated to the repair facility rather than the purchaser. An example of such a cost distribution policy that can be employed in a reservation management computer system is disclosed in the related Ser. No. 11/747,645 patent application.

However, the inventors herein believe that repair facilities would be desirous of a cost distribution policy that does more than merely punish repair facilities when repair delays occur. In viewing this situation from the perspective of the repair facility, the inventors herein believe a cost distribution policy which only punishes repair facilities for repair delays could be viewed as unjust by repair facilities because the policy would not reflect situations where the repair facility may have saved the purchaser money by completing repairs ahead of schedule.

In an effort to bridge the perceived desires of purchasers and repair facilities with respect to allocating costs for replacement rental vehicle reservations, the inventors herein disclose the use of a virtual bank of repair facility credits to govern how reservation costs are allocated to repair facilities in the event of repair delays. Each repair facility preferably has an account within the virtual bank. The repair facility accounts in the virtual bank preferably further has subaccounts that correspond to each purchaser for which the subject repair facility performs repair work on disabled vehicles. Within each subaccount, the virtual bank will preferably maintain a credit balance.

Credits are preferably added to a subaccount for a repair facility/purchaser pair whenever the repair facility completes repairs on a disabled vehicle for that purchaser ahead of schedule. Whether or not repairs are completed ahead of schedule can be readily determined by comparing actual reservation data (e.g., the reservation closing date, the actual completion date for repairs to the disabled vehicle, the number of bill days for the reservation, etc.) with target data for repair completion (e.g., the computed TD/TCD values discussed above). Thus, if the TCD for repairs by the repair facility with respect to a given reservation was Jan. 5, 2008, but the actual completion date for repairs with respect to that reservation was in fact Jan. 3, 2008, then a credit value of 2 days is preferably added to the subaccount's credit balance. Similarly, if the TD for repairs by the repair facility with respect to a given reservation was 10 days, but the number of bill days for the reservation was 7 days after the reservation closed, then a credit total of 3 days is preferably added to the subaccount's credit balance.

Credits preferably can be removed from a subaccount for a repair facility/purchaser pair whenever the repair facility completes repairs on a disabled vehicle for that purchaser behind schedule (which once again can be readily determined by a comparison of reservation data indicative of actual repair time and reservation data for the target repair time). For example, if the TCD for a given reservation was Jan. 1, 2008, but the actual completion date for repairs with respect to that reservation was in fact Jan. 5, 2008, then 4 credits are preferably removed from the subaccount's credit balance. In the event that the credit balance is not sufficient to accommodate the repair delays, then the repair facility is preferably charged for a portion of the reservation cost corresponding to the difference between the credit balance and the repair delay (and the subject credit balance is preferably set to zero).

Optionally, credits can be added to, or subtracted from, a subaccount for a repair facility/purchaser pair in response to data concerning a plurality of repairs, as described in detail below.

In this manner, the inventors herein believe that repair facilities will be satisfied with a cost distribution policy that reflects not only the costs accruing due to repair delays but also the cost savings resulting from completion of repairs ahead of schedule, all while still satisfying purchasers' desires to distribute costs to repair facilities when those repair facilities' delays increase the overall costs for various reservations.

In addition to easing the burdens on reservation managers, the preferred embodiment of the present invention also provides purchasers with consistency and accuracy with respect to how their reservation management policies are implemented because no longer must reservation managers independently evaluate each reservation transaction to mentally decide how the reservation's term-related parameters should be managed and how the costs for the reservation should be allocated. Instead, with the preferred embodiment, purchasers can employ a flexible set of business rules that automatically govern how a reservation's term-related parameters are set and how the reservation costs are to be allocated to repair facilities in the event of repair delays.

Further still, a software program is preferably employed to automatically schedule one or more callback reminders for a reservation in response to changes to the reservation record initiated by an update to a reservation record, such as newly received vehicle repair data. With a scheduled callback reminder, prompted on the day for which the callback reminder is scheduled, a computer system such as a rental vehicle reservation management computer system can preferably notify a user that a particular callback should be made for a reservation. A flexible set of business rules can preferably be used by the software program to automatically schedule callback reminders for specific dates and/or times. Further still, the business rules for scheduling the callback reminders can preferably be customized for any scenario and may be specifically customized for a particular purchaser. For instance, reservations being paid for by ABC insurance company may use different business rules for scheduling callback reminders than those being paid for by XYZ insurance company, depending upon the preferences of each company. In another example, the rules could preferably be customized for different repair facilities.

Such systematic callback scheduling rules are believed to offer a significant improvement to previous business systems wherein the callback reminder scheduling was made at the discretion of the employee who entered the callback reminder. Such manual calendaring of callback reminders can lead to inconsistencies. For instance, some employees would schedule a certain type of callback for 8 days after the rental start for a reservation, while others might schedule the same callback for 10 days after the rental start for a reservation. Even the same employee may through mere inadvertence or inconsistency select different callback frequencies for identical scenarios. Thus, with the automated callback scheduling feature of the preferred embodiment, proper and consistent callbacks can be made for any particular scenario.

Similarly, the inventors herein believe that purchasers will greatly benefit from employing a systematic set of rules for automatically computing term-related reservation parameters such as TCD, TD, authorization period, LAD, and/or callback reminder dates because the use of such systematic rules allows for purchasers to meaningfully audit and evaluate their business practices with respect to setting authorization periods for reservations, choosing the repair facilities to which repair work is sent, and choosing the rental vehicle service providers with which rental vehicle reservations will be booked. Thus, in accordance with another aspect of the preferred embodiment, disclosed herein is a technique, preferably embodied by a software program, for generating various types of audit reports pertaining to various aspects of the replacement rental vehicle reservation business chain. Examples of such audit reports include repair facility audit reports, rental company audit reports, and purchaser audit reports, as described in greater detail hereinafter. Through the use of such audit reports, purchasers or other interested parties can make "apples to apples"-type comparisons between data for different reservations due to the systematic business rules disclosed herein.

Further still, according to another aspect of a preferred embodiment of the present invention, disclosed herein is a technique for providing parties such as purchasers and repair facilities with a plurality of graphical user interface (GUI) screens through which they can custom-define the business rules used to automate the computation of term-related parameters and the cost allocations for the reservations with which they are involved.

While the principal advantages and features of several embodiments of the invention have been discussed above, a greater understanding of the invention including a fuller description of its other advantages and features may be attained by referring to the drawings and the detailed description of the preferred embodiment which follow.

BRIEF DESCRIPTION OF THE DRAWINGS

FIGS. 4(*a*)-(*c*) illustrate exemplary rules for automatically scheduling callback reminders for rental vehicle reservations;

FIGS. 7(*a*)-(*e*) depict an exemplary repair facility audit report that can be generated according to an aspect of an embodiment disclosed in the related Ser. No. 11/747,645 patent application;

FIG. 8 depicts an exemplary rental company audit report that can be generated according to an aspect of an embodiment disclosed in the related Ser. No. 11/747,645 patent application;

FIG. 9 depicts an exemplary multi-rental company audit report that can be generated according to an aspect of an embodiment disclosed in the related Ser. No. 11/747,645 patent application;

FIGS. 10(*a*)-(*c*) depict an exemplary insurance company audit report that can be generated according to an aspect of an embodiment disclosed in the related Ser. No. 11/747,645 patent application;

FIGS. 15(*a*) and (*b*) depict exemplary embodiments for graphical user interface (GUI) screens through which users such as repair facility personnel can submit changes in repair estimate times to a rental calculator;

FIG. 23 depicts an exemplary GUI screen for listing scheduled callback reminders;

FIG. 31(*b*) depicts an exemplary process flow by which a repair facility can earn Type 2 credits;

DETAILED DESCRIPTION OF THE PREFERRED EMBODIMENTS

Figure 1:
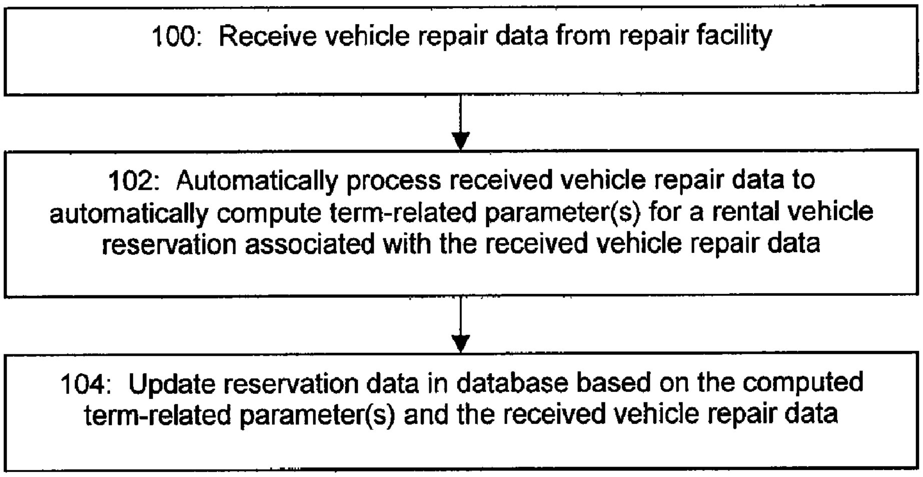
FIG. 1 depicts an exemplary process flow for automating the computation of term-related parameters for rental vehicle reservations on the basis of received vehicle repair data.

FIG. 1 depicts an exemplary process flow for automating the computation of term-related parameters for rental vehicle reservations on the basis of received vehicle repair data in accordance with an embodiment of the present invention. Preferably, the process of FIG. 1 is performed by a rental calculator, wherein the rental calculator preferably takes the form of a software program executed by a rental vehicle reservation management system, as explained in greater detail hereinafter.

At step 100, vehicle repair data is received from a repair facility. The received vehicle repair data, which corresponds to the disabled vehicle of a driver who has a replacement rental vehicle reservation, may be defined as that information regarding the various materials, processes, and/or services required to repair or otherwise restore the disabled vehicle to service. As examples, the vehicle repair data can take the form of repair estimates, repair orders, or other formats for vehicle repair status information. As should be understood in the art, many repair facilities utilize standardized formats for data contained within repair estimates and/or repair orders (e.g., the CIECA Estimate Management System (EMS) standard for data within repair estimates), and the vehicle repair data may optionally be received from repair facilities in these formats. The repair facility can communicate such vehicle repair data to the rental calculator in any of a number of ways, including but not limited to: (1) automated data transfers from the repair facility computer system to the rental calculator, (2) data entered by repair facility personnel through a GUI screen displayed on a repair facility computer system wherein the GUI screen interfaces the repair facility personnel with the rental calculator, and/or (3) emails, faxes, and/or telephone calls from repair facility personnel to personnel of a rental vehicle service provider or other entity who in turn keys the vehicle repair data included in the email/fax/telephone call into the rental calculator, etc. The above-referenced and incorporated 2008/0162199 publication describes how vehicle repair data can be automatically transferred from a repair facility computer system to a reservation management computer system. It should also be understood that the vehicle repair data can be communicated from the repair facility computer system to the rental calculator by way of information providers such as CynCast, Mitchell, Autowatch, and other entities who provide systems and services to repair facilities in connection with collision repair transactions.

At step 102, the rental calculator preferably operates to automatically process the received vehicle repair data to automatically compute at least one term-related parameter for the rental vehicle reservation corresponding to the disabled vehicle that is the subject of the received vehicle repair data. A preferred term-related parameter that is automatically computed at step 102 is the TCD for repairs to the disabled vehicle. Preferably, the length of authorization for the replacement rental vehicle reservation corresponding to the disabled vehicle will not exceed the TCD so as to minimize unnecessary rental vehicle costs for the purchaser of the replacement rental vehicle reservation. However, the rental calculator may employ purchaser-specific business rules to determine how closely the reservation's authorization length should correspond with the TCD. Thus, another preferred term-related parameter that can be automatically computed at step 102 is the authorization period and/or LAD for the replacement rental vehicle reservation. Once again, purchaser-specific rules can be employed by the rental calculator to determine a reservation's authorization period and/or LAD. Yet another term-related parameter that can be automatically computed at step 102 is a callback reminder date for a reservation. An automated callback scheduler, preferably embodied as a software program, such as that described in parent application Ser. No. 11/609,844, can be called by the rental calculator to automatically schedule callback reminders for a reservation in response to the received vehicle repair data.

It should be noted that in one embodiment, the flow of FIG. 1 from step 100 to step 102 can occur automatically. That is, following receipt of the vehicle repair data in step 100, the process proceeds to the automated computation of step 102 without human intervention. In another embodiment (e.g., as described hereinafter with respect to the GUI screen 1500 of FIGS. 15(*a*) and (*b*)), the process can proceed from step 100 to the automated computation of step 102 after intervention by a reservation manager or other party.

Following step 102, the rental calculator preferably updates a database in which the reservation data is stored to thereby reflect the newly computed term-related parameters for the reservation (step 104).

Figure 2A:
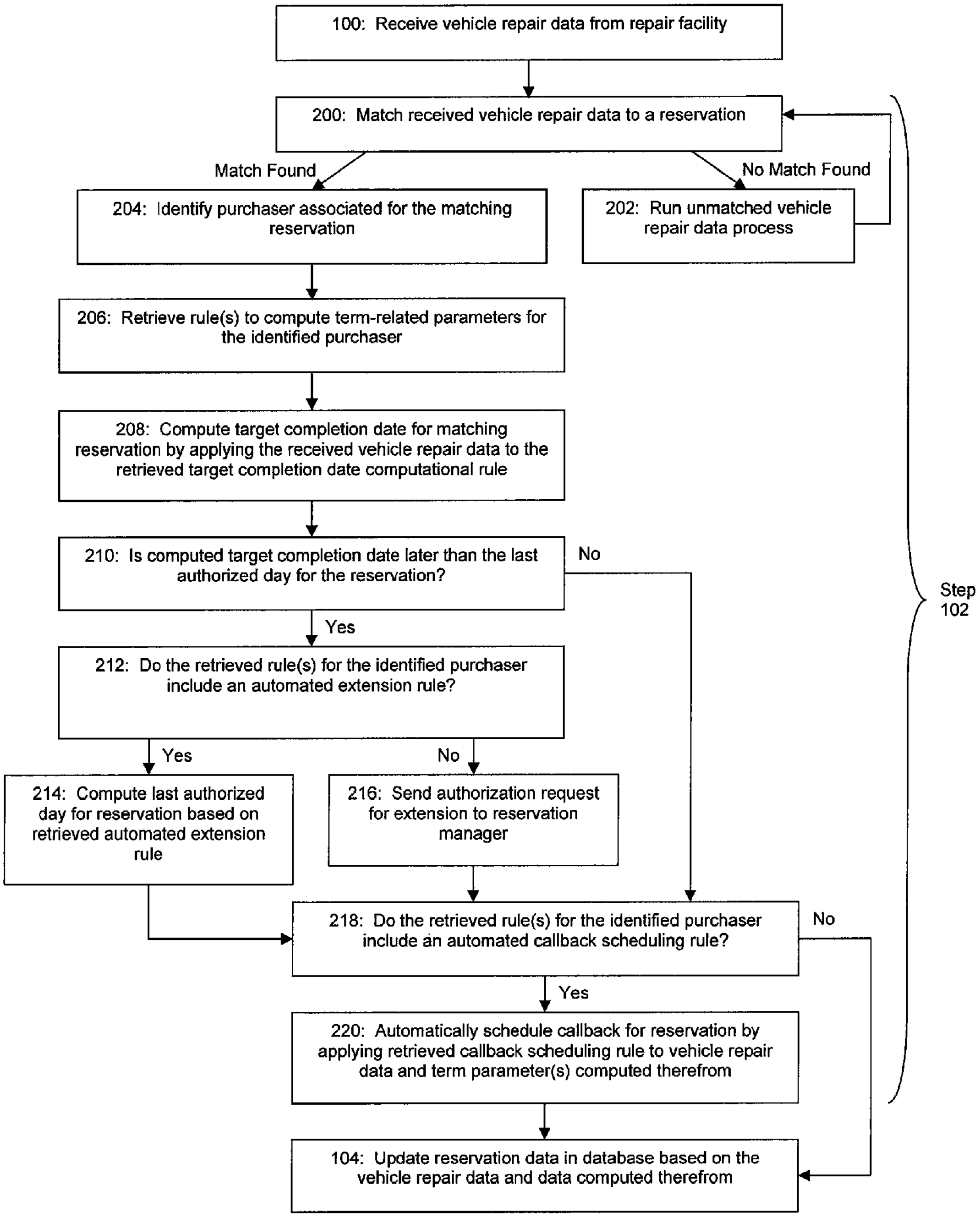
FIGS. 2(*a*) and (*b*) depicts preferred embodiments for the process flow of FIG. 1.
Figure 2B:
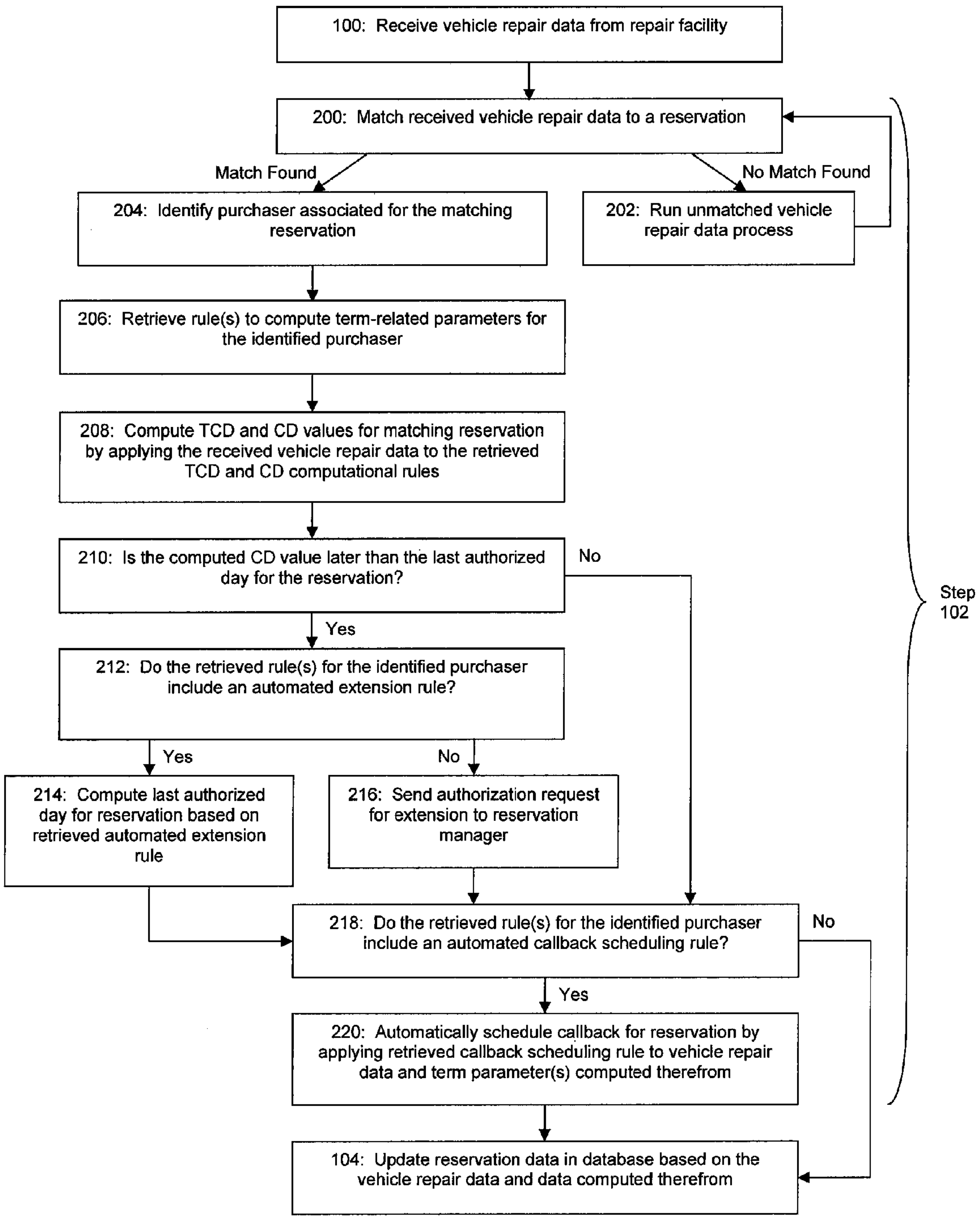

FIG. 2 depicts step 102 of FIG. 1 in greater detail. At step 200, the rental calculator attempts to match the received vehicle repair data to an existing reservation within the rental vehicle reservation management system. If no match is found, at step 202 the rental calculator preferably runs an unmatched vehicle repair data process. Preferably, this unmatched vehicle repair data process maintains a list of vehicle repair data for vehicles that do not find a match in an existing reservation. As subsequent rental vehicle reservations are created within the reservation management system in response to actions by purchasers or employees of the rental vehicle service provider, these new reservations are compared against the unmatched vehicle repair data on the list to check for matches. If a match is found at step 200, then at step 204 the rental calculator retrieves the reservation file corresponding to the received vehicle repair data and identifies the purchaser for that reservation. As should be understood, each reservation file preferably identifies the purchaser for the reservation (e.g., an insurance company, an automobile dealership, a vehicle fleet company, etc.).

The reservation management system preferably maintains a plurality of business rules that define how the term-related parameters should be computed for each purchaser. Thus, at step 206, the rental calculator preferably retrieves the business rule(s) for computing the term-related parameters that are applicable to the purchaser identified at step 204. Then, at step 208, the rental calculator processes the received vehicle repair data to compute the target number of days (TD) for the reservation in accordance with the retrieved business rules. A preferred computational formula for the term-related reservation parameter TD is:

$$TD = \lceil f(r) + WH(i, f(r), RSD) \rceil \quad (1)$$

wherein f(r) represents a function of the received vehicle repair data r, and wherein WH(i,f(r),RSD) represents a weekends and holidays adjustment as defined for the purchaser i and based on the function f(r) and the reservation start date (RSD). It should be noted that the ceiling function ⌈ . . . ⌉ can optionally be applied to each component of the TD formula rather than to the aggregation of the components, if desired. A preferred formula for f(r) is:

$$f(r) = \frac{LH}{LHS(i)} + ND(i) + A(i, r) \quad (2)$$

wherein LH represents the number of labor hours estimated by the repair facility to repair the disabled vehicle (as defined in the received vehicle repair data), wherein LHS(i) represents a labor hours scalar defined for the purchaser i, wherein ND(i) represents an adjustment for nondriveable disabled vehicles as defined for the purchaser i, and wherein A(i,r) represents other adjustments defined for the purchaser i on the basis of the received vehicle repair data r.

The value of the labor hours scalar is preferably selected to scale the number of labor hours to a number of days that will be needed to perform those labor hours on the disabled vehicle. As indicated, the value of LHS can be defined on a purchaser-by-purchaser basis. However, it should also be noted that the value of LHS can optionally be defined on a repair facility-by-repair facility basis or some combination of a purchaser and repair facility basis. Also, when first computing TD for a reservation, it should be noted that the value of A(i,r) is expected to be zero as A(i,r) is provided to serve as a term for updating the value of TD in response to events that occur throughout the repair process.

TD is preferably expressed as an integer, preferably in units of days. However, it should be noted that other units (e.g., hours) could be used. The value for TCD can be readily computed from TD by adding the computed TD value to the RSD.

Thus, if a repair facility initially estimates that 48 labor hours would be needed to complete repairs to a given disabled vehicle, and if the labor hours scalar for the applicable purchaser is 6, then the LH/LHS component of TD will result in a need for 8 days.

Further still, a purchaser may want to further adjust the TD value based on whether the disabled vehicle is driveable or nondriveable. Reservations corresponding to nondriveable disabled vehicles will typically be of a longer duration than reservations corresponding to driveable disabled vehicles. One reason for this circumstance is that a driver of a nondriveable disabled vehicle will need to pick up his/her replacement rental vehicle immediately because of the nondriveable nature of his/her disabled vehicle. Thus, the driver's replacement rental vehicle reservation will have started even though the repair facility may have not yet ordered and/or received the parts necessary to repair the nondriveable disabled vehicle. With a driveable disabled vehicle, however, the driver can often wait to take the disabled vehicle into the repair facility for repairs until after the repair facility has ordered and received the parts necessary to perform the necessary repairs. In such cases, the lag time for a repair facility to order and receive parts is often not included in the reservation duration for driveable vehicles, while such a lag time is often included in the reservation duration for nondriveable vehicles. Thus, continuing with the example, it will be assumed that the driver's disabled vehicle is nondriveable, and the purchaser's defined nondriveable adjustment is 3 days. Thus, the f(r) component of TD will initially compute to a value of 11 days (as explained, the value of the A(i,r) term during the initial TD computation is likely zero).

Furthermore, given that 11 days is longer than a week, this time span must include at least one weekend and possibly one or more holidays. Thus, depending on how the purchaser defines a weekends and holidays adjustment, then additional days may be added to TD. It should be noted that purchasers can define the weekends and holidays adjustment values on a repair facility-by-repair facility basis to match the repair facilities' business practices, if desired. Furthermore, it should be noted that the rental calculator preferably also computes the weekends and holidays adjustment based on the RSD to account for reservation time spans that encompass weekends and/or holidays. For example, if the RSD is Dec. 31, 2007, and it is assumed for purposes of this example that Dec. 31, 2007 falls on a Thursday, then a value of 11 days from f(r) will encompass three weekends (January 2-3, January 9-10, and January 16-17) and two holidays (New Years and MLK Day—January 1 and the third Monday in January, respectively). In such a circumstance, the weekends and holidays adjustment may need to account for the three weekends (rather than just a single weekend) and the two holidays. Therefore, continuing with the example wherein the RSD is Thursday, Dec. 31, 2007, if the purchaser adds two days to TD for each weekend spanned by the f(r) amount and one day for both the New Years and MLK day holidays, then WH(i,8,12/31/2007) would be 8. This, in turn, increases the value of TD to 19. Therefore, with a TD value of 19, the TCD would fall 19 days after the RSD, for a TCD of Jan. 19, 2008.

At step 210, the rental calculator then compares the TCD with the LAD for the reservation to determine whether the TCD falls on a date after the LAD. If the TCD falls before the LAD, then no extensions need to be made to the reservation, and the rental calculator proceeds to step 218, described hereinafter. However, if the TCD falls after the LAD, then it may be necessary to extend the reservation to accommodate the fact that the driver's disabled vehicle may not be ready for pick up at the repair facility until after the reservation has ended. Thus, at step 212, the rental calculator preferably checks the retrieved rules for the purchaser to identify whether the purchaser has authorized automated extensions in the event of shortfalls in the LAD relative to the TCD. If the purchaser has authorized automated extensions in such circumstances, then at step 214 the rental calculator automatically computes the LAD value for the reservation based on the automated extension rule for the purchaser. While the automated extension rules can be based on multiple variables, it is expected that in many situations a purchaser will want to automatically extend the reservation to the TCD, in which case the LAD value for the reservation is populated with the TCD value computed at step 210. If the purchaser has not authorized automated extensions, then at step 216 the rental calculator preferably instructs the reservation management system to send an authorization request for an extension to the reservation manager (e.g. an insurance adjuster for an insurance company purchaser or a rental company employee who has been tasked with some aspect of managing the subject reservation). This authorization request preferably informs the reservation manager of the difference between the TCD and the LAD and asks the reservation manager to extend the reservation as appropriate.

At step 218, the rental calculator checks whether the retrieved rules for the purchaser include any automated callback scheduling rules. If the purchaser does not have any automated callback scheduling rules, then the rental calculator preferably proceeds to step 104, where the updated TCD (and possibly LAD) data is stored in the database for the reservation. Otherwise, the rental calculator proceeds to step 220. At step 220, the rental calculator calls an automated callback scheduler such as the one described in parent application Ser. No. 11/609,844 to automatically schedule at least one callback reminder for the reservation by applying the applicable callback scheduling rules to the computed TCD value (and possibly the computed LAD value) and/or the received vehicle repair data. The scheduled callback reminder(s) can also be stored for the reservation in the database at step 104.

Now, assume that 4 days after the RSD, new vehicle repair data is received from the repair facility at step 100, wherein the new vehicle repair data indicates that an additional time should be added to the TCD because of some explanation for delay in repairs (e.g., a parts supplier has informed the repair facility that a part needed for the repairs is on backorder). In such a case, the rental calculator will process the newly received vehicle repair data r as shown in FIG. 2. At step 208, it should be noted that the value of the A(i,r) term in the formula for TD will no longer be zero. In this example, the value of A(i,r) would be derived from the newly received vehicle repair data r (e.g., a derived value of 2 days). Thus, the new TCD for the reservation would be Jan. 21, 2007. Presuming that the LAD was changed to Jan. 19, 2007 as a result of processing the initially received vehicle repair data, then steps 210-216 preferably operate to adjust the LAD by an additional two days, and steps 218-220 preferably operate to adjust the scheduled callback reminders as appropriate. This process is preferably automatically repeated each time that new vehicle repair data is received from a repair facility at step 100.

By automating the processes performed by the rental calculator in FIG. 2, the inventors herein believe that the burdens placed on personnel such as insurance adjusters to manage replacement rental vehicle reservations can be greatly alleviated, thereby providing significant improvement in efficiency to purchasers such as insurance companies.

Figure 3A:
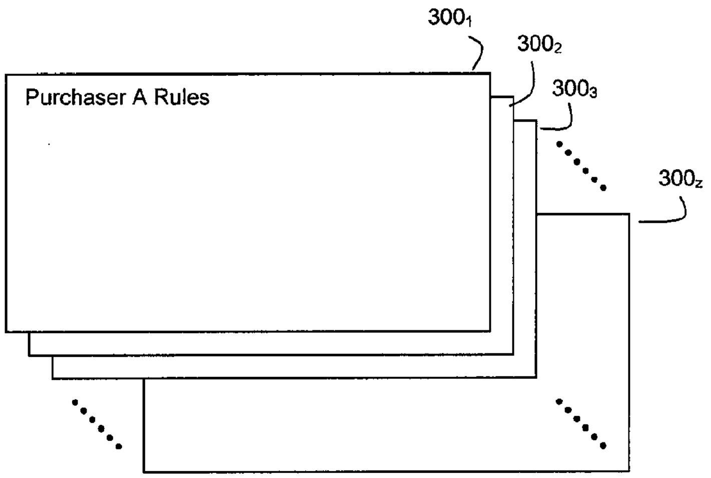
FIGS. 3(*a*)-(*e*) illustrate exemplary rules for computing term-related parameters for rental vehicle reservations on the basis of vehicle repair data.
Figure 3B:
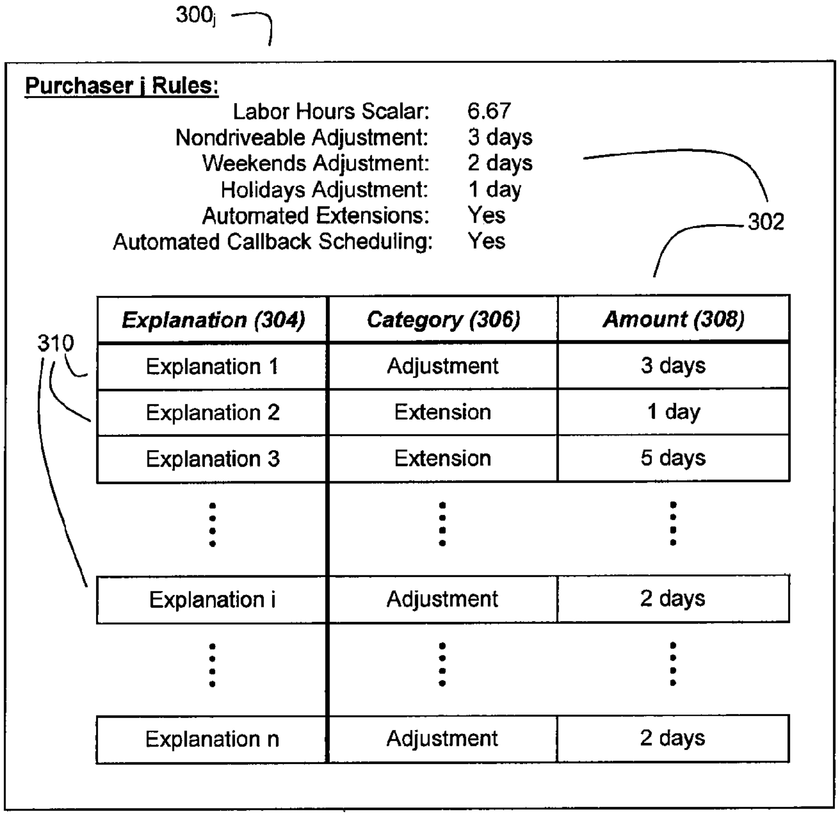

FIG. 3(*a*) depicts how the rules used by the rental calculator of FIG. 2 can be defined on a purchaser-by-purchaser basis. As shown in FIG. 3(*a*), rule set $\mathbf{300}_1$ can be applicable to purchaser A, while rule set $\mathbf{300}_2$ is applicable to purchaser B, while rule set $\mathbf{300}_3$ is applicable to purchaser C, and so on until rule set $\mathbf{300}_z$ for purchaser Z. Thus, when the rental calculator reaches step 206 for purchaser i, it can retrieve rule set $\mathbf{300}_i$ that is associated with that purchaser.

Each purchaser rule set preferably includes the rules that govern how the TCD is computed, whether/how automated extensions are to be applied, and whether/how callback reminders are to be automatically scheduled. For example, FIG. 3(*b*) depicts a rule set $\mathbf{300}_j$ for purchaser j. Rule set $\mathbf{300}_j$ preferably comprises rules 302 that (1) define the labor hours scalar (LHS) for the purchaser, (2) define the nondriveable adjustment (ND) for the purchaser, (3) define the weekend portion of the weekends/holidays adjustment (WH) for the purchaser, (4) define the holiday portion of the weekends/holidays adjustment (WH) for the purchaser, (5) define whether and how automated extensions are to be carried out for the purchaser, (6) whether and how callbacks are to be automatically scheduled for the purchaser, and (7) define how the other adjustments (A) are to be computed for the purchaser.

For the purpose of computing the other adjustments (A) values, rules 302 preferably include rules tables such as that shown in FIG. 3(*b*). This table preferably includes a column corresponding to an explanation/reason 304 for a change in the TD estimate (e.g., "waiting on parts", "disassembly", "waiting on tires", etc.). Optionally, these explanations/reasons can correspond to the standardized CIECA status update message codes as well as other pre-defined explanations for repair status updates. For each listed explanation/reason 310, the table preferably defines an amount of delay 308 for that explanation/reason. The value in amount column 308 preferably serves as the value for A in the f(r) function of equation (2) when the repair facility provides the corresponding explanation/reason 310.

Optionally, the table also includes a category column 306 that defines whether each listed explanation/reason 310 is to be treated as an adjustment or an extension. If treated as an adjustment, the amount 308 corresponding to the explanation/reason 310 is preferably included in the A term for f(r) to adjust the target number of days. If treated as an extension, the amount 308 corresponding to the explanation/reason 310 is preferably not included in the A term for f(r), and an extension will be needed for the reservation to account for a delay in repairs due to that explanation/reason. When processing an explanation/reason 310 that is categorized as an extension rather than an adjustment, processing flow can be added to the rental calculator that will send an authorization request for an extension to the purchaser in response to the received explanations/reasons categorized as extensions, as shown in the alternate embodiment of FIG. 2(*b*). For example, a new term "Completion Date" (CD), which corresponds to the date on which the repair facility expects to complete repairs, could be computed as follows:

$$CD=\lceil f'(r)+WH(i,f'(r),RSD)\rceil \tag{3}$$

wherein f'(r) is computed as $$f'(r)=f(r)+E(i,r) \tag{4}$$

wherein E(i,r) represents the extension amount needed for the explanations categorized as "extensions" as defined by the rules 302 of FIG. 3(*b*). In the process flow of FIG. 2(*b*), step 208 preferably operates to calculate both the TCD and CD values for the reservation, but step 210 preferably compares with CD value with the LAD to determine whether an extension is needed since the TCD, in this embodiment, will not necessarily be indicative of the full amount of time that the repair facility will actually need to repair the subject disabled vehicle.

It should also be noted that the CD value could alternatively be calculated according to the formula:

$$CD=\lceil TCD+E(i,r)\rceil \tag{5}$$

in which case the weekends and holidays adjustment will remain unaffected by the explanations categorized as "extensions".

FIG. 3(*c*) depicts another exemplary rule set $\mathbf{300}_k$ for purchaser k. As can be seen, purchaser k may define different values than purchaser j for the different rules 302.

Also, it should be understood that the rules 302 within each rule set $\mathbf{300}_i$ can be repair facility-specific, as shown in FIG. 3(*d*). In the example of FIG. 3(*d*), the rule set $\mathbf{300}_x$ for purchaser x includes a plurality of different rules $\mathbf{302}_2$, $\mathbf{302}_2$, . . . $\mathbf{302}_z$, each applicable to a different repair facility. In this fashion, purchasers can tailor their computational rules to the business practices of the repair facilities at which disabled vehicles are sent for repairs. This can be particularly helpful in calibrating the rules 302 to account for the weekend and holidays policies of different repair facilities (e.g., some repair facilities may work 7 days per week, others only 6 days per week, while still others only 5 days per week; and different repair facilities will often close for different holidays). Thus, at step 206 in FIG. 2, the rental calculator can not only retrieve the rule set $\mathbf{300}_i$ corresponding to the applicable purchaser i, but also retrieve the rules $\mathbf{302}_j$ within rule set $\mathbf{300}_i$ corresponding to the repair facility j from which the vehicle repair data was received.

Optionally, the rule set $\mathbf{300}_i$ can also include cost distribution rules 320 that define how the cost for a rental vehicle reservation is to be split among the different parties under various circumstances, as shown in the example of FIG. 3(*e*). The cost distribution rules 320 preferably define a plurality of payor rules for a plurality of different combinations of term-related parameter-derived conditions. Exemplary term-related parameter-derived conditions include condition 322 and condition 324 shown in FIG. 3(*e*). Condition 322 is defined by whether the repair facility in question completed its repairs within the TCD computed therefor. Condition 324 is defined by whether the driver returned the rental vehicle to the rental vehicle service provider by the LAD. Rules 320 of FIG. 320 illustrate a matrix of different permutations for these conditions coupled with their corresponding payor rules 326, 328, 330, and 332. Payor rule 326 states that the purchaser will pay 100% of the reservation cost if the repair facility completes its repairs within the TCD and if the driver returns the rental vehicle by the LAD. Payor rule 328 states that the purchaser will pay for the portion of the reservation cost that accrued up to the LAD and the driver will pay for the balance when the repair facility completes its repairs within the TCD but the driver does not return the rental vehicle until after the LAD. Payor rule 330 states that the purchaser will pay for the portion of the reservation cost that accrued up to the TCD and the repair facility will pay for the balance when the repair facility does not complete its repairs within the TCD and the driver returns the rental vehicle by the LAD. Finally, payor rule 332 states that the purchaser will pay for the portion of the reservation cost that accrued up to the TCD, the repair facility will pay for the portion of the reservation cost that accrued from the TCD to the LAD, and the driver will pay for the balance when the repair facility does not complete its repairs within the TCD and the driver does not return the rental vehicle until after the LAD.

It should be noted that the cost distribution rules 320 can also be defined on a repair facility-specific basis if desired. Furthermore, different conditions can be defined for different payor rules. For example, some repair facilities may have an arrangement with a purchaser where only delays of X number of days after the TCD will trigger reservation costs being distributed to the repair facility.

The inventors further disclose that in scenarios where a repair facility can be charged for reservation costs accruing after the TD/TCD for repairs to that reservation's corresponding disabled vehicle, a virtual bank of repair facility credits can be employed. As previously explained, many repair facilities would prefer a cost distribution policy that does more than just penalize repair facilities for failing to complete repairs to a disabled vehicle by the computed TD/TCD. A policy that merely penalizes repair facilities for such delays fails to reflect the likely many instances where a repair facility will complete repairs to a disabled vehicle prior to the computed TCD/TD. To implement a more equitable cost distribution policy that is likely to be agreeable to both purchasers (such as insurance companies) and repair facilities, the inventors disclose the virtual bank embodiment of the present invention.

Figure 28:
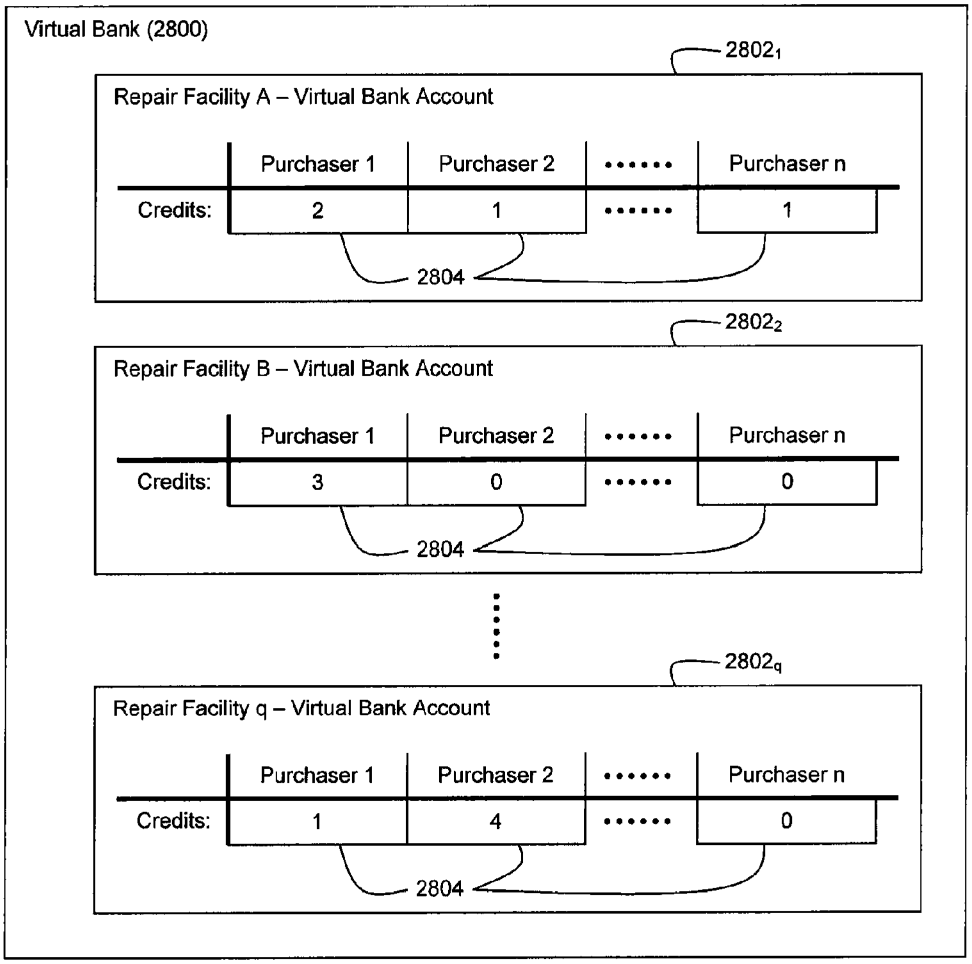
FIG. 28 depicts an exemplary virtual bank of repair facility credits in accordance with a preferred embodiment of the present invention.

FIG. 28 depicts an exemplary virtual bank 2800 of repair facility credits. The virtual bank is preferably stored in memory accessible by the rental calculator (e.g., database 1150 shown in FIGS. 11(*a*), 11(*b*), 12 and 13). However, it should be understood that the virtual bank 2800 can be stored in other locations as would be understood by those having ordinary skill in the art. The virtual bank 2800 comprises a plurality of repair facility accounts 2802$_i$. Each repair facility account 2802$_i$ is associated with a repair facility i. However, it should be noted that a plurality of different repair facilities can share a single account 2802. This may be desirable in instances where different repair facilities are commonly owned or where multiple repair facilities wish to pool their credits. Within each repair facility account 2802$_i$ are preferably a plurality of subaccounts 2804, each subaccount 2804 storing a credit total that reflects an amount of credits, i.e., points, for the repair facility. Preferably, each subaccount 2804 is pertinent to a different purchaser for which the subject repair facility repairs disabled vehicles, which means that each credit total has an associated repair facility/purchaser pair. Each credit total is preferably updated as set forth in connection with FIGS. 29(*a*)-(*c*). The credit totals can be expressed in units such as "days" or "currency" (e.g., U.S. dollars). In the example of FIG. 28, the credit totals 2804 are expressed in units of "days". While the term "subaccount" is used herein for ease of reference to describe the ledger entries in which the individual credit totals are stored, it should be noted that each subaccount can itself be considered an account which corresponds to a repair facility/purchaser pair.

Figure 29A:
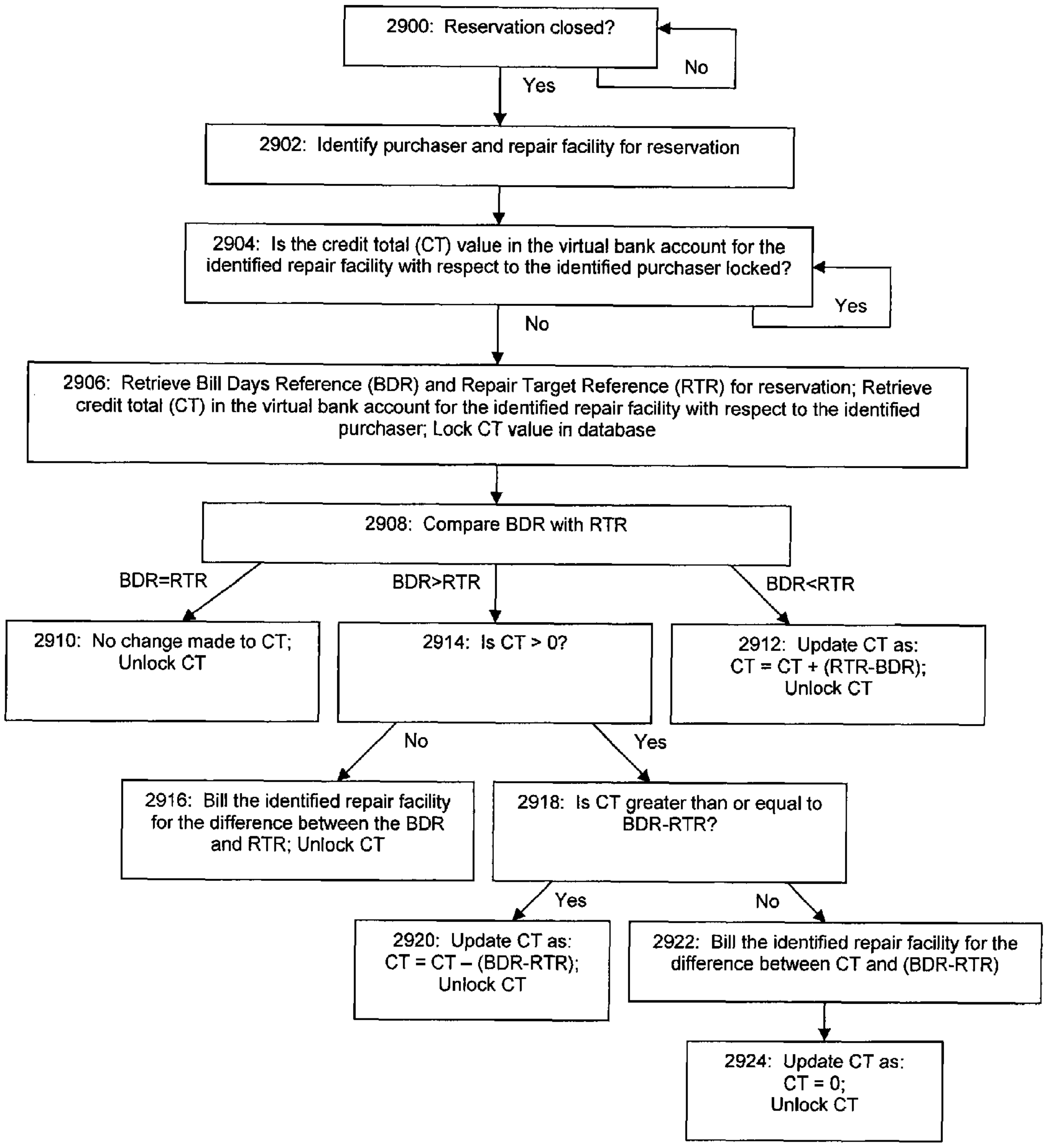
FIGS. 29(*a*)-(*c*) depict exemplary process flows for allocating replacement rental vehicle costs using a virtual bank of repair facility credits.
Figure 29B:
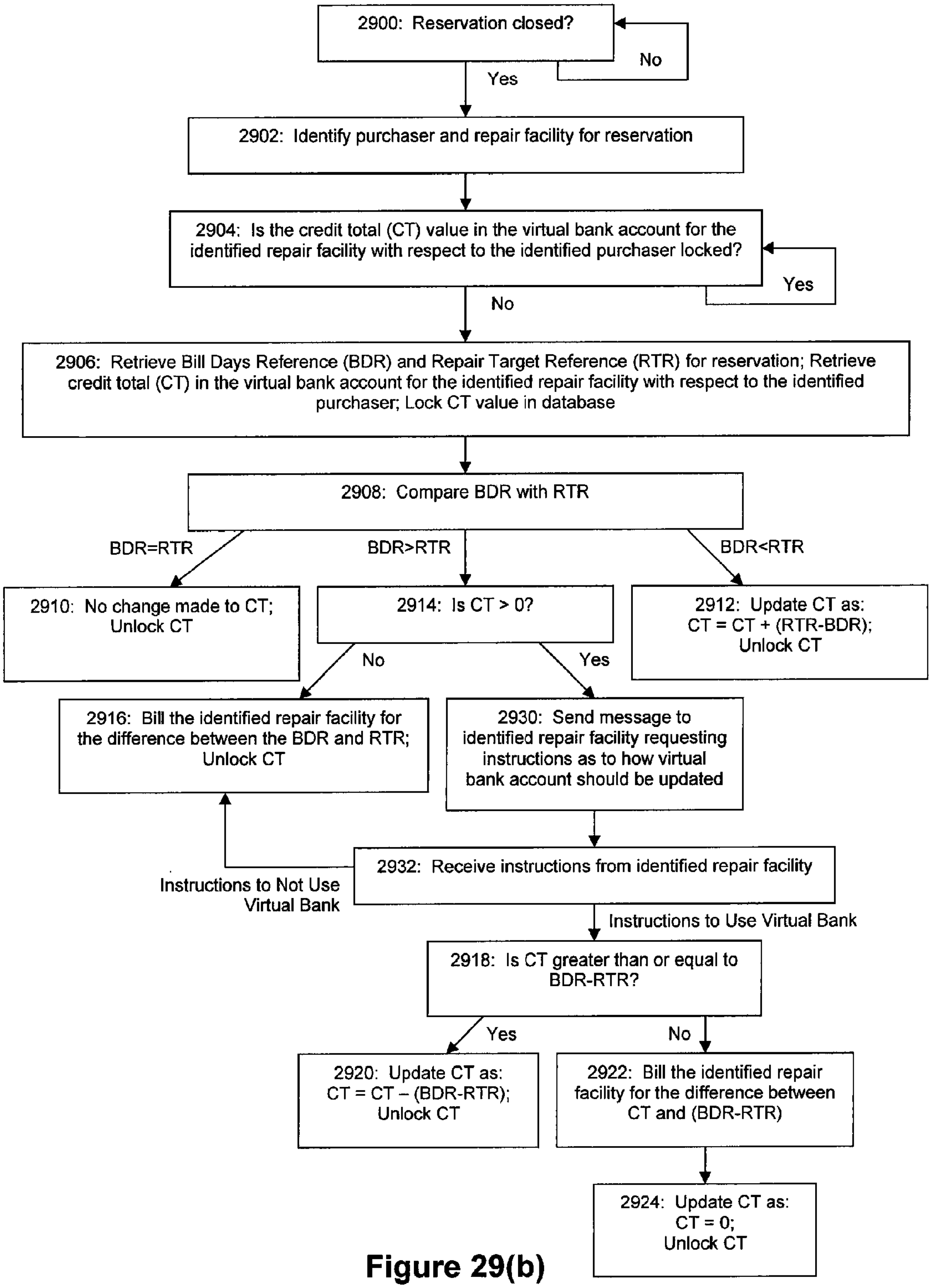
Figure 29C:
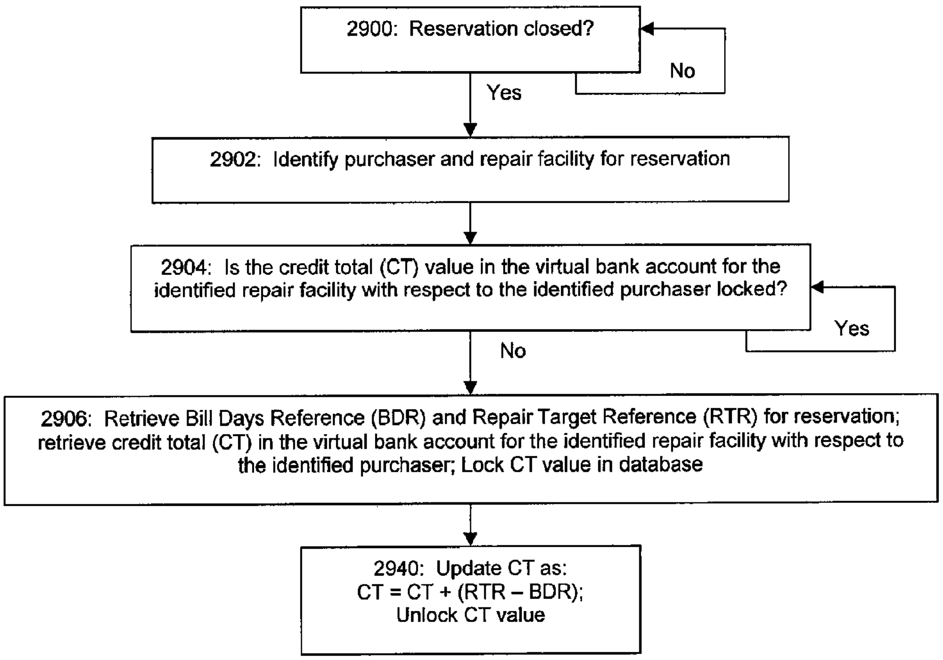

FIG. 29(*a*) illustrates a first exemplary process flow for updating virtual bank accounts and making charges thereagainst after a reservation has closed (step 2900). The closed status for a reservation can readily be determined by the system when a rental ticket closes and the reservation management computer system updates its records accordingly. However, it should also be noted that another trigger for step 2900 that can invoke the process flow of FIG. 29(*a*) (as well as FIGS. 29(*b*) and (*c*)) are situations where a reservation is still open (meaning that the driver is still in possession of the replacement vehicle), but where the reservation's LAD from the purchaser has expired. In such instances, the purchaser will likely not be liable for costs that accrue for the reservation after the LAD. Thus, expiration of an open reservation's LAD can also serve as the trigger for progressing from step 2900 to step 2902. Further still, another trigger for invoking the process flow of FIG. 29(*a*) (as well as FIGS. 29(*b*) and (*c*)) is the repair facility providing an actual completion date (ACD) for repairs to the subject disabled vehicle. Thus, a practitioner of the invention can choose to use an entry of an ACD date for repairs as the trigger by which to judge whether the repair facility completed its repairs on time and how the virtual bank should be adjusted or have charges made thereagainst. In the running example presented herein, the closing of a reservation is the trigger that is being used, as reflected in FIGS. 29(*a*)-(*c*).

Preferably, the process flow of FIG. 29(*a*) (as well as FIGS. 29(*b*) and (*c*)) is implemented by the rental calculator which can be executed by the reservation management computer system. However, it should be understood that the virtual bank process flow can be implemented by a separate software program if desired by a practitioner of the invention. Once a reservation closes, the rental time period for the reservation can be defined in any of a number of ways (e.g., as the number of bill days). Typically, the cost for the reservation will be the reservation's daily rate multiplied by the number of bill days (plus applicable taxes and surcharges).

At step 2902, the purchaser and repair facility that are applicable to the reservation are identified from the data stored for that reservation by the reservation management computer system. The identified purchaser/repair facility pair will define a particular credit total in a subaccount 2804 within the virtual bank 2800, as can be seen with respect to FIG. 28.

At step 2904, a check is made as to whether the credit total (CT) value defined by the identified purchaser/repair facility pair has been locked. Given the high volumes of reservations that the reservation management computer system may be required to process, situations may arise where two reservations close at nearly simultaneous points in time such that the reservation management computer system would attempt to update (and possibly make charges against) the same CT at the same time. One way of addressing this situation is by locking the CT value in the virtual bank database whenever it is being updated by the process flow of FIG. 29(*a*). Thus, at step 2904, the process flow will wait until the pertinent CT value is an unlocked state before proceeding to step 2906.

An alternative to the locking technique is to process reservations against the virtual bank throughout a period (e.g., a day) such that the period starts with a starting credit total for the pertinent subaccount that is equal to the credit total as it existed in that subaccount at the end of the previous period (e.g., the credit total from the end of the previous day). As reservations are processed against the subaccount throughout the period, deductions from the credit total will be made in real-time starting from the starting credit total, but additions to the credit total that may have occurred during that period will not be reflected in the credit total until the start of the next period. Then, at the end of each period, an appropriate credit total can be written into the pertinent subaccount in the virtual bank database including any credit additions that may have occurred. For example, assume that Subaccount X has a total of 5 credits at the start of the day on Jan. 10, 2008, and that 5 reservations applicable to Subaccount X close on Jan. 10, 2008. The first reservation is processed to find that the credit total should be increased by 2 days. However, these 2 days of credit will not be available for making charges thereagainst until the next day. The second reservation is processed to find that the credit total should be decreased by 2 days, thereby causing the available credit total for the day to become 3 days. The third reservation is processed to find that the credit total should be increased by 3 days. However, once against these 3 credits will not be available for making charges thereagainst until the next day. The fourth reservation is processed to find that the credit total should be decreased by 2 days, thereby resulting in the available credit total for the day dropping to 1 credit. If the fifth reservation is processed to find that 3 credits are needed to accommodate a repair delay, then the repair facility would be charged for a cost corresponding to 2 days, and the available credit total would fall to zero. Then, at the end of the day, the 5 days that were earned as credits will be added back to the subaccount such that they are available for charges thereagainst during the next day (Jan. 11, 2008).

Further still, it should be noted that adjustments to a credit total in the subaccount can also be made during periodic batch processing rather than occurring throughout the day as reservations close. In this manner, at the end of a period (e.g., overnight), all of the reservations that closed during that period can be processed to determine how the credit total should be adjusted (both in the positive and negative directions) and whether any charges should be made against the credit total.

At step 2906, the process flow operates to retrieve a Bill Days Reference (BDR) and a Repair Target Reference (RTR) for the closed reservation. The BDR serves as a reference point for assessing the rental period for the reservation against which the repair facility's performance will be measured. The BDR can take any of a number of forms, such as the number of bill days for the closed reservation, the date on which the reservation was closed, the LAD (in circumstances where the LAD expired while the reservation was still open), and the actual completion date (ACD) for the repair facility's performance of repairs on the disabled vehicle corresponding to the reservation, any of which should be readily accessible as part of the data stored by the reservation management computer system for each reservation. The RTR serves as a reference point for assessing the time period during which the repair facility was expected to complete repairs to the disabled vehicle. The RTR can take any of a number of forms, such as the most recently computed TD or TCD values for the disabled vehicle. In the running example herein, the BDR will be the number of bill days for the reservation and the RTR will be the computed TD value. Step 2906 also preferably operates to retrieve the CT in the virtual bank account 2802 for the identified repair facility and the identified purchaser. This CT value in the virtual bank database is also preferably locked at step 2906. However, as noted above, the system can also operate to update the stored credit totals only at the end of a period after all of that period's reservations have been processed.

Next, at step 2908, the process flow compares the retrieved BDR value with the retrieved RTR value. Preferably, this comparison is a subtraction operation that computes a difference value as (BDR−RTR).

If BDR=RTR, this means that the repair facility completed its repairs corresponding to the subject reservation as scheduled. In such instances, the CT value will not be adjusted, either up or down, as shown at step 2910 (and wherein the subject CT entry in the database is unlocked).

If BDR<RTR, this means that the repair facility completed its repairs corresponding to the subject reservation ahead of schedule. In such instances, the credit balance in the virtual bank subaccount 2804 for that repair facility as against the identified purchaser will be increased by an amount corresponding to the difference between BDR and RTR. As shown at step 2912, the CT value is incremented by the difference between RTR and BDR (and wherein the subject CT entry in the database is unlocked).

If BDR>RTR, this means that the repair facility completed its repairs corresponding to the subject reservation behind schedule (e.g. failed to complete the repairs by the computed TD/TCD). In such instances, a decision needs to be made as to how the repair facility will be charged for this delay. To make this determination, the difference between CT and the value (BDR−RTR) can be compared to a predetermined threshold. Preferably, this threshold is zero, wherein a repair facility will be invoiced for actual payment of a portion of the reservation cost if the value CT−BDR−RTR falls below zero, and wherein the repair facility will not be invoiced for actual payment of a portion of the reservation cost if the value CT−BDR−RTR is greater than or equal to zero. While zero is the preferred threshold, it should be noted that other thresholds could be used in the practice of this embodiment of the invention.

In the embodiment of FIG. 29(*a*), the pertinent CT in the repair facility's virtual bank subaccount 2804 is automatically charged for the delay to the extent that the CT covers the delay. Any delay amount which exceeds the CT value will then be billed to the repair facility for payment in actual currency. In this manner, rather than paying for all repair delays, a repair facility need only pay for delays to the extent that those delays exceed any previous accumulations of "credits" which are earned by completing other repairs for the subject purchaser ahead of schedule.

Returning to the flow of FIG. 29(*a*), at step 2914, a check is made as to whether there is a positive balance in the subject CT. If not, then at step 2916, the repair facility is billed for an amount corresponding to the difference between the BDR and RTR (and wherein the subject CT entry in the database is unlocked). To accomplish this billing, the rental calculator can inform the billing component of the fulfillment software (e.g., the software executed by the mainframe 38 of the reservation management computer system) how the cost for a reservation is to be allocated among the different parties to the reservation. Thereafter, an invoice to the repair facility can be generated and sent to the repair facility for payment. It should also be noted that the reservation management computer system can be configured to allow for electronic invoicing and electronic payment of invoices by repair facilities.

In an embodiment where the units for CT is in terms of "days" and where the difference between BDR and RTR is measured in terms of "days", then the amount for the bill can readily be computed as the daily rate for the reservation multiplied by the difference between BDR and RTR (plus applicable taxes and surcharges).

In an embodiment where the units for CT is in terms of "currency" and where the difference between BDR and RTR is computed in terms of currency using the reservation's applicable daily rate, then the amount for the bill can readily be computed as the difference between BDR and RTR (plus applicable taxes and surcharges). Various other permutations between the possible units of measure for CTs, BDRs, and RTRs can readily be accommodated by the system.

If there is a positive balance for CT, then at step 2918, a check is made as to whether the value for CT is greater than or equal to the difference between BDR and RTR. If so, this means that the amount in CT is sufficient to cover the delay, in which case the value for CT is updated by decrementing CT by the difference between BDR and RTR (and wherein the subject CT entry in the database is unlocked). If the CT value is not enough to cover the delay, then the subject CT value is reset to zero (and wherein the subject CT entry in the database is unlocked) (step 2924), and the repair facility is billed an amount corresponding to the difference between the CT value and the value (BDR−RTR) (step 2922). This billing can be handled as explained above in connection with step 2916.

FIG. 29(*b*) depicts an alternate process flow for handling updates to the virtual bank, wherein charges against the virtual bank account are made on a case-by-case basis in response to instructions from a user of a repair facility computer. Relative to the process flow of FIG. 29(*a*), FIG. 29(*b*) adds steps 2930 and 2932 between steps 2914 and 2918. Thus, in instances where the repair facility failed to complete its repairs on time, at step 2930, a message is sent to the repair facility computer system to inform the repair facility of the delay and the repair facility's subject CT value, and to request instructions as to how the delay should be reconciled against the virtual bank account. At step 2932, the repair facility's instructions are received. If the instructions comprise instructions not to charge the delay against the virtual bank account, then the process proceeds to step 2916. If the instructions comprise instructions to charge the delay against the virtual bank account, then the process proceeds to step 2918.

FIG. 29(*c*) depicts yet another alternate process flow for handling updates to the virtual bank. The flow of FIG. 29(*c*) is based on there being a periodic reconciliation of the CT balance in the virtual bank account. Examples of such periodic reconciliations include end-of-month reconciliation, end-of-week reconciliation, end-of-day reconciliation, end-of-quarter reconciliation, end-of-year reconciliation, etc. At the end of the pertinent period, a repair facility would be billed for any negative CT balances. Optionally, a repair facility could also be paid some specified amount for any positive CT balances. The flow of FIG. 29(*c*) simply keeps a running update of the subject CT as shown at step 2940, wherein CT is computed as CT=CT+(RTR−BDR) for each closed reservation.

It should also be noted that an exemplary embodiment of the system can also create a log record in database 1150 that tracks each adjustment to a CT value and ties that adjustment to a particular repair, reservation, and/or insurance claim number (in instances where the purchaser is an insurance company). Such tying information should be readily available in each reservation's data record. By tracking each CT adjustment to a particular repair, reservation, or insurance claim number, the parties involved can use accounting and auditing techniques to closely track the costs for any particular repair, reservation, and/or insurance claim. Thus, steps 2912, 2920, 2924, and 2940 in FIGS. 29(*a*)-(*c*) can include an operation to update a log record to identify the particular CT adjustment being made and to tie that adjustment to a particular repair, reservation, or insurance claim number. Further still, a similar update to a log record can be made whenever a repair facility is billed as a result of a CT shortfall. As such, steps 2916 and 2922 may also include an operation to update the log record.

As explained below, the choice as to which of the process flows of FIGS. 29(*a*)-(*c*) are followed by the rental calculator can be determined by cost distribution rules 320 within the repair facility business rules 302, wherein these rules can be defined in response to input from repair facilities and/or purchasers through one or more GUI screens.

The inventors also note that if a CT balance is to be reconciled on a periodic basis (e.g., see FIG. 29(*c*)) as opposed to an event basis, the CT value can also be computed as an aggregation of multiple reservation transactions. In such a scenario, the CT value would be upwardly or downwardly adjusted based on how a repair facility has performed with respect to some threshold that is computed from a plurality of different reservation transactions (e.g., when looking at all of a repair facility's repairs in connection with replacement rental vehicle reservations and a particular purchaser over a period such as a month, did the average length of reservation extension needed during that month equal or exceed threshold X?).

Figure 34:
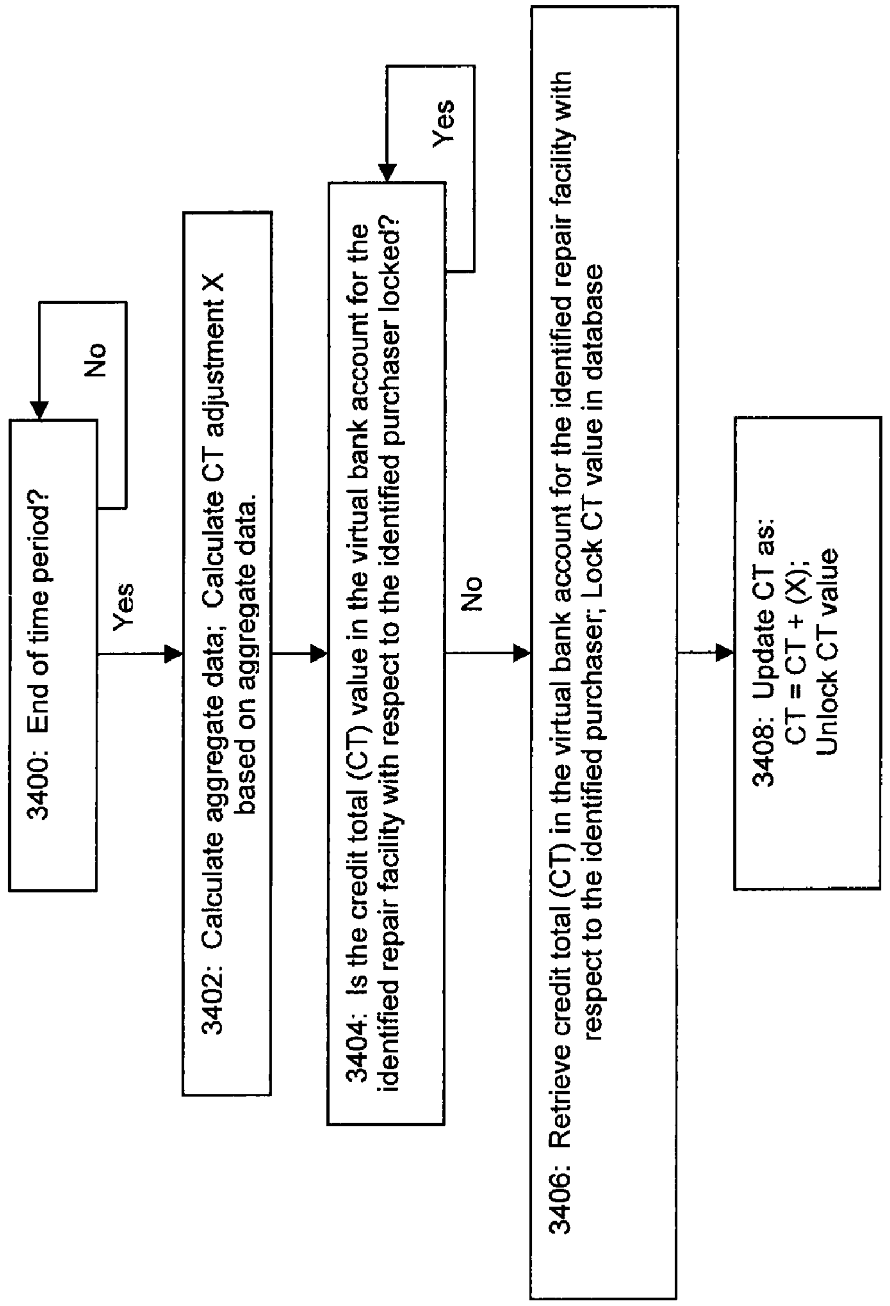
FIG. 34 depicts an exemplary flow diagram for calculating credit adjustments in an aggregate form.

FIG. 34 depicts an exemplary process flow in which credit total adjustments are made based on aggregate data for a plurality of replacement rental vehicle reservations for a given repair facility or a given virtual bank account (which may be associated with multiple repair facilities as described above). At step 3400 the system determines whether a predetermined time period has elapsed. For example, the time period may be daily, weekly, monthly, quarterly, yearly, etc. If the predetermined time period has elapsed, the system calculates aggregate data corresponding to the time period for the repair facility or virtual bank account in question. Preferably, the aggregate data can comprise any of the following data calculations:

- Average length of initial authorization period per replacement rental vehicle reservation.
- Average length of total authorization period per replacement rental vehicle reservation.
- Average number of replacement rental vehicle reservations managed each week. This value may optionally used as a precondition for the reconciliation process to run because a practitioner may want a sufficient number of transactions to occur over the reconciliation period to avoid statistical outliers having too much influence in the final adjustments.
- Average rental cost per replacement rental vehicle reservation.
- Average extension length per replacement rental vehicle reservation.
- Average extension length per extension.
- Percentage of replacement rental vehicle reservations that go beyond the LAD (for all, driveable, and nondriveable vehicles).

Percentage of replacement rental vehicle reservations that end 1, 2, . . . n days prior to the LAD (for all, driveable, and nondriveable vehicles).

It should also be understood that this aggregate data can be computed/updated on an ongoing basis throughout the reconciliation period as events occur which affect that aggregate data (e.g., recomputing the aggregate data each time a reservation closes). Alternately, the aggregate data can be computed only at the end of the reconciliation period by retrieving each pertinent reservation data record from the reconciliation period and computing the aggregate data based on those records.

Further at step 3402, the system calculates an adjustment X based on the computed aggregate data. The adjustment may be positive if the calculation is favorable to the repair facility. The adjustment may be negative if the calculation is not favorable to the repair facility. As part of this step, a particular computed aggregate value is compared against a threshold that is used as a benchmark to assess the repair facility's performance. If performance exceeds the threshold, then the CT value is preferably upwardly adjusted. If performance falls below the threshold, then the CT value is preferably downwardly adjusted.

Next, at step 3404 the system waits until the credit total CT for this virtual bank account is unlocked as described above. At step 3406, the system retrieves and locks the credit total CT for this account. At step 3408, the system updates the credit total CT by adding the adjustment X calculated at step 3404.

For example, in a non-limiting exemplary embodiment, the system calculates the average extension length per replacement rental vehicle reservation associated with a particular virtual bank account. In this exemplary embodiment, the system determines whether the average extension length per rental vehicle reservation for the reconciliation period is above a threshold, and decreases the credit total CT if the threshold is exceeded, or increases the credit total if the threshold is not exceeded. In this exemplary embodiment, the system may generate an invoice for the repair facility (or repair facilities) associated with the virtual bank account in question if the credit total falls below a predetermined threshold, as described in detail above in connection with FIGS. 29(*a*) and (*b*).

Figure 30:
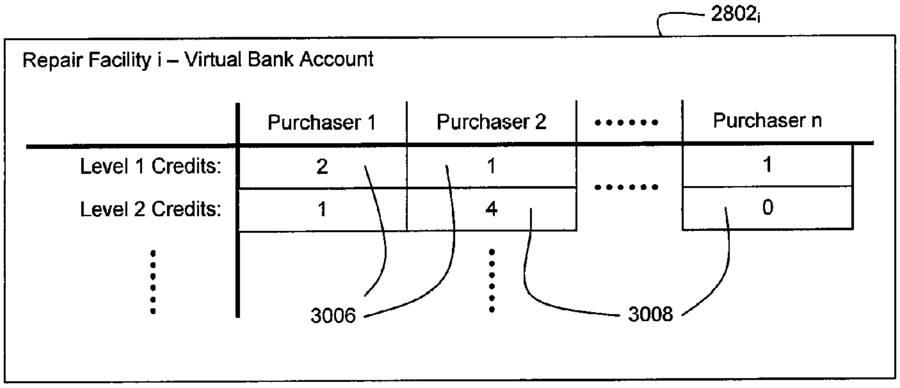
FIG. 30 depicts an exemplary alternative embodiment for a virtual bank account of repair facility credits.

It should also be noted that a repair facility's virtual bank account 2802 can optionally employ multiple levels of "credits" for different purchasers, as shown in FIG. 30. Thus, each virtual bank subaccount 2804 within an account 2802 can comprise first level credit totals 3006, second level credit totals 3008, and so on. For example, credit totals based on reservations for replacement vehicles of vehicle class "full-size" or higher can be assigned to the first level, while reservations for less expensive replacement vehicles (e.g., mid-size" or less) can be assigned to the second level. In this manner, during a reconciliation process for a closed reservation corresponding to what is considered a level "x" replacement vehicle, charges can made only against the level "x" credits (e.g., first level credits are only affected by first level reservations, and second level credits are only affected by second level reservations). Alternatively, any charges that are made against the second level credits for first level reservations can require more than a one-to-one correspondence between repair delays and second level credits (e.g., one day of delay for a luxury reservation would require expending either one first level credit or two second level credits). Thus, the embodiment of FIG. 31 envisions that each reservation is assigned a level identifier by the system so that the system can decide which level of credits in the virtual bank 2800 can be used (and how the different levels of credits are to be used) to process credits for that reservation upon closing. Furthermore, rather than assigning levels on the basis of vehicle classes, it should be noted that level distinctions can also be drawn on other criteria, such as the daily rate for the reservations (e.g., reservations having a daily rate of $50/day and above are deemed first level reservations while reservations having a daily rate less than $50/day are deemed second level reservations).

Figure 31A:
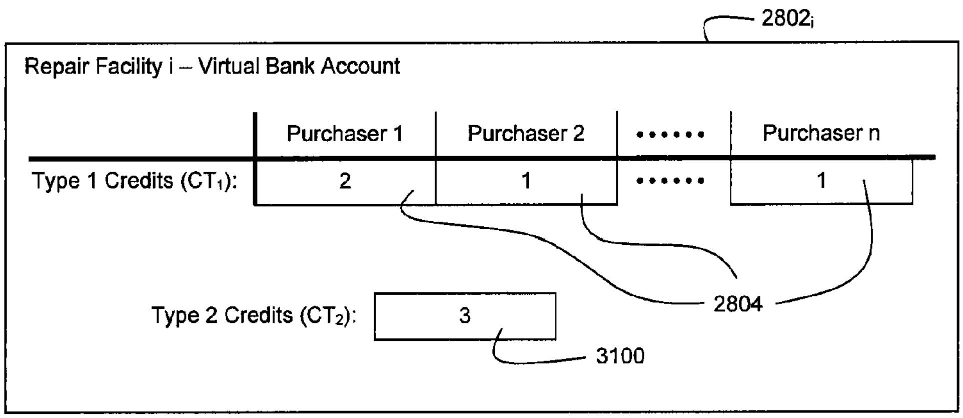
FIG. 31(*a*) depicts another exemplary alternative embodiment for a virtual bank account of repair facility credits.
Figure 31B:
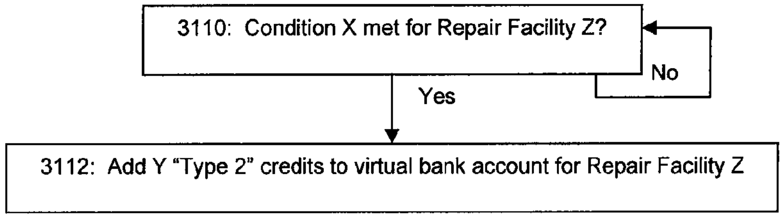

Further still, a repair facility's virtual bank account 2802 can employ different types of credits. For example, a rental vehicle service provider may provide incentives to repair facilities to refer customers to the rental vehicle service provider by offering to add credits to the repair facility's virtual bank account 2802 as a reward for such referrals. Thus, as shown in FIG. 31(*a*), a repair facility's virtual bank account can also store a balance of "Type 2" credits 3100. The total for these "Type 2" credits 3100 can be identified with the label $CT_2$. The credits in the previously-described subaccounts 2804 can thus be termed "Type 1" credits using the label $CT_1$ to refer to the total of "Type 1" credits. While "Type 1" credits are preferably applicable only to a repair facility/purchaser pair, it should be noted that "Type 2" credits are preferably applicable only to the repair facility and thus can be charged against reservations pertaining to any of the purchasers.

FIG. 31(*b*) depicts an exemplary process flow by which "Type 2" credits 3100 can be earned. If the repair facility meets some condition X as defined by the rental vehicle service provider (step 3110), then the virtual bank account for that repair facility can be updated with some amount Y of Type 2 credits. Any of a variety of different conditions can be employed. For example, condition X can be defined as some threshold number of reservations (e.g., 10) booked with the rental vehicle service provider by Repair Facility Z such that every tenth reservation booked by Repair Facility Z will cause Y number of "Type 2" credits 3100 to be added to Repair Facility Z's account. Condition X could also be defined as some threshold number of reservations booked by Repair Facility Z within a specified time period with the rental vehicle service provider. Other conditions could be expressed as dollar amounts of referrals, etc.

Figure 32:
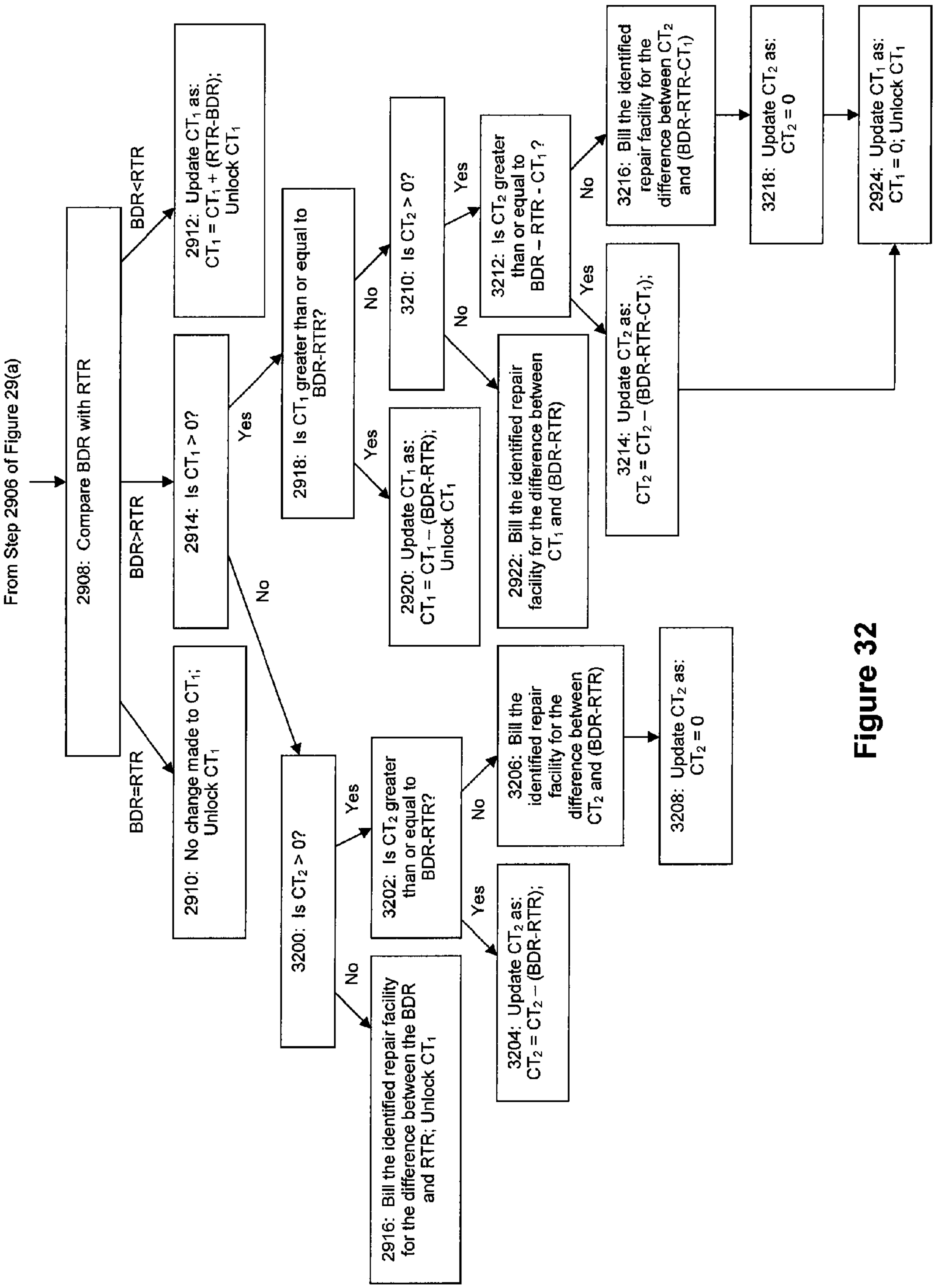
FIG. 32 depicts an exemplary process flow for allocating replacement rental vehicle costs using a virtual bank of repair facility credits as shown in connection with FIG. 31(*a*)

If a repair facility has built up a balance of "Type 2" credits, these "Type 2" credits can be "cashed in" before that repair facility would be charged for reservation costs resulting from repair delays. An example of such a process flow is shown in FIG. 32. Thus, following from step 2914 of FIG. 29(*a*), it can be seen that the process flow of FIG. 32 also performs a check against the "Type 2" credits before actually billing the repair facility for reservation costs that accrue as a result of repair delays. For example, before step 2916 is reached, the process flow at step 3200 will check whether there is a positive balance in $CT_2$. If there is, steps 3202, 3204, 3206, and 3208 can be performed which roughly correspond to steps 2918, 2920, 2922, and 2924, albeit for "Type 2" credits rather than "Type 1" credits. Similarly, before step 2922 is reached, the process flow at step 3210 will check whether there is a positive balance in $CT_2$. If there is, steps 3212, 3214, 3216, and 3218 can be performed which roughly correspond to steps 2918, 2920, 2922, and 2924, albeit for "Type 2" credits rather than "Type 1" credits and wherein the available "Type 1" credits are factored into the computations. It should be noted that in this manner, insurance companies can still avoid paying for cost overruns that result from repair delays, while repair facilities can avoid the imposition of reservation costs for such delays if they have built up a suitable supply of either or both of "Type 1" and "Type 2" credits.

It should be noted that a process flow for "Type 1" and "Type 2" credits similar in nature to the flow of FIG. 29(*b*) can also be deployed by requesting instructions from the repair facility whenever charges would need to be made against either or both of $CT_1$ and $CT_2$ to avoid the imposition of actual reservation costs. Furthermore, while the process flow of FIG. 32 shows charges being made against the Type 1 credits before charges are made against the Type 2 credits, it should be noted that the process flow can also be configured to make charges against the Type 2 credits before making charges against the Type 1 credits.

In operation, the flow of FIGS. 2(*a*) and 2(*b*) could accommodate the cost distribution rules 320 of FIG. 3(*e*) by applying these rules to the reservation data and vehicle repair data, wherein the reservation record in the database is automatically updated to reflect how costs for the reservation are to be distributed among the different parties. In this manner, the appropriate process flow from any of FIGS. 29(*a*)-(*c*) can automatically be invoked each time that a reservation closes (or the LAD for an open reservation has expired). However, it should also be noted that the appropriate process flow from FIGS. 29(*a*)-(*c*) can be invoked on a periodic basis to perform batch processing of closed reservations. For example, at a scheduled time at the end of each day, all reservations that have closed for that day can be applied to the appropriate process flow from FIGS. 29(*a*)-(*c*) to determine how the reservation costs should be allocated among the different parties.

As explained in parent application Ser. No. 11/609,844, another aspect of a preferred embodiment of the present invention is the ability to schedule callback reminders within the reservation files. The callback reminders may correspond to callbacks of any type. Exemplary types of callbacks can be defined based on the recipient of the callback, e.g., repair facility callbacks, renter (or driver) callbacks, and purchaser (or non-driver payor) callbacks. For instance, a repair facility callback may be directed to a repair facility to check on the status of a repair. As another example, a purchaser (or non-driver payor) callback may be directed to the party that has purchased the rental vehicle services or assumed the payment obligation therefor (e.g., an insurance company, automobile dealership, vehicle fleet company, etc.) to inquire about extending an authorization for a rental vehicle reservation if the LAD for a reservation is near. As still another example, a renter (or driver) callback may be directed to a driver to check on the status of the rental or to inquire about a balance due on his/her account. Each type of callback is preferably system-defined, and the callback reminders are preferably automatically generated based upon a set of business rules algorithms. The callback reminders can be displayed to a user of a reservation management system as described hereinafter, or they can be communicated to an external computer system for access by a user thereof. Such communications may optionally take the form of web service communications. A rules engine for automatically scheduling callback reminders, such as an automated callback scheduler, may be internal or external to the reservation management system so long as it is accessible thereto. Furthermore, it should be noted that the callback reminders need not be stored in the same physical database as the reservation data to which they correspond so long as the appropriate business systems can access the reservation data and scheduled callback reminders as needed.

One of the benefits of automatically scheduling callback reminders is that the automated callback scheduler can be triggered each time there is an update to the underlying rental record, as shown by way of example in the process flow of FIG. 2 wherein an update to the vehicle repair data for a reservation record can trigger the automated callback scheduler. As another example, upon detecting an update to a reservation file that indicates a renter's balance of payment is zero, an automated callback scheduler can be configured to delete any previously-scheduled renter callbacks for that reservation.

Thus, each type of callback can have a complex set of rules (or algorithm) that can be customized for a particular party (insurance company, repair facility, etc.). For example, one insurance company may want callbacks made 2 days before the end of an existing rental authorization, while another may desire 3 days advance notice. A repair facility could choose to have all repair facility callbacks be made on certain days of the week. The rules can be further customized based on a number of other variables. For instance, callbacks to check the status of repairs to a disabled vehicle could be made a specified number of days in advance of the end of an authorization depending upon whether the disabled vehicle was driveable, and further depending upon how many days exist between the last update to the callback record and the expected end of the rental. By way of another example, the rules can take into account the number of estimated repair hours the repair facility estimates will be needed.

FIG. 4(*a*) illustrates an exemplary set of callback scheduling rules $\mathbf{400}_j$ that can be defined for purchaser j. In this example, purchaser j applies one set of rules 402 to repair facility callbacks corresponding to driveable vehicles and another set of rules 404 to repair facility callbacks corresponding to nondriveable vehicles. Each rule set 402 and 404 preferably identifies a measurement trigger (the left column of the table) that defines a condition for setting a callback on a given scheduled callback date (as defined by the instruction in the right column of the table). Preferably, the scheduled callback dates are expressed relative to a callback reminder reference such as the LAD. Any of a number of different measurement triggers can be used. Moreover, it should also be noted that rules 402 may use a different measurement trigger than rules 404, if desired by a practitioner of this aspect of the invention. In the example of FIG. 4(*a*), the measurement trigger is defined as the number of days encompassed between the "last update date" (LUD) for the reservation file and the "DUD" for that reservation, wherein the DUD represents the most recently updated date of either the TCD or the current extension date authorized by the insurance company (the LAD). Depending on where this number falls within the breakdowns defined in the table, a different callback date will be scheduled.

FIG. 4(*b*) depicts another exemplary set of callback scheduling rules $\mathbf{400}_k$ for purchaser k. In the example of FIG. 4(*b*), the measurement trigger is the number of authorized days for the reservation. As with the example of FIG. 4(*a*), different rules 402 and 404 are provided for disabled vehicles that are driveable and nondriveable.

FIG. 4(*c*) depicts another exemplary set of callback scheduling rules $\mathbf{400}_q$ for purchaser q. In the example of FIG. 4(*c*), the measurement trigger is defined as the number of days encompassed between the LUD and the LAD for the reservation. Furthermore, the automated callback scheduling rules for purchaser q do not distinguish between driveable and nondriveable vehicles.

It should be appreciated that a limitless number of different algorithms can be created and entered into the automated callback scheduler, with a great deal of flexibility.

Figure 5:
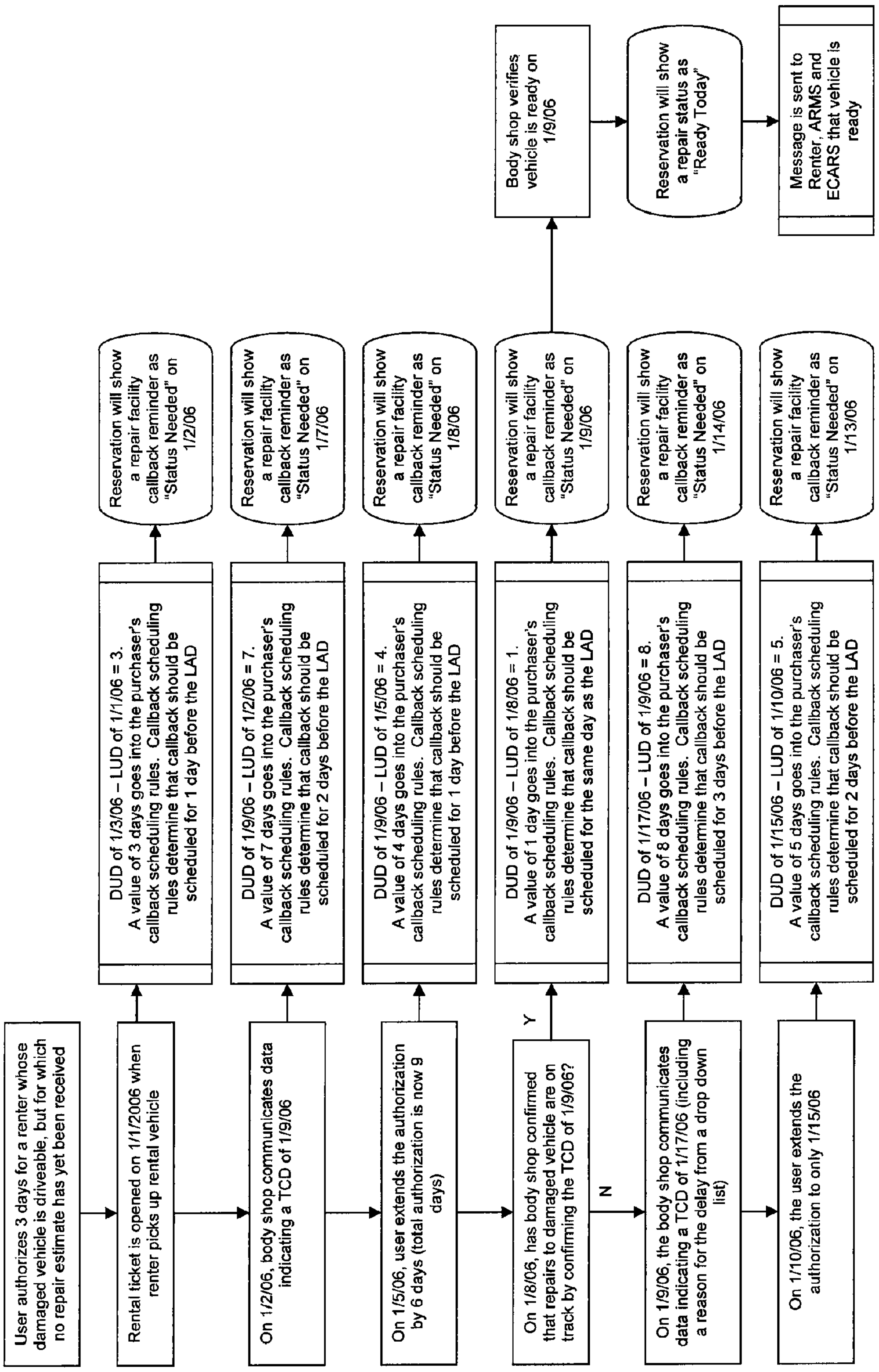
FIG. 5 depicts an exemplary process flow for automatically scheduling callback reminders on the basis of a set of callback scheduling rules.

FIG. 5 shows a sample algorithm flow for an automated callback scheduler showing both the flexibility of the automated scheduling and the ability to update the callback reminders each time a record is updated. In the process flow of FIG. 5, the automated callback scheduler will use the rule set $\mathbf{400}_j$ of FIG. 4(*a*). For each scenario the number of days between the LUD for the reservation and the DUD is computed as the measurement trigger. In the flowchart example, a purchaser such as an insurance company authorizes a rental for 3 days on 1/1 so that a repair estimate can be obtained on repairs to the renter's driveable vehicle. As the reservation record is opened, the LUD is 1/1 and the DUD is 1/3 (as defined by the LAD because the TCD is yet undefined). The number of days, inclusive, between DUD and LUD is 3, and this value is used as the measurement trigger. Referring to the driveable rules 402 of the rule set $\mathbf{400}_j$ of FIG. 4(*a*), a callback reminder is set for 1 day before the LAD, which would be 1/2. FIG. 23 illustrates an exemplary "callbacks" screen that can be displayed by a reservation management computer system to a reservation manager on 1/2, wherein the system automatically adds a repair facility callback reminder 2302 to the list of scheduled repair facility callback reminders 2302 for 1/2 as a result of the automated callback scheduling rules. Upon selection by the reservation manager of one of the repair facilities listed as a repair facility callback reminder, preferably a GUI screen is displayed that lists the reservations for which the repair facility callback is applicable. Upon selection by the reservation manager of one of these listed reservations, preferably a callback details screen is displayed. Preferably this screen includes fields such as those shown in FIG. 15(*a*) or 15(*b*) described hereinafter. Based on information learned from a repair facility as a result of the repair facility callback, the reservation manager can fill out the appropriate fields of the callback details screen, which in turn may trigger the process of FIG. 2(*a*) or 2(*b*) if the updated information contains new vehicle repair data.

Returning to the flow of FIG. 5, on 1/2 the repair facility indicates that TCD will be 1/9. If the callback for 1/2 has not yet been made, the reminder therefor would now be updated, or else a new callback reminder would be set. In either case, the updated/new callback reminder would be based on a new DUD of 1/9 (the TCD) and a new LUD of 1/2. With 7 days between the DUD and LUD, the callback reminder will be set for 2 days before the LAD, or 1/7.

On 1/5 the insurance company extends the authorization by 6 days, thereby setting the LAD to 1/9. As can be seen, in this example, the insurance company has not employed an automated extension to match the LAD to the TCD as the TCD becomes available. The automated callback scheduler processes the reservation record again and updates the callback reminder based on a new LUD value of 1/5. With 4 days between the new LUD and the DUD, the callback reminder is reset for one day before the LAD, which is 1/8.

Figure 24:
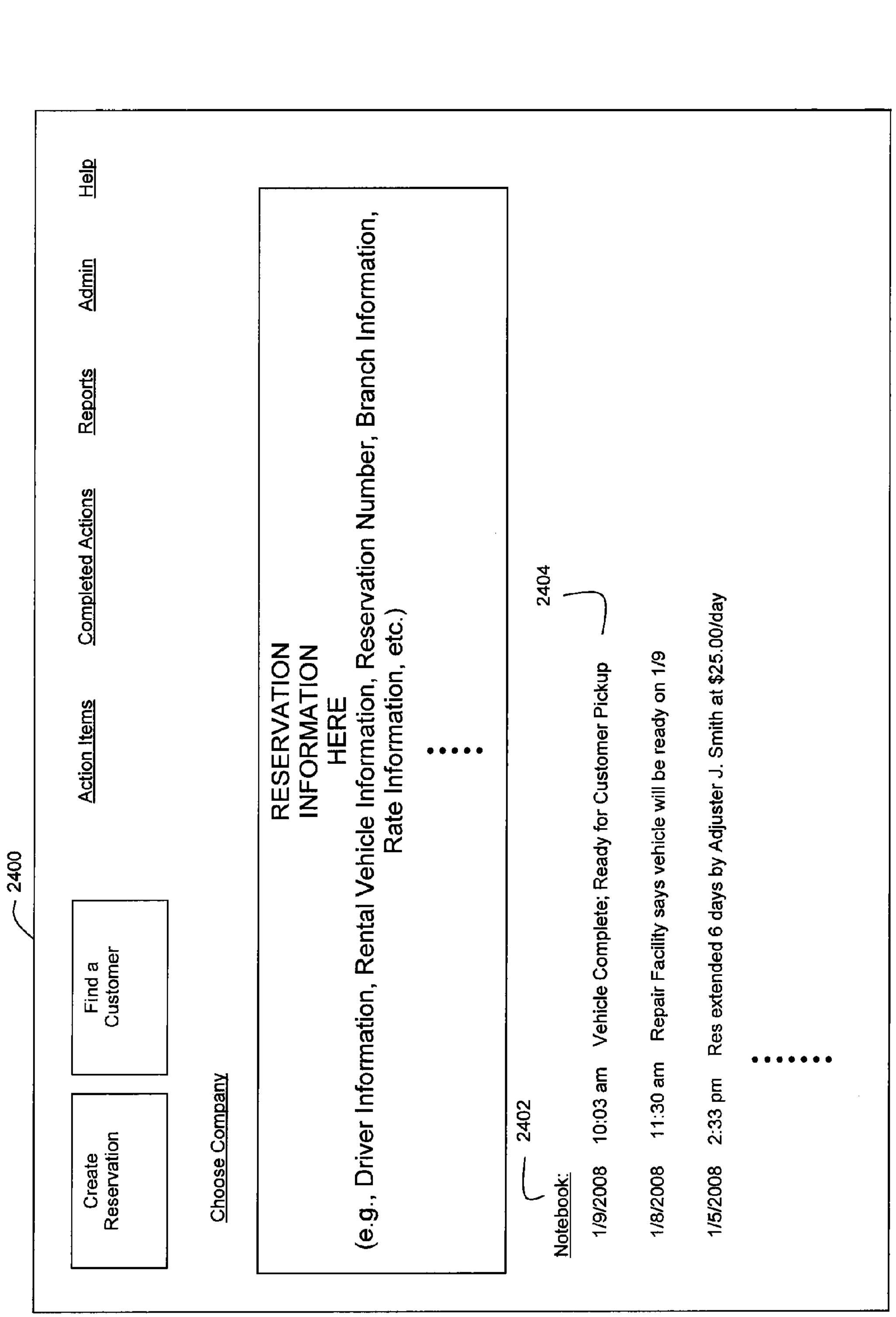
FIG. 24 depicts an exemplary GUI screen for a reservation wherein a message is included which informs a reservation manager that the driver's disabled vehicle has been repaired and it is ready for pickup.

On 1/8 the insurance company takes action on the scheduled callback reminder and performs a repair facility callback to check on the status of the vehicle repair. If the repair facility confirms the vehicle will be ready on 1/9, the reservation record is updated (because a callback was made) and a new callback reminder is set for 1/9 (the same day as the LAD, because there is only 1 day between the DUD and the new LUD). On 1/9 another callback is made to the repair facility confirming that the renter's regular vehicle is ready, in which case a message is sent to the renter and the reservation management system is updated accordingly. In such an instance, as shown in FIG. 24, a GUI screen 2400 displayed to a reservation manager concerning the subject reservation preferably includes a message 2404 in a notebook section 2402 that informs the reservation manager that the repairs to the disabled vehicle are complete and it is ready for pickup by the customer. It should also be noted that optionally the "vehicle ready for pickup" message can be displayed to a reservation manager through an "action items" GUI screen of a reservation management system.

In the event the repair facility indicates a delay—in the example shown the repair facility indicates a delay until 1/17 and provides a reason for the delay—a new callback reminder is automatically generated. This time the DUD value is 1/17 and the LUD is 1/9. With 8 days between the two variables, the reminder is set for 3 days before the LAD, which is 1/14.

Then supposing on 1/10 the insurance company extends the authorization, but only until 1/15, the existing callback reminder is automatically updated using a DUD of 1/15 and an LUD of 1/10, thereby resulting in a callback reminder set for 1/13.

It should be noted that, optionally, the reservation management system can be configured to execute callbacks automatically on the scheduled callback reminder date. For example, if a repair facility callback is scheduled for July 1, then when July 1 is reached, the reservation management system can be configured to generate and send a message to the repair facility inquiring about the repair status for a disabled vehicle corresponding to the subject reservation.

Another aspect of the preferred embodiment of the present invention is the ability to generate audit reports that provide a wide range of metrics data about the reservations managed by purchasers and the repairs performed by repair facilities. Because the present invention allows purchasers to systematically define the rules by which the TCD values for repairs are computed and how the authorization period for the reservation will be controlled in response to the computed TCD values, purchasers can much more effectively capture, itemize and compare reservation data for the high volumes of reservations that they manage.

Figure 6A:
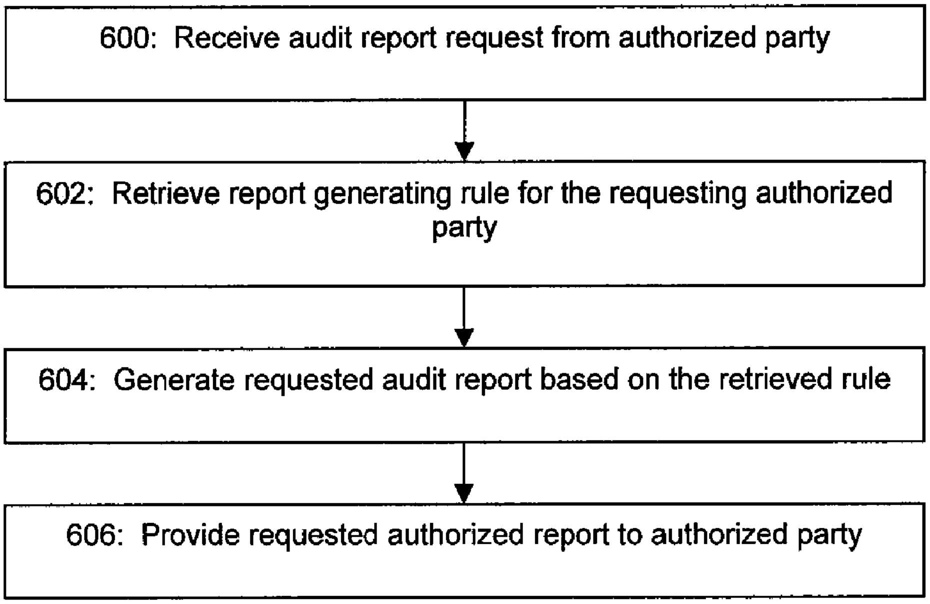
FIGS. 6(*a*) and 6(*b*) depict various exemplary process flows for generating audit reports in accordance with an aspect of the preferred embodiment of the present invention.
Figure 6B:
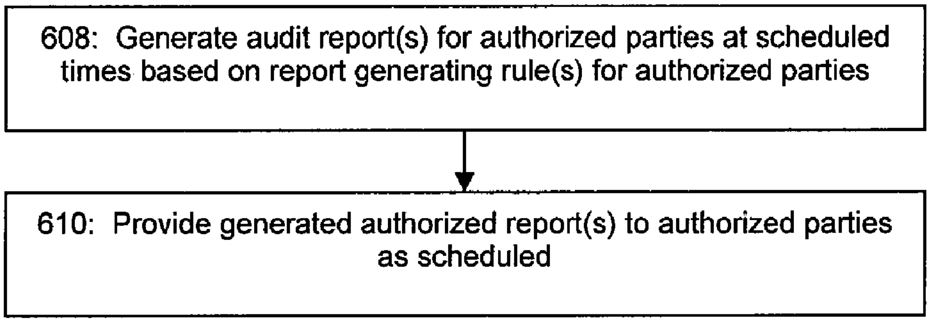

FIGS. 6(*a*) and (*b*) depict process flows for generating an audit report of reservation data for an authorized party. Preferably, the authorized parties include the purchasers, repair facilities and rental vehicle service providers that use the reservation management system to create and manage replacement rental vehicle reservations. As explained hereinafter, each authorized party is preferably limited to only an authorized portion of the data maintained by the reservation management system. That is, insurance company X is preferably not given access to data that would allow it to view reservation data for a specific different insurance company. Similarly, repair facilities and rental vehicle service providers are preferably not given access to specific reservation data of their competitors that may be present within the reservation management system.

With the flow of FIG. 6(*a*), at step 600, an audit report generator receives a request for an audit report from an authorized party. At step 602, the audit report generator retrieves a report generating rule applicable to that authorized party. At step 604, the audit report generator generates an audit report in accordance with the retrieved rule, which in turn is provided to the authorized party (step 606).

With the flow of FIG. 6(*b*), at step 608, the audit report generator operates to generate one or more predefined audit reports for one or more authorized parties at scheduled times based on audit report generating rules that are associated with each authorized party. Next, at step 610, the audit report generator provides the generated audit report(s) to each authorized party as scheduled.

FIGS. 7(*a*)-(*e*) illustrate an exemplary repair facility audit report 700 that could be generated by the audit report generator for an authorized party such as an insurance company. Report 700 can serve as a valuable aid to the insurance company in evaluating how well a given repair facility is performing (e.g., repair facility X). However, it should be noted that repair facility audit report 700 could also be provided to repair facility X so that it can self-evaluate its work. In such an instance, the data in the report can be broken down by the different insurance companies and other business sources for replacement reservation-related repair work. Preferably, report 700 covers some time period (in this example, year-to-date, although it should be understood that other time spans may be readily employed) and displays data applicable to reservation-related repairs performed by repair facility X on behalf of the insurance company in a number of different categories.

Furthermore, not only can report 700 include data for just repair facility X, but report 700 can also include comparison data that allows the insurance company to compare repair facility X with other repair facilities in the same local area (e.g., the St. Louis metropolitan area or the Chicago metropolitan area). To do so, report 700 can include a "local area average" column that displays an average data value for each category corresponding to the repairs performed by all of the repair facilities in repair facility X's local area on behalf of that insurance company. Such "local area" data will be available to the audit report generator 1114 if the reservation management system has access to the reservation data of a sufficiently large number of reservation for which a number of different repair facilities in the same local area have performed repairs. Optionally, this local area average data can include the repair data applicable to repair facility X to better highlight the distinctions between repair facility X and the other repair facilities in the area. Furthermore, the report 700 can include a "local area rank" column that identifies a ranking of how well a repair facility has performed in a given data category relative to the other repair facilities in the area that perform repair work for the insurance company. For example, if 5 repair facilities in the area perform work for the insurance company, the local area rank for a given data category may show "2 of 5", which informs the insurance company that repair facility X outperformed three of the other repair facilities in the area with respect to that data category.

Report 700 can also include an "industry average" column that displays average data values for each category corresponding to the repairs performed by all of the repair facilities in the industry on behalf of that insurance company. Such "industry area" data will be available to the audit report generator 1114 if the reservation management system has access to the reservation data of a sufficiently large number of reservations for which a number of different repair facilities in the industry have performed repairs. Optionally, this "industry average" data may also include repair data performed by repair facilities for insurance companies other than the recipient of report 700. Furthermore, the report 700 can include an "industry rank" column that identifies a ranking of how well a repair facility has performed in a given data category relative to all other repair facilities in the industry that perform repair work for the insurance company. For example, if 100 repair facilities in the applicable market (e.g., the United States) perform work for the insurance company, the industry rank for a given data category may show "5 of 100", which informs the insurance company that repair facility X outperformed all but 4 of the other repair facilities in the industry with respect to that data category.

Report 700 can include data for any of a number of different categories, as shown by the rows in the table of FIGS. 7(*a*)-(*e*). For example, report 700 can include data for at least any or all of the following data categories:

Average number of rental days for reservations corresponding to all, driveable, and nondriveable vehicles that are repaired;

Percentage of repairs to all, driveable, and nondriveable vehicles completed within initial TCD;

Percentage of repairs to all, driveable, and nondriveable vehicles completed without reservation extensions;

Average number of labor hours to repair disabled vehicle for all, driveable, and nondriveable vehicles;

Average length of extension period for repairs to all, driveable, and nondriveable vehicles wherein reservation extensions are needed;

Average adjustment amount needed for repairs to all, driveable, and nondriveable vehicles that are due to adjustment explanations/reasons 1, 2, . . . n;

Percentage of all adjustments for repairs to all, driveable, and nondriveable vehicles that are due to adjustment explanations/reasons 1, 2, . . . n;

Average extension amount needed for repairs to all, driveable, and nondriveable vehicles that are due to extension explanations/reasons 1, 2, . . . n; and Percentage of all extensions for repairs to all, driveable, and nondriveable vehicles that are due to extension explanations/reasons 1, 2, . . . n.

Furthermore, report 700 can also include data indicative of how quickly repair facilities communicate updated vehicle repair data to the purchaser and/or rental vehicle service provider, as measured by how well the different repair facilities respond to repair facility callbacks.

Because of the common rules that an insurance company can employ to define the authorization period for a reservation in close correspondence with the TCD for repair work, meaningful data with respect to categories such as "average number of rental days" for various reservation types can be displayed. Furthermore, repair facilities can be evaluated as to common reasons for adjustments and/or extensions being made to the TCD (see FIGS. 7(*b*)-(*e*)) as well as how accurately each repair facility initially estimates the TCD (see the data categories relating to the percentage of repairs completed within the initial TCD). Furthermore, because of the high volume of reservations managed by the reservation management system, data is available therein to produce meaningful comparison data with other repair facilities in the area and industry.

FIG. 8 illustrates an exemplary rental company audit report 800 that could be generated by the audit report generator for an authorized party such as an insurance company. Report 800 can serve as a valuable aid to the insurance company in evaluating how well a given rental company is performing (e.g., rental company 1). However, it should be noted that rental company audit report 800 could also be provided to rental company 1 so that it can self-evaluate its work. In such an instance, the data in the report can be broken down by the different insurance companies and other business sources for replacement reservations placed with that rental company. As with report 700, preferably, report 800 covers some time period (in this example, year-to-date, although it should be understood that other time spans may be readily employed) and displays data applicable to reservations placed with rental company 1 by the insurance company in a number of different categories.

Furthermore, not only can report 800 include data for just rental company 1, but report 800 can also include comparison data in "industry average" and "industry rank" columns if the reservation management system has access to the reservation data of the insurance company that is applicable to other rental companies. Report 800 can include data for at least any or all of the following data categories:

- Average term length for replacement rental vehicle reservations;
- Average cost per day for all replacement rental vehicle reservations;
- Average cost per day for replacement rental vehicle reservations within vehicle classes 1, 2, . . . n;
- Percentage of callbacks performed as scheduled; and
- Percentage of rental vehicle reservations that go beyond their LAD.

Report 800 can also include other data indicative of how well the rental company's personnel have stayed "on top of" the reservations. For example, an additional data field in the report 800 can be data that identifies a percentage of extensions that were performed on time (that is, an extension that were made and/or requested prior to the reservation's LAD).

Furthermore, in instances where a rental vehicle reservation management system is configured to provide reservation management for reservations placed with a plurality of different rental vehicle service providers, an audit report 900 such as the one shown in FIG. 9 can be generated by the audit report generator. Report 900 can optionally include the data categories and data columns that are found in report 800, although report 900 lists the data within each of the data categories for a plurality of different rental companies with which the purchaser (e.g., insurance company Y) manages reservations.

Moreover, even in instances where the reservation management system is only used to manage reservations with a single rental vehicle service provider, an audit report such as report 900 can be generated if the rental vehicle service provider can classify its rental vehicle services into different groups, e.g. geographically divided groups such as "Northeast", "Midwest", "Southeast", etc. (or even more granularly-defined groups such as "St. Louis area", "Chicago area", "Southern California", etc.). In such instances, the report 900 would provide a plurality of different columns corresponding to the different groups of the rental vehicle service provider (rather than different rental companies) to thereby display each group's data for the different data categories. Not only could such a report be of interest to insurance companies when evaluating a rental company, but such a report can also be of interest to rental companies when evaluating how their different subgroups are operating.

FIGS. 10(*a*)-(*c*) illustrate an exemplary purchaser audit report 1000 that could be generated by the audit report generator for an authorized party such as the purchaser (e.g., insurance company Y). Report 1000 can serve as a valuable aid to the insurance company in evaluating how well its adjusters and/or adjuster groups are performing. However, it should be noted that insurance company audit report 1000 could also be provided to a rental vehicle service provider and/or a repair facility to allow the rental vehicle service provider and/or repair facility to evaluate the nature of reservations managed and/or repair work placed by the insurance company with the rental vehicle service provider and/or repair facility. In such an instance, the data in the report can be broken down by the different insurance companies and other business sources for replacement reservations/repairs for the rental vehicle service provider/repair facility. As with report 700, preferably, report 1000 covers some time period (in this example, year-to-date, although it should be understood that other time spans may be readily employed) and displays data applicable to how adjusters within the insurance company have managed replacement reservations.

By way of example shown in FIG. 10(*a*), the report 1000 can include data columns corresponding to aggregated data for all adjuster groups within the insurance company, data specific to a plurality of different adjuster groups 1, 2, . . . n within the insurance company, industry average data and industry rank data. Report 1000 can further include data for at least any or all of the following data categories:

- Average length of replacement rental vehicle reservations;
- Average number of replacement rental vehicle reservations managed each week;
- Average cost per replacement rental vehicle reservation;
- Average length of initial authorization period per replacement rental vehicle reservation;
- Average length of total authorization period per replacement rental vehicle reservation;
- Average extension length per replacement rental vehicle reservation;
- Average extension length per extension;
- Percentage of replacement rental vehicle reservations that go beyond the LAD (for all, driveable, and nondriveable vehicles);
- Percentage of replacement rental vehicle reservations that end 1, 2, . . . n days prior to the LAD (for all, driveable, and nondriveable vehicles);

Moreover, report 1000 can also include data on callback performance (e.g., percentage of callbacks performed as scheduled) and extension performance (e.g., percentage of extensions that were performed on time) for insurance company personnel, as described above in connection with the rental company reports 800 and 900.

Furthermore, as shown in FIGS. 10(*a*) and (*b*), report 1000 can also show data in these data categories that are broken down on a per adjuster basis for each of the different adjuster groups within the insurance company. Additional data columns could then display how well the adjuster group ranks within the insurance company for each of the data categories.

Therefore, it should be readily understood that an audit report generator can be configured to generate any of a number of different audit reports with varying levels of data relating to reservations managed through the reservation management system.

Figure 11A:
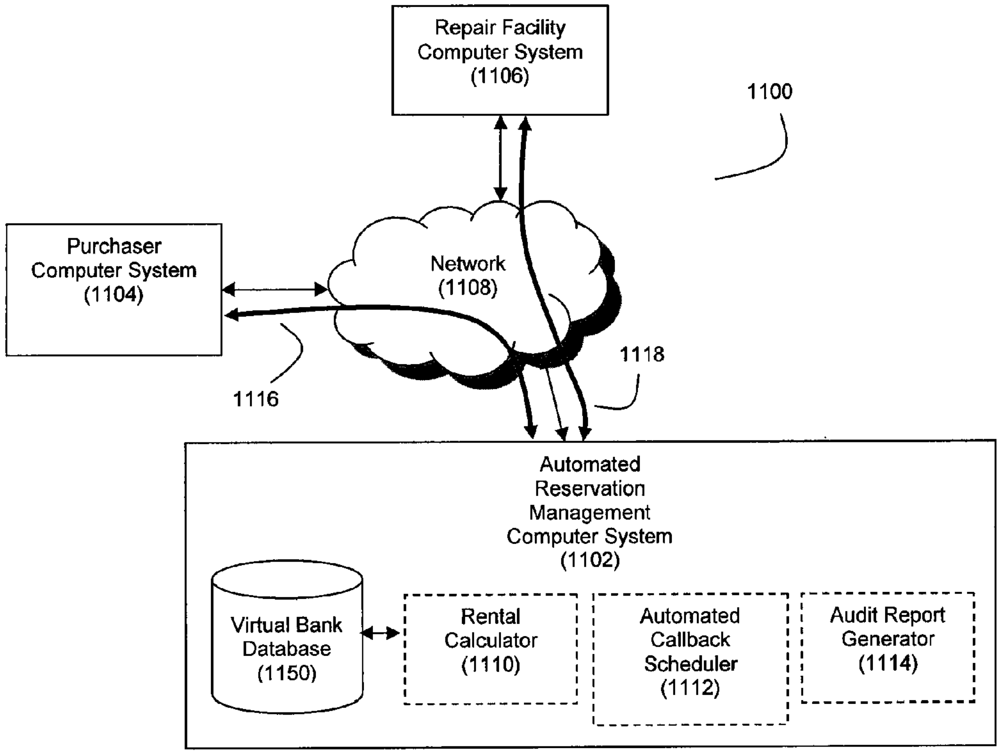
FIGS. 11(*a*) and (*b*) depict exemplary computer system architectures for sharing information among a plurality of parties involved with a replacement rental vehicle reservation in accordance with a preferred embodiment of the present invention.
Figure 11B:
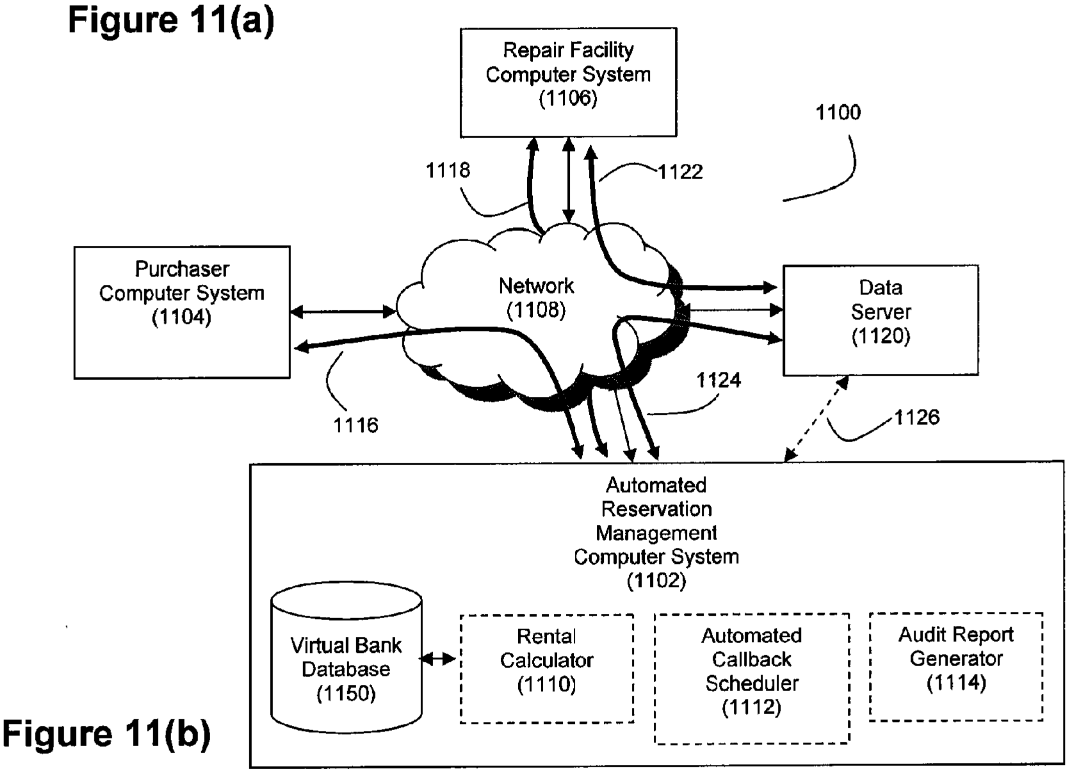

FIGS. 11(*a*) and (*b*) depict system architectures 1100 that illustrate how the different parties to the replacement rental process can exchange information with each other. In the example of FIG. 11(*a*), an automated reservation management computer system 1102 is in communication with a purchaser computer system 1104 and a repair facility computer system 1106 over a network 1108 such as the Internet. The automated reservation management computer system 1102 can take the form of the ARMS® system developed by the assignee of this invention and as described in the above-referenced and incorporated patent applications. While only one purchaser computer system 1104 and one repair facility computer system 1106 are shown in FIGS. 11(*a*) and (*b*) in communication with the automated reservation management computer system 1102 over network 1108, it should be readily understood that a plurality of purchaser computer systems 1104 and a plurality of repair facility computer systems 1106 can communicate with the automated reservation management computer system 1102 over network 1108.

As shown in FIG. 11(*a*), preferably the rental calculator 1110, automated callback scheduler 1112, and audit report generator 1114 are resident within the automated reservation management computer system 1102 and executed thereby. However, it should be noted that any or all of the rental calculator 1110, the automated callback scheduler 1112, and the audit report generator 1114 can optionally be deployed on other computer systems within system 1100, including but not limited to the purchaser computer system 1104, the repair facility computer system 1106, and the data server 1120 (see FIG. 11(*b*)). Further still, it should be noted that the functionality of the rental calculator 1110, the automated callback scheduler 1112, and/or the audit report generator 1114 can be distributed across and shared by different computer systems within system 1100 if desired by a practitioner of the invention.

Figure 12:
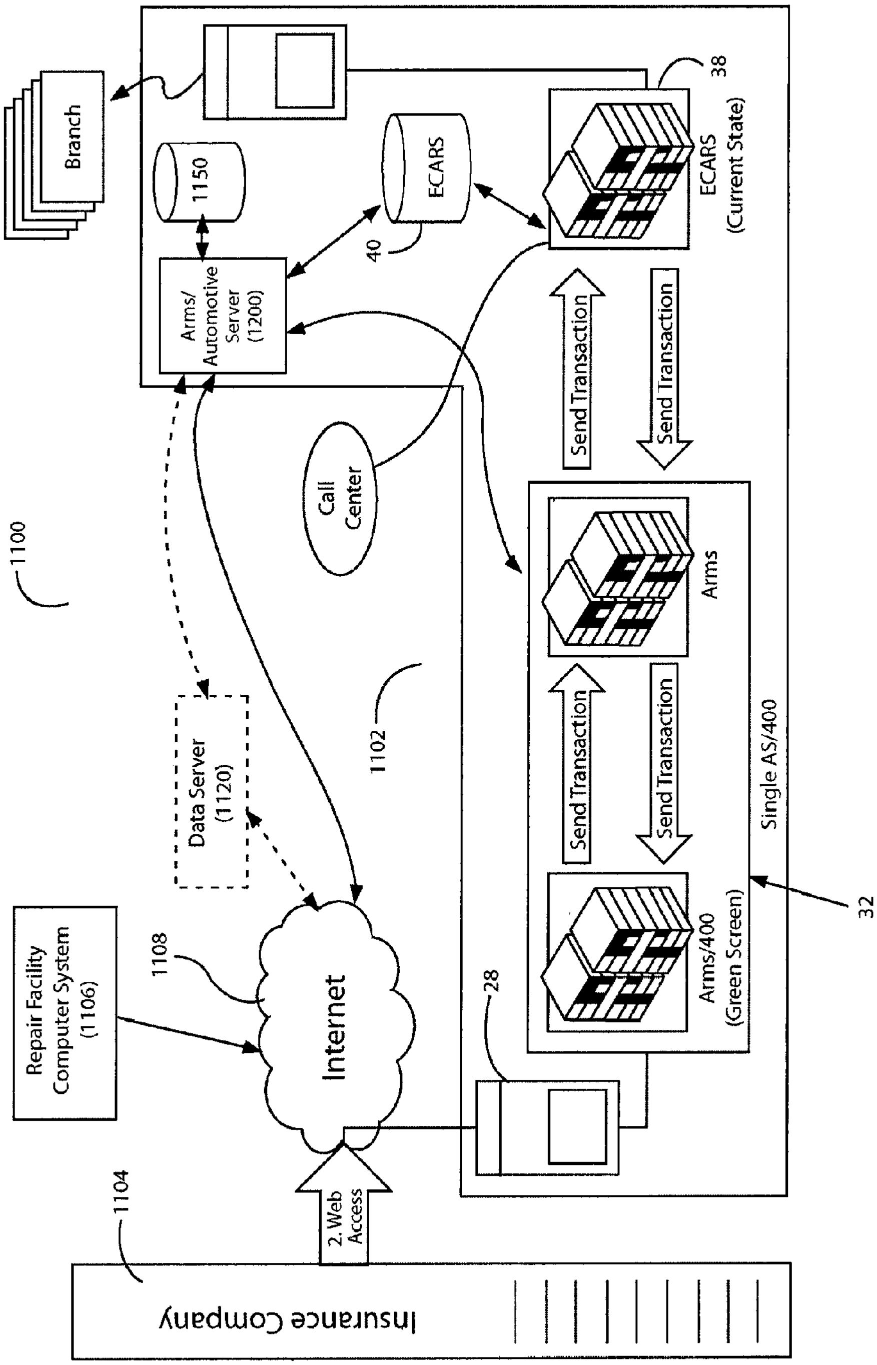
FIG. 12 depicts an exemplary embodiment for the automated reservation management computer system.

FIG. 12 illustrates an exemplary embodiment for the automated reservation management computer system 1102. Functionality for this embodiment of the automated reservation management computer system 1102 is described in greater detail in pending U.S. patent application Ser. No. 09/641,820, filed Aug. 18, 2000, the entire disclosure of which is incorporated herein by reference. As described therein, a user of the purchaser computer system 1104 can access a plurality of GUI screens through Internet web portal 28, wherein these GUI screens interface the purchaser with software executed on mainframe 32 that allows the purchaser to create and manage rental vehicle reservations with a rental vehicle service provider. A database 40 can store the reservation data where it is accessible to a fulfillment software program resident on mainframe 38. The fulfillment software program is preferably accessible to a plurality of branch office computers that are operated by employees of the rental vehicle service provider from branch offices where vehicles are available for rent. Thus, when a driver for a replacement rental vehicle reservation arrives at the branch location to pick up his/her replacement rental, the fulfillment software program is executed to update the reservation records in the database 40 to indicate the opening of a rental ticket for the reservation. Through the GUI screen interface provided via web portal 28, the purchaser can continue to manage the reservation as the reservation continues. It should be understood that the term "rental vehicle reservation" as used herein is not meant to be limited to only the creation of a reservation, but is meant to encompass all aspects of the reservation process, from the initial creation of the reservation, to the opening of a rental ticket when the driver picks up a rental vehicle in accordance with the reservation, to the period while the driver has control of the rental vehicle, and to the closing of the rental ticket when the driver returns the rental vehicle to the rental vehicle service provider (including the invoicing of the costs for the completed reservation).

The automated reservation management computer system 1102 can include a server 1200 that is in communication with the repair facility computer system 1106 (and/or data server 1120) via network 1108. Optionally, the rental calculator 1110 can be deployed on the server 1120 to act in response to any received vehicle repair data. However, it should be understood that the rental calculator 1110, automated callback scheduler 1112, and audit report generator 1114 can be deployed on any or all of the components of system 1102 (e.g., mainframe 32, mainframe 38, Internet web portal 28, etc.) if desired by a practitioner of the present invention.

Figure 13:
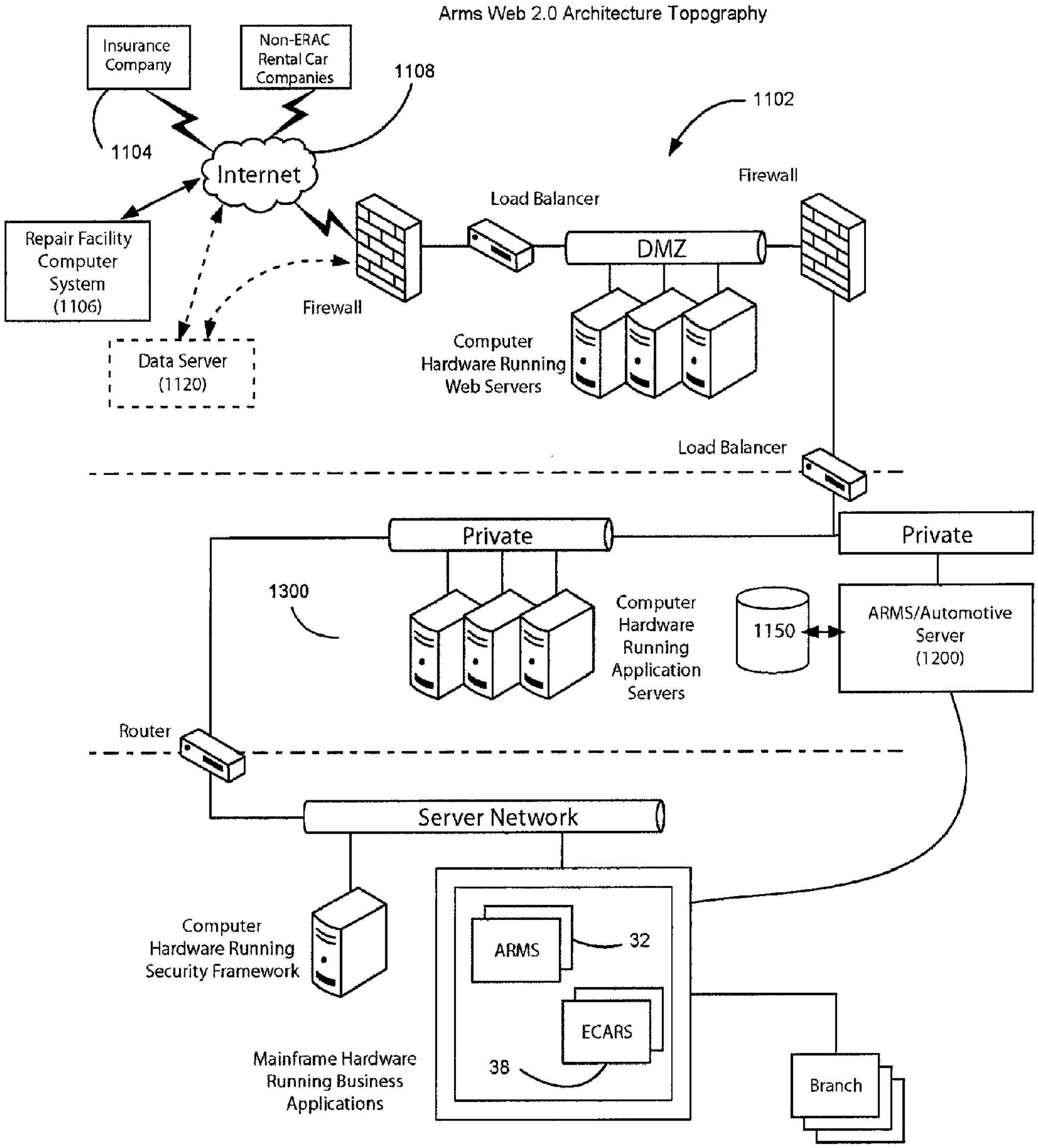
FIG. 13 depicts another exemplary embodiment for the automated reservation management computer system.

FIG. 13 illustrates another exemplary embodiment for the automated reservation management computer system 1102. Functionality for this embodiment of the automated reservation management computer system 1102 is described in greater detail in pending U.S. patent application Ser. No. 09/694,050, filed Oct. 20, 2000, the entire disclosure of which is incorporated herein by reference. As described therein, a plurality of servers 1300 in a middle architectural level of the automated reservation management computer system 1102 can be configured to provide the GUI screens to the purchaser computer system 1104 over network 1108 (albeit through a first architectural layer that connects to network 1108 through a firewall). It is also worth noting that with the embodiment of FIG. 13, a purchaser can book rental vehicle reservations not only with the rental vehicle service provider that operates computer system 1102 but also optionally with a plurality of competitive rental vehicle service providers, as described in the referenced and incorporated Ser. No. 09/694,050 application. The rental calculator 1110, automated callback scheduler 1112, and audit report generator 1114 can optionally be deployed on any of the components of computer system 1102 (e.g., servers 1300, mainframe 32, mainframe 38, server 1200, etc.).

Figure 14:
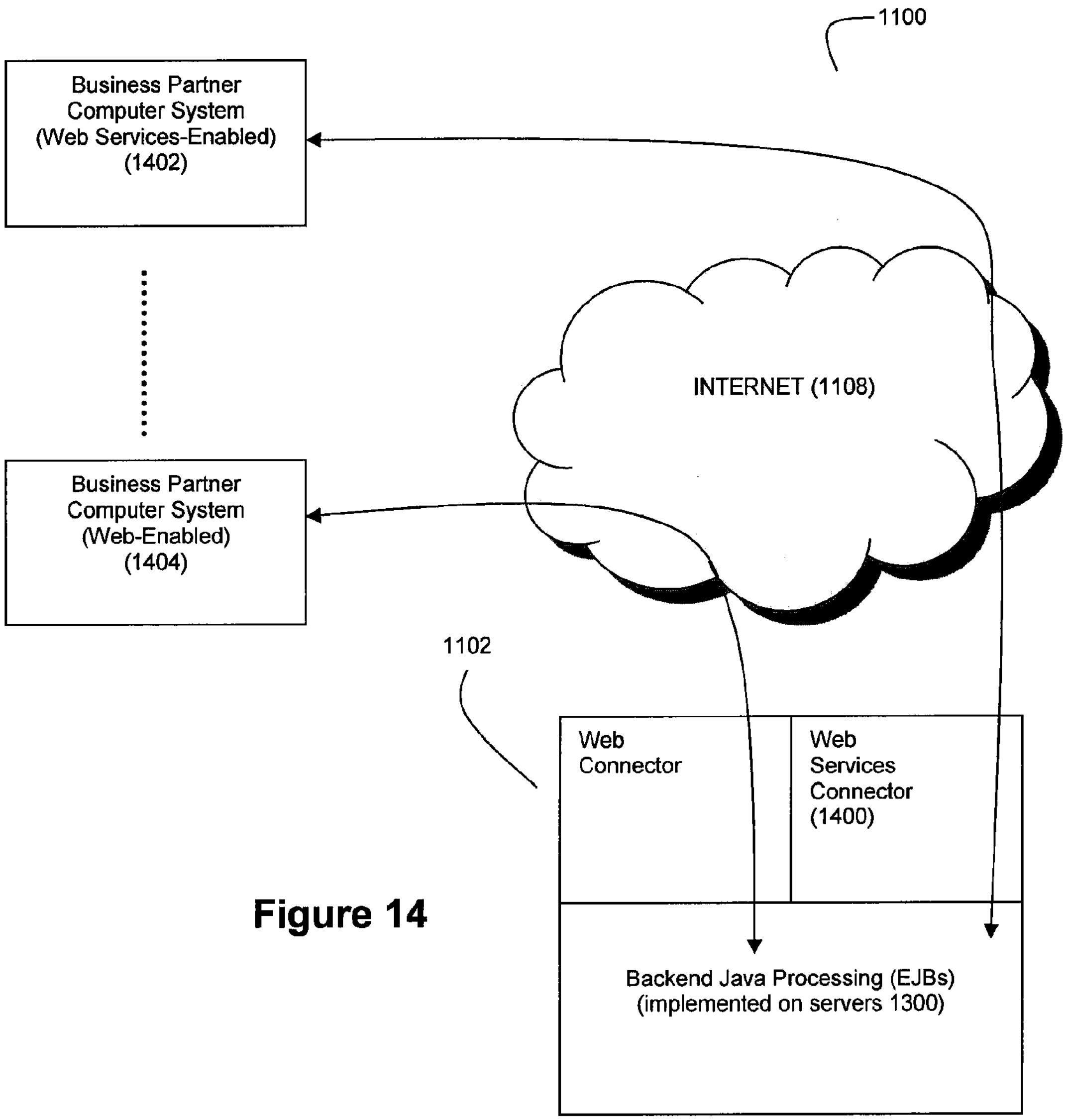
FIG. 14 depicts yet another exemplary embodiment for the automated reservation computer management system.

FIG. 14 illustrates yet another exemplary embodiment for the automated reservation management computer system 1102. Functionality for this embodiment of the automated reservation management computer system 1102 is described in greater detail in pending U.S. patent application Ser. No. 10/865,116, filed Jun. 10, 2004, the entire disclosure of which is incorporated herein by reference. As described therein, web services technology can be used as the mode of data exchange between a business partner computer system 1402 (e.g., purchaser computer system 1104 and/or repair facility computer system 1106) and the automated reservation management computer system 1102. To support this functionality, the automated reservation management computer system 1102 preferably employs a web services connector 1400 for connecting web services-enabled business partners 1402 with the back end processing provided by components such as servers 1300 of FIG. 13. Additional details about the web services connector 1400 are described in greater detail in the referenced and incorporated Ser. No. 10/865,116 application. To business partners who are only web-enabled, their computer systems 1404 can still communicate with the back end processing of the computer system 1102 via a web connector (such as the first architectural layer shown in FIG. 13). In the embodiment of FIG. 14, the rental calculator 1110, automated callback scheduler 1112, and audit report generator 1114 can optionally be deployed on any of the components of computer system 1102 (e.g., servers 1300, mainframe 32, mainframe 38, server 1200, the web connector, the web services connector 1400, etc.).

Returning to FIG. 11(*a*), through data path 1116, the automated reservation management computer system 1102 is preferably configured to provide a plurality of GUI screens for display within a web browser running on a computer within the purchaser computer system 1104. Through these GUI screens, a user of the purchaser computer system 1104 (such as an insurance adjuster if the purchaser is an insurance company) can preferably access software within the automated reservation management computer system 1102 to create and manage a plurality of replacement rental vehicle reservations for various insureds and/or claimants to insurance policies provided by the insurance company.

Through data path 1118, the automated reservation management computer system 1102 is preferably configured to receive vehicle repair data from the repair facility computer system 1106. Also, it should be noted that the automated reservation management computer system 1102 can be configured to communicate repair facility callbacks to the repair facility computer system 1106 over data path 1118. As previously explained in connection with FIGS. 1 and 2, upon receipt of vehicle repair data, the automated reservation management computer system 1102 can execute the rental calculator 1110 and the automated callback scheduler 1112 to automatically update the TCD (and the LAD, if the automated extensions feature of the preferred embodiment is employed by the purchaser) as well as callback reminder(s) for a reservation without requiring personnel of the purchaser or rental vehicle service provider to manually change the TCD (and the LAD, if the automated extensions feature of the preferred embodiment is employed by the purchaser) or the callback reminder schedule for the reservation. Moreover, even if the purchaser does not employ automated extensions, the rental calculator 1110 can automatically send an authorization request for an extension to the purchaser if a difference is detected between the computed TCD value and the reservation's current LAD, thereby allowing the purchaser to stay on top of reservation management tasks without burdening the purchaser with the task of manually interpreting the vehicle repair data provided by repair facilities.

Furthermore, through data path 1116, the purchaser can invoke the audit report generator 1114 via one or more GUI screens to thereby obtain audit reports such as those described in connection with FIGS. 6(*a*)-10(*c*). Similarly, repair facility personnel can also optionally obtain audit reports from the audit report generator 1114 through data path 1118 if desired.

FIG. 11(*b*) depicts an alternate architecture 1100, wherein a data server 1120 is also in communication with the network 1108. In the embodiment of FIG. 11(*b*), the repair facility computer system 1106 is configured to send its vehicle repair data to the automated rental vehicle reservation management computer system 1102 by way of data server 1120. Thus, over data path 1122, the repair facility computer system 1106 can communicate vehicle repair data to the data server 1120, and the data server 1120 can send the vehicle repair data (or data derived therefrom) to the automated reservation management computer system 1102 over data path 1124 (or optionally direct communication link 1126). Data path 1118 can still be used as the path over which callback data is exchanged. In such an embodiment, it may be desirable to deploy all or a portion of the functionality of the rental calculator 1110, the automated callback scheduler 1112, and/or the audit report generator 1114 on the data server 1120.

As previously indicated, vehicle repair data can be communicated from the repair facility to the automated reservation management computer system 1102 in any of a number of ways. For example, one manner by which repair facilities can communicate vehicle repair data to the automated reservation management computer system 1102 is via a data pump installed on the repair facility computer system 1106 to automatically "pump" new vehicle repair data to the automated reservation management computer system 1102, as disclosed in the above-referenced and incorporated published patent application 2008/0162199.

Another manner by which the automated reservation management computer system 1102 can receive vehicle repair data over data path 1118 is through a GUI screen interface wherein one or more GUI screens interface a user of the repair facility computer system with the rental calculator 1110, automated callback scheduler 1112, and/or audit report generator 1114. FIG. 15(*a*) depicts an exemplary GUI screen 1500 through which repair facility personnel can submit updated vehicle repair data to the rental calculator 1110 and/or automated callback scheduler 1112. Screen 1500 preferably includes a section 1502 that displays various information about the reservation corresponding to the vehicle being repaired. Through field 1504, the user can enter an explanation for changing the estimated time needed to complete repairs to the disabled vehicle. Preferably, a drop down menu mechanism is provided with field 1504 to display a list of predefined explanations for user selection. This list of predefined explanations can correspond to CIECA status update message codes or other reasons as defined by purchasers and/or repair facilities. Thus, the user can select one or more of the explanations from the list to trigger a change to the time estimate needed to complete repairs. Upon selection of the explanation via field 1504, fields 1508 and 1510 are preferably automatically populated to identify the hours and/or days of additional time that corresponds to the selected reason, based on the rules $\mathbf{300}_i$ defined for the purchaser i associated with the reservation. Similarly, comments field 1512 is preferably automatically populated with text that describes the selected explanation, as defined by the purchaser rules 300. Furthermore, a user can optionally also enter values in fields 1508, 1510 and 1512 that are independent of the predefined explanations if a reason exists for the estimate change that does not correspond to any of the predefined explanations.

Once the user has selected an appropriate explanation, he/she can select the update button 1514 to submit the updated vehicle repair data to the rental calculator 1110. If the user wishes to add a plurality of explanations to the reservation record, he/she can select the add button 1516 to add another explanation to the reservation record. If a user wishes to remove a previously-selected explanation, he/she can do so upon selection of the remove button 1518.

Table 1520 lists each explanation 1522 for a change to the repair time estimate that has been applied to the subject reservation, including a corresponding amount of hours 1524 and/or days 1526 of adjustment needed due to each explanation. For purposes of illustration, a large number of entries and corresponding adjustment amounts are shown in table 1520. It should be noted that the data shown in table 1520 is illustrative only and does not necessarily bear on the summary information presented in table 1528 described hereinafter. However, it should be understood that in practice, table 1520 should provide a detailed "component" level view of the information summarized in table 1528.

Summary table 1528 lists a summary of the component values within the TD calculation according to formulas (1) and (2), as well as identifications of the TCD, LAD, number of authorized days, and any shortfall between the LAD and TCD for the reservation. In this example, it can be seen that the TCD falls 6 days after the LAD, in which case an extension (or a request for an extension) to the reservation is necessary as per steps 210-216 of FIG. 2(*a*). As the user enters explanations via field 1504 (or fields 1508, 1510, and/or 1512), preferably the rental calculator 1110 updates the summary table 1528 to reflect the changes.

History table 1530 lists a history of updates that have been made for the reservation with respect to the computations based on formulas (1) and (2). Each entry in table 1530 preferably comprises a previously-entered explanation 1534, the amount of hours 1536 and/or days 1538 corresponding thereto, any comments 1540 corresponding to the explanation in column 1534, the date and time 1542 at which the explanation in column 1534 was added to the reservation record, and an identification 1544 of the user who added the explanation in column 1534 to the reservation record. Link 1532 is preferably user-selectable to display the history information of table 1530 in a pop-up window. Also, the history table 1530 may optionally be used to display a history of how any credits or debits to an applicable virtual bank account have been made in association with this reservation.

FIG. 15(*b*) depicts another embodiment for GUI screen 1500, wherein table 1520 lists the different explanations 1522, wherein those explanations are categorized as either "adjustments" or "extensions" as per FIG. 2(*b*) and FIGS. 3(*b*)-(*c*) as explained above. Thus, with screen 1500 of FIG. 15(*b*), the CD value computed via formulas (3) and (4) will also be computed to take any "extension"-categorized explanations into consideration. As reflected in summary table 1528 of FIG. 15(*b*), rows can be added to the table to identify the extensions amount E from formula (4) (3 days in this example), which count toward to CD value (identified as "Total Days Needed for Repairs" in table 1528) but not toward the TCD value.

It should be noted that the user who accesses screen 1500 of FIGS. 15(*a*) or (*b*) need not necessarily be a repair facility employee. For example, the user of screen 1500 may optionally be an employee of the rental vehicle service provider or the purchaser who keys in the updated vehicle repair information provided to him/her via email, fax, or a telephone call.

Figure 25:
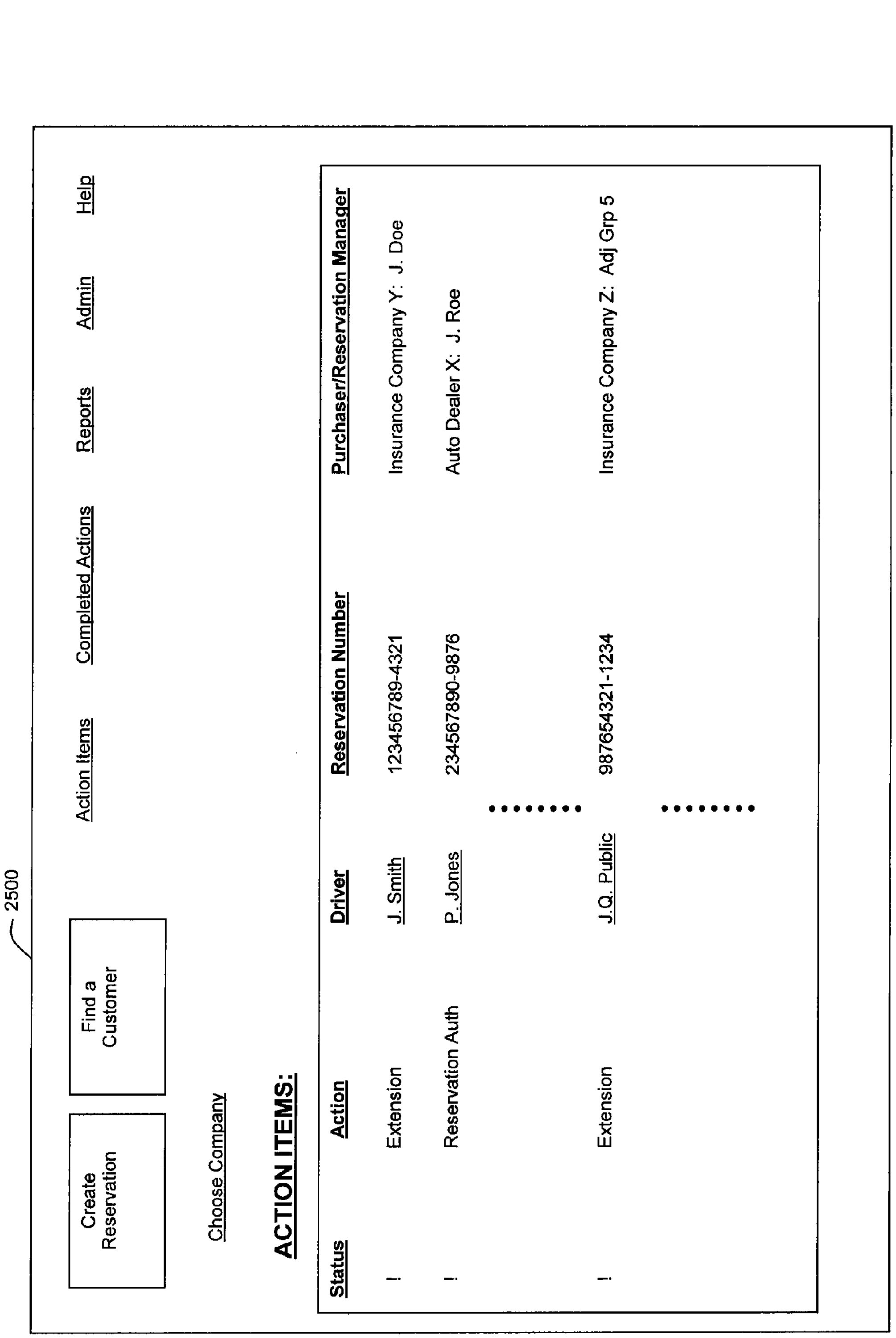
FIG. 25 depicts an exemplary GUI screen that lists action items for a reservation manager, including an extension authorization request produced at step 216 of FIG. 2(*a*) or (*b*)
Figure 26:
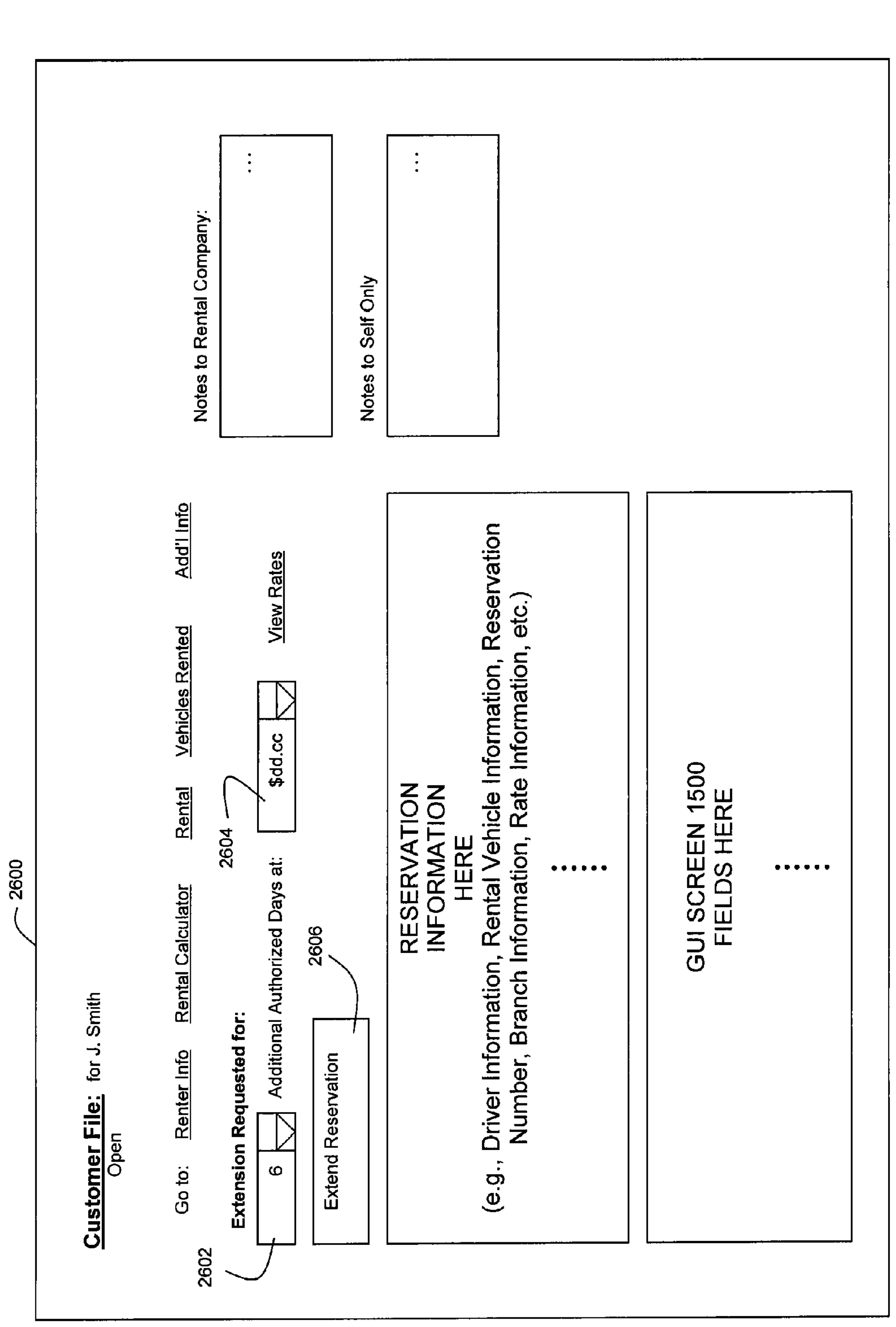
FIG. 26 depicts an exemplary GUI screen through which a reservation manager can extend a reservation.

With reference to the flows of FIGS. 2(*a*) and (*b*), it can be seen that screen 1500 identifies a reservation where there is a 6 day shortfall between the LAD and the amount of time needed by the repair facility to complete repairs. In the event that an extension authorization request is generated at step 216, the automated reservation management computer system preferably lists this request in an action items GUI screen 2500 as shown in FIG. 25 so that a reservation manager (a rental vehicle service provider employee in this example, although the reservation manager can also be an employee of the purchaser) can be informed of the need for the extension. Upon selection by the reservation manager of the "extension" action item from screen 2500, an extension authorization GUI screen 2600 such as the one shown in FIG. 26 is preferably displayed. Preferably, field 2602 of screen 2600 is automatically populated with the shortfall between the LAD and the computed time needed by the repair facility to complete repairs to the disabled vehicle (which in this example is 6 days). However, the reservation manager can optionally adjust this amount if desired. Furthermore, through field 2604, the reservation manager can define the rate to apply to the extension period. This field 2604 is preferably populated with the existing rate applicable to the reservation, however other rate values can be optionally selected. Thereafter, via selection of the "extend reservation" button 2606, the reservation manager can re-set the reservation's LAD in accordance with the extension amount in field 2602.

According to another aspect of the preferred embodiment, authorized personnel are preferably given the ability to define the rules used by the rental calculator 1110, automated callback scheduler 1112, and/or audit report generator 1114 through one or more GUI screens. Preferably, appropriately authorized employees of the purchaser are given access to these GUI screens through data path 1116. Similarly, for any such GUI screens to which repair facility personnel are allowed access, such access is preferably provided via data path 1118 (or paths 1122 and/or 1124).

Figure 16:
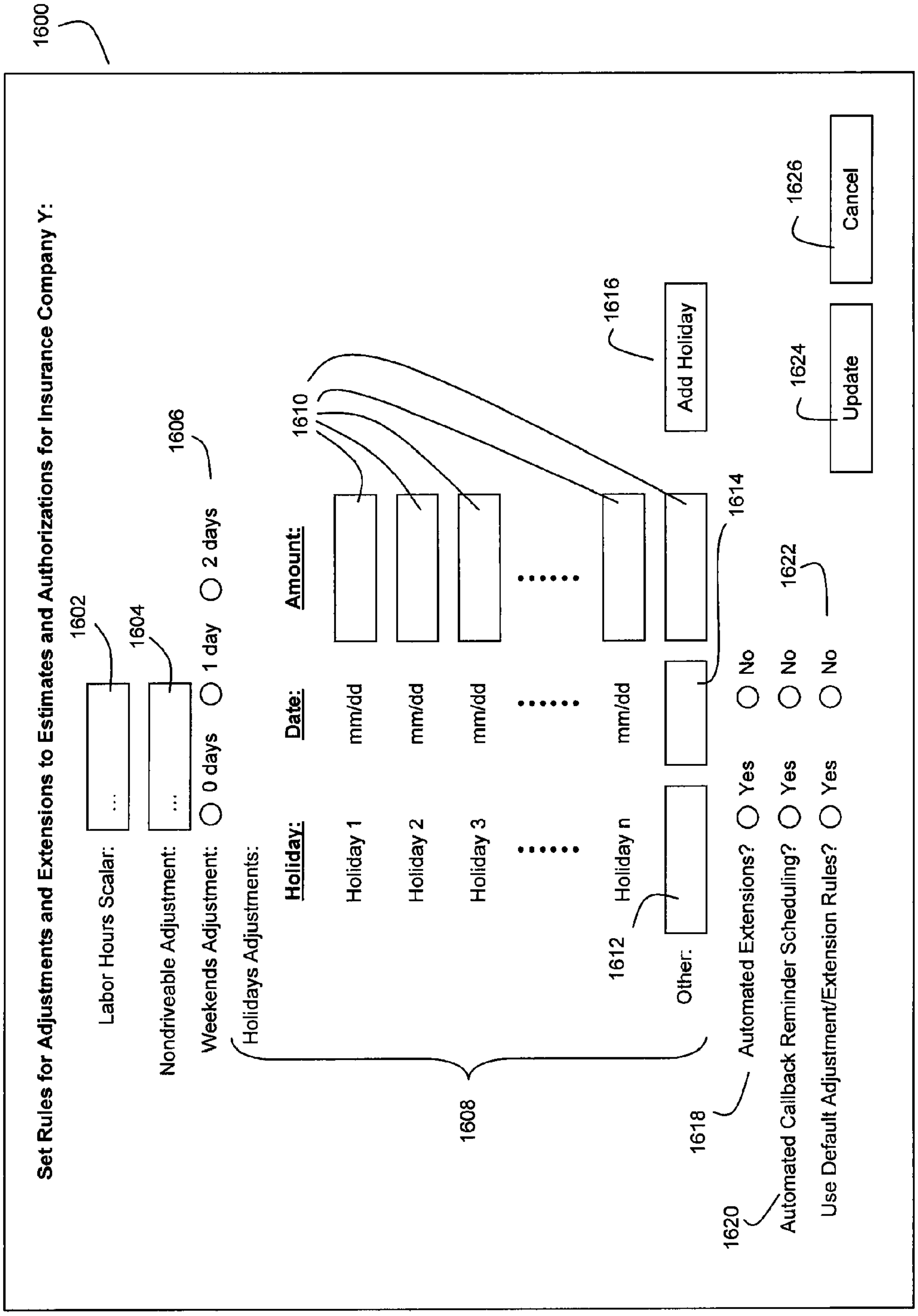
FIG. 16 depicts an exemplary GUI screen through which a user can define rules for computing term-related parameters for a reservation.

FIG. 16 depicts an exemplary GUI screen through which an authorized user can define the rules used by the rental calculator 1110 to compute adjustments and extensions for reservation. Preferably, the user is an authorized employee of the purchaser (e.g., insurance company Y) for which the rules apply. However, it should be noted that the user could be an employee of the rental vehicle service provide or some other authorized person.

Via field 1602, the user can define the labor hours scalar (LHS) used by the rental calculator 1110 for formula (2).

Via field 1604, the user can define the nondriveable adjustment used by rental calculator 1110 for formula (2). This amount is preferably expressed in units of days or hours.

Via fields 1606, the user can define the amount of adjustment to be applied for the weekends portion of the weekends/holidays adjustment of formula (1). This amount is preferably expressed in units of days or hours.

Via section 1608, the user can define the amount of adjustments for various holidays as part of the holidays portion of the weekends/holidays adjustment of formula (2). Preferably, section 1608 lists a plurality of predefined holidays (e.g., Christmas, New Years, $4^{th}$ of July, etc.), identifies the date therefor, and includes a field 1610 in which the user can enter the adjustment amount therefor. These amounts are preferably expressed in units of days or hours. Should the purchaser want the rental calculator 1110 to observe any holidays not included on the predefined list, the user is preferably given the ability to add a holiday to the list by entering a descriptor for the new holiday in field 1612 and the date for the new holiday in field 1614. Field 1610 can accept input from the user regarding the adjustment amount applicable to the new holiday. Should the user need to add more new holidays, he/she can select the "add holiday" button 1616 to add a new set of fields 1612, 1614 and 1610 to section 1608.

It should be noted that screen 1600 or subportions thereof (such as field 1602, fields 1606, and/or section 1608) can be made available to the repair facilities of the purchaser on a repair facility-specific basis such that the different rules defined via user input in screen 1600 can be repair facility-specific.

Via fields 1618, the user can define whether the purchaser is to employ automated extensions in the event of detected differences between the TCD and LAD. If the user selects "yes" in fields 1618, then the user is preferably also directed to the GUI screen 2200 of FIG. 22 described hereinafter.

Via fields 1620, the user can define whether automated callback reminder scheduling is to be employed for the purchaser. If the user selects "yes" in fields 1620, then the user is preferably also directed to one or more GUI screens for defining the rules used by the automated callback scheduler 1112, as described hereinafter.

Also, preferably the user is given the option via fields 1622 to use a set of pre-defined default rules for the rental calculator 1110. If the user chooses to user the default rules, the user's need to enter adjustment amounts via the GUI screens 1600 and 1700 can be alleviated.

Once the user has entered the appropriate values in the fields of GUI screen 1600, the user can select the update button 1624 to store the rules for use by the rental calculator 1110. These rules can be stored in the available memory resources of any of the components of the automated reservation management computer system 1102 illustrated in FIGS. 12-14 or in a separate database accessible to the automated reservation management computer system 1102. To cancel any entries in screen 1600, the user can select the cancel button 1626. If, upon selection of the update button 1624, the user has chosen to not use default rules via fields 1622, the GUI screen 1700 of FIG. 17 is preferably displayed.

Figure 17:
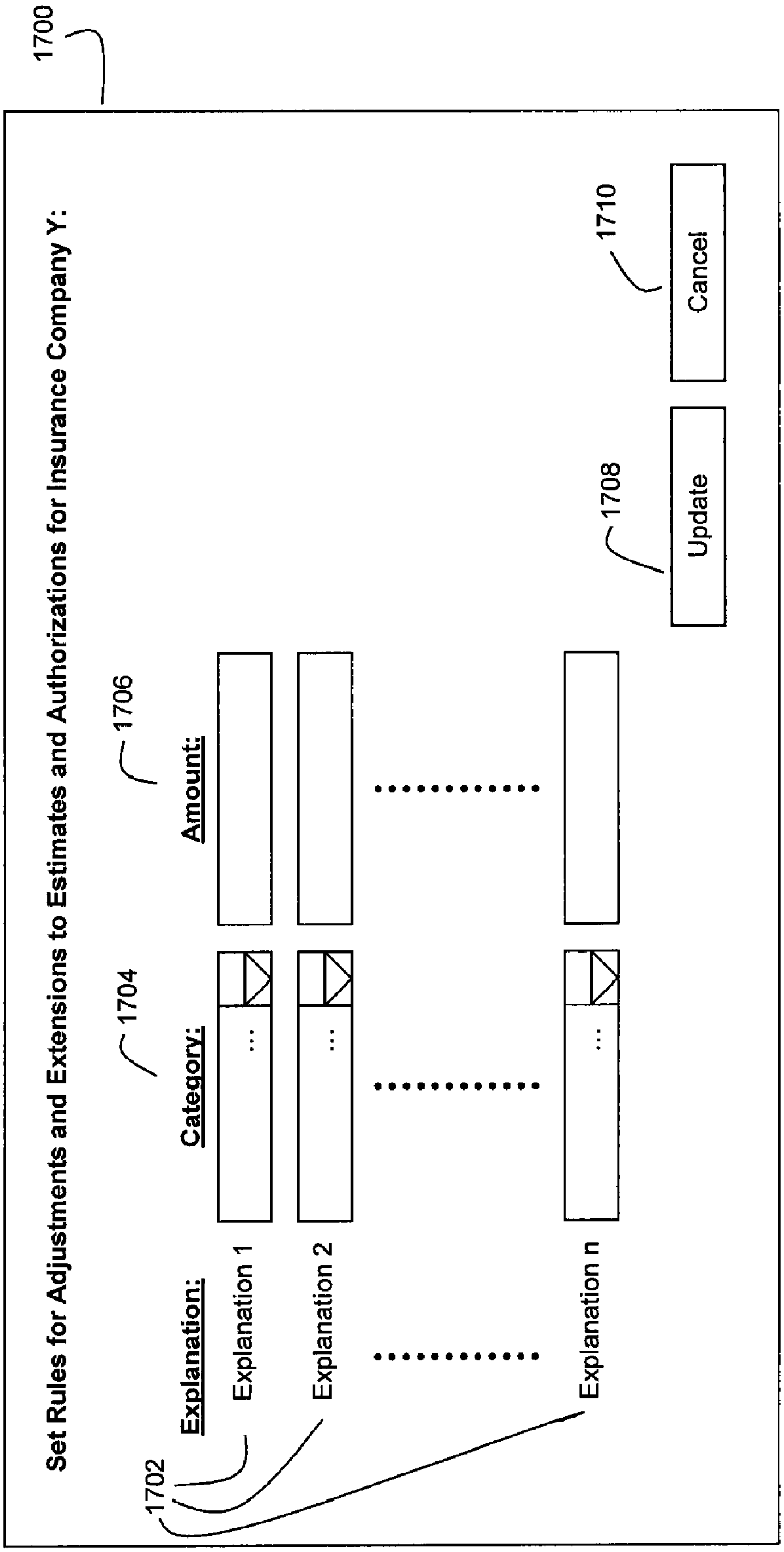
FIG. 17 depicts another exemplary GUI screen through which a user can define rules for computing term-related parameters for a reservation.

FIG. 17 depicts a GUI screen 1700 through which the user can define the change amounts corresponding to each explanation. Preferably, screen 1700 lists a plurality of predefined explanations 1702. As previously explained, these explanations preferably correspond to the CIECA status update messages and other purchaser-defined or repair facility-defined explanations. Through fields 1706, the user can define the amount of change to the TD computation applicable to each explanation. These amounts are preferably expressed in units of days or hours. Optionally, if the purchaser has chosen to categorize explanations as either "adjustments" or "extensions", preferably the user can apply one of these predefined categories to each explanation 1702 via fields 1704. Also, screen 1700 may optionally provide the user with the ability to add new explanations observed by the purchaser that are not among the plurality of predefined explanations in a manner similar to the "add a holiday" feature of screen 1600. Once the user has entered appropriate values in the fields of screen 1700, he/she can select the update button 1708 to save them for use by the rental calculator 1110. Otherwise, the user can select the cancel button 1710.

Figure 18:
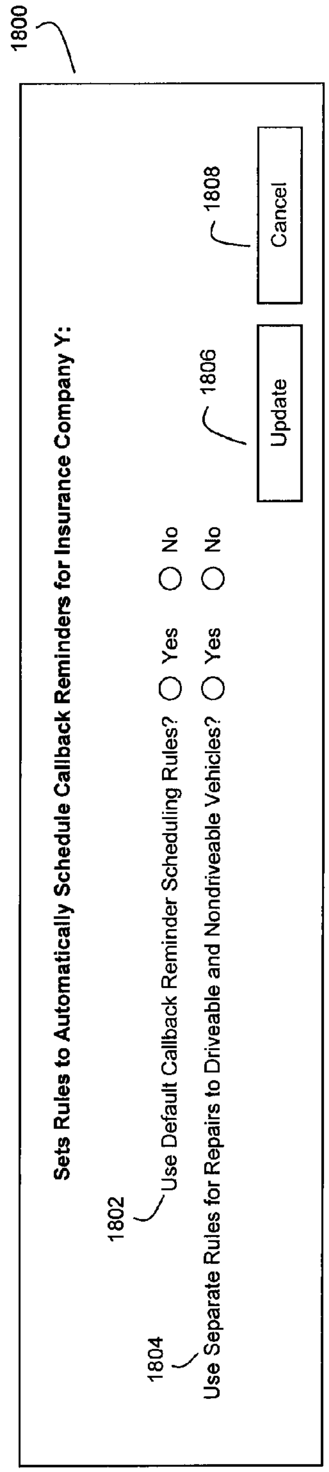
FIG. 18 depicts an exemplary GUI screen through which a user can define automated callback scheduling rules.

The GUI screen 1800 of FIG. 18 is preferably displayed if the user has selected the "yes" option in fields 1618 of screen 1600. Screen 1800 can be displayed after user selection of update button 1624 (if the user has chosen to use default rules for the rental calculator 1110) or after user selection of update button 1708 (if the user has chosen to use non-default rules for the rental calculator 1110). Through GUI screen 1800, the user can define at least a portion of the rules used by the automated callback scheduler 1112 for the purchaser. Via fields 1802, the user can specify whether a predefined default set of automated callback scheduling rules are to be used for the purchaser. Through fields 1804, the user can choose whether different callback scheduling rules are to be applied for driveable and nondriveable vehicles. To continue this process, the user can select the update button 1806. Otherwise, the user can select the cancel button 1808.

Figure 19:
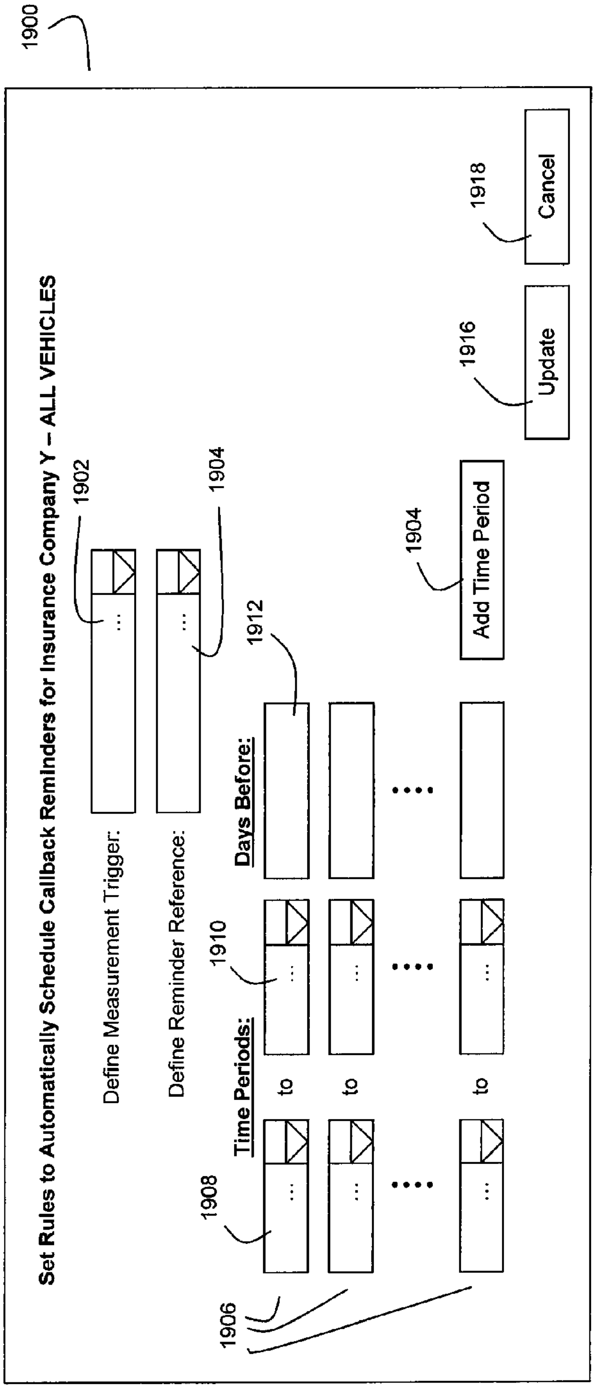
FIG. 19 depicts an exemplary GUI screen through which a user can define automated callback scheduling rules corresponding to all vehicles, both driveable and nondriveable.

If the user selected the option "no" in fields 1804, then upon selection of the update button 1806, the GUI screen 1900 of FIG. 19 is displayed. Through GUI screen 1900, the user can define the callback scheduling rules for all vehicles.

Via field 1902, the user can define the measurement trigger (see the left column in the tables of FIGS. 4(*a*)-(*c*)) for the automated scheduling rules. Preferably, the user can select one of a plurality of predefined measurement triggers via a dropdown menu associated with field 1902. Examples of such measurement triggers include "days encompassed by the LUD and the DUD", "number of authorized days", and "days encompassed by the LUD and the LAD".

Via field 1904, the user can define the reminder reference that serves as the frame of reference for computing the scheduled callback date (see the right column in the tables of FIGS. 4(*a*)-(*c*)). Preferably, the user can select one of a plurality of predefined reminder references via a dropdown menu associated with field 1904. An example of another reminder reference that can be used includes "days before LAD".

GUI screen 1900 also preferably provides the user with the ability to define the time periods used by the automated callback scheduler rules (see the rows in the tables of FIGS. 4(*a*)-(*c*)). Through fields 1908 and 1910, the user can define the start and end points for each time period. Further, through fields 1912, the user can enter the amount to be applied against the reference reminder for each time period when determining when the callback reminder should be scheduled. These amounts are preferably expressed in units of days or hours. Should the user need to add additional time period rules, he/she can do so by selecting the "add time period" button 1904.

Once the user has defined the callback scheduling rules via screen 1900, he/she preferably selects the update button 1916 to save them for use by the automated callback scheduler 1112. These rules can be stored in the available memory resources of any of the components of the automated reservation management computer system 1102 illustrated in FIGS. 12-14 or in a separate database accessible to the automated reservation management computer system 1102. Otherwise, the user can select the cancel button 1918.

Figure 20:
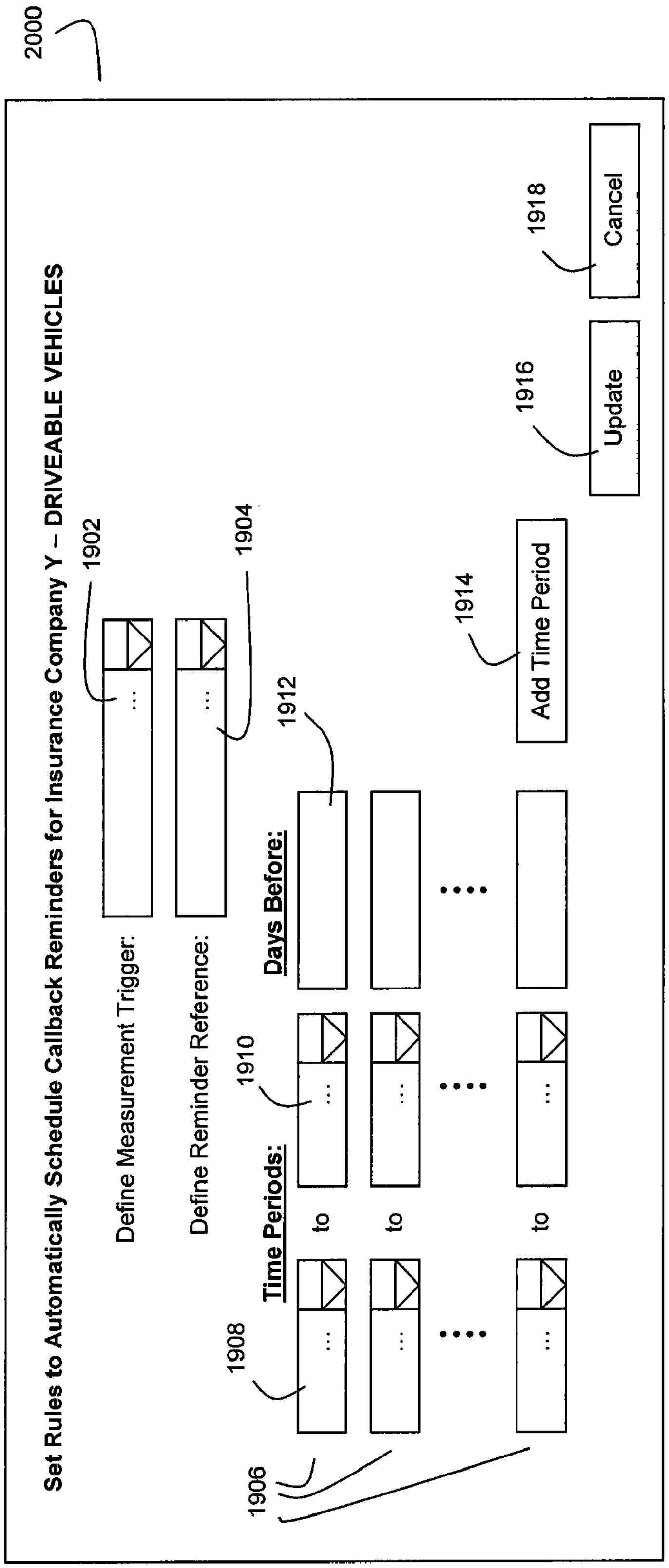
FIG. 20 depicts an exemplary GUI screen through which a user can define automated callback scheduling rules corresponding to driveable vehicles.
Figure 21:
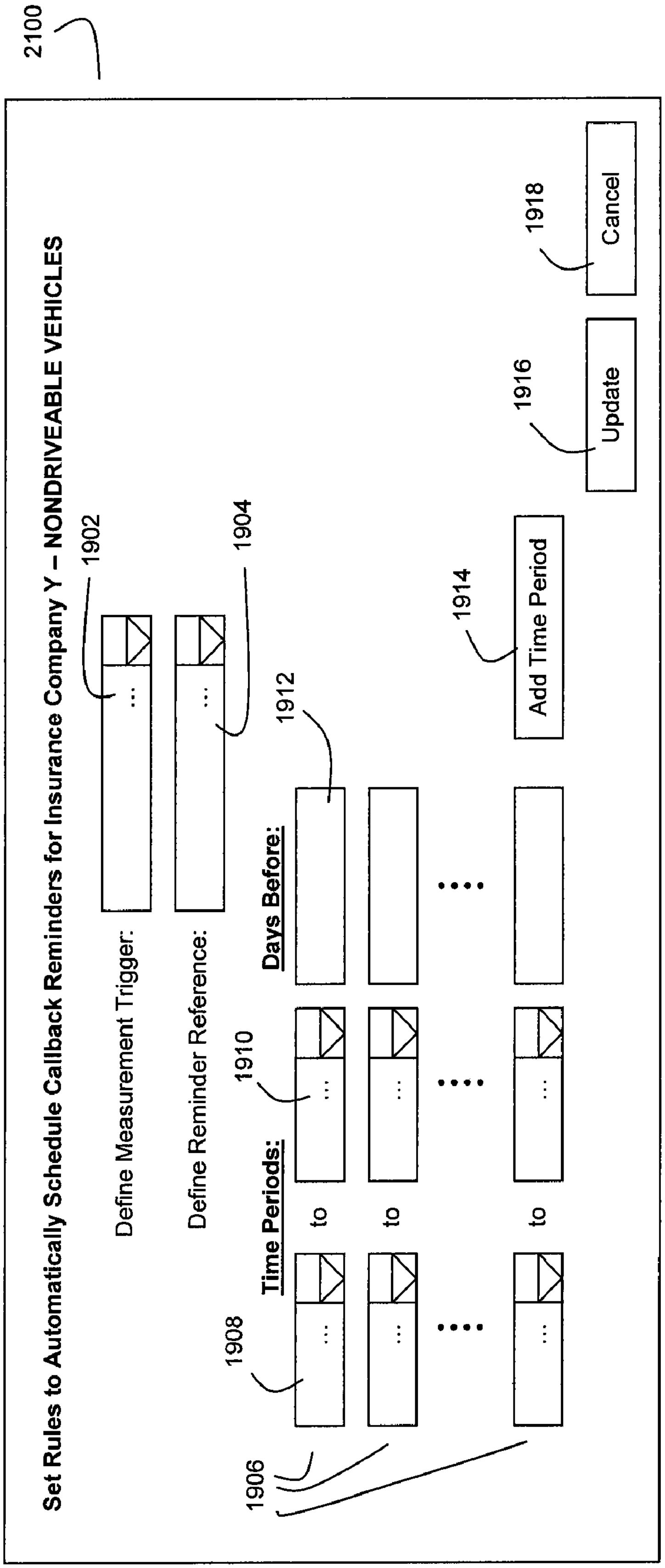
FIG. 21 depicts an exemplary GUI screen through which a user can define automated callback scheduling rules corresponding to nondriveable vehicles.

If the user selected the option "yes" in fields 1804 of GUI screen 1800, then upon selection of the update button 1806, the GUI screens 2000 and 2100 of FIGS. 20 and 21 are preferably successively displayed for user entry therein (in any order). GUI screens 2000 and 2100 preferably correspond to GUI screen 1900, albeit being applicable to scheduling rules for driveable and nondriveable vehicles respectively.

Figure 22:
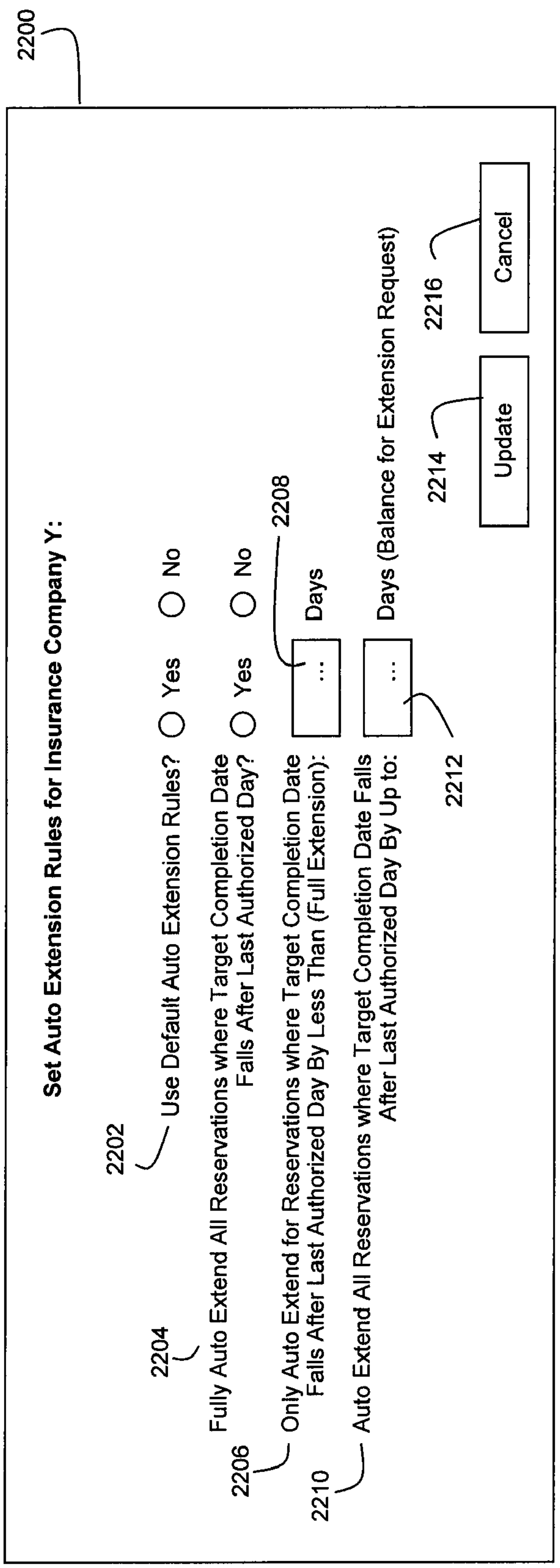
FIG. 22 depicts an exemplary GUI screen through which a user can define automated extension rules for rental vehicle reservations.

FIG. 22 depicts an exemplary GUI screen 2200 for defining the auto extension rules for a purchaser to be used by the rental calculator 1110 at step 214 of FIG. 2. As indicated, GUI screen 2200 is preferably displayed if the user has chosen to use auto extension rules for reservations via fields 1618 of FIG. 16. GUI screen 2200 preferably lists a plurality of auto extension rules options for selection by the user.

Via fields 2202, the user can select whether default auto extension rules are to be applied to the reservations of the purchaser.

Via fields 2204, the user can select the rule "fully extend all reservations where the TCD falls after the LAD" if desired. It should be noted that a rule such as this could also be used as the default auto extension rule.

Via fields 2206, the user can select the rule "only auto extend for reservations where the TCD falls after the LAD by less the X number of days", wherein the user can define the value for X via field 2208. With this rule, it is preferred that a full extension be given to reset the LAD to the TCD in such circumstances.

Via fields 2210, the user can select the rule "auto extend all reservations where the TCD falls after the LAD by up to a maximum of X days", wherein the user can define the value for X via field 2212. With this rule, any remaining difference between the TCD and LAD following the auto extension should be the subject of an authorization request for an extension to be sent to the purchaser.

These and other auto extension rules can preferably be selected by the user through GUI screen 2200. Once the user has selected the appropriate auto extension rule, he/she can save that auto extension rule for use by the rental calculator 1110 by selecting the update button 2214. Otherwise, the user can select the cancel button 2216.

One or more GUI screens can also be provided for authorized users to define how the audit report generator will generate audit reports for a purchaser, repair facility, or rental vehicle service provider. Such GUIs preferably are configured to accept user input that defines which data categories and data columns will be included on the different types of audit reports described herein.

Figure 33:
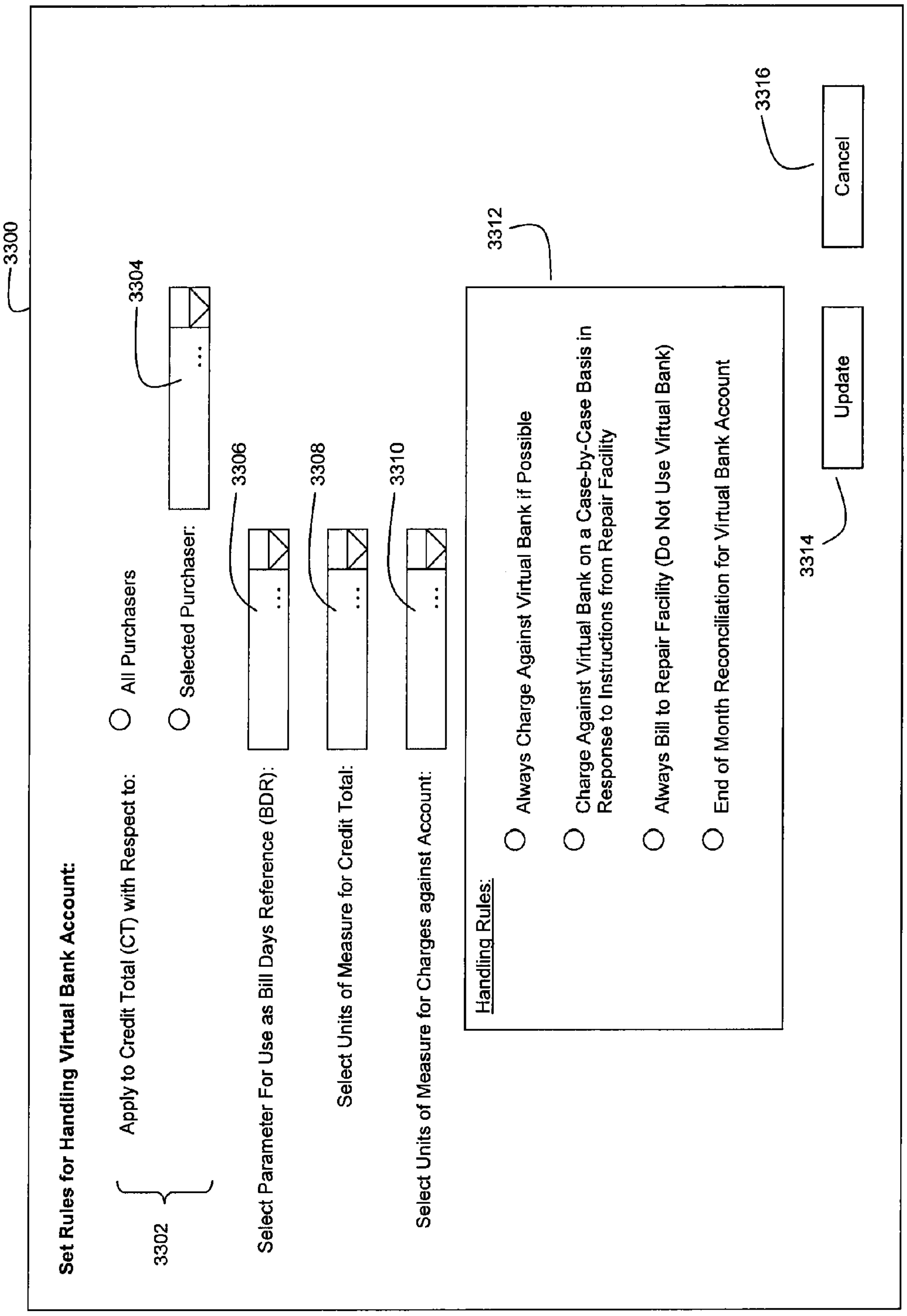
FIG. 33 depicts an exemplary GUI screen through which a user can define the rules for allocating replacement rental vehicle costs using the virtual bank.

FIG. 33 depicts an exemplary GUI screen 3300 for use to define the rules used by the rental calculator for updating and making charges against a virtual bank account. Preferably, the authorized repair facility personnel are given access to GUI screen 3300 through data path 1118 (or paths 1122 and/or 1124). However, it should also be noted that purchasers can optionally be given access to a GUI screen with similar functionality if a practitioner of the invention chooses to give purchasers the ability to decide how credits are applied to and how charges are made against the virtual bank 2800.

In the example of FIG. 33, it will be assumed that a repair facility user has accessed screen 3300, in which case the system will only allow the user to define rules for the virtual bank account 2802 corresponding to that user's repair facility. Thus, through section 3302, the user can, by selecting from possible purchasers, define the subaccount 2804 within the account 2802 to which the rules will apply. One option within section 3302 is for the user to select all purchasers, in which case the rules will be global as to all subaccounts 2804 within the account 2802. Another option is for the user to select a particular subaccount 2804 by selecting the particular purchaser associated with that subaccount via a selection from a list of purchasers displayed through drop down menu 3304.

The user is also preferably given the ability to define the parameter to be used as the BDR for the subaccount's credit total(s) as defined via section 3302. Preferably, drop down menu 3306 provides the user with a list of BDR options, such as the number of bill days for the closed reservation, the date on which the reservation was closed, and the ACD for the repair facility's performance of repairs on the disabled vehicle corresponding to the reservation.

Through drop down menu 3308, the user is preferably given the ability to define the units of measure for the account's credit total(s) as defined via section 3302. Examples of these options for the units of measure can be "days" and various forms of "currency" (e.g., "U.S. Dollars", "Canadian Dollars", "Euros", etc.).

Through drop down menu 3310, the user is preferably given the ability to define the units of measure for making comparisons between the BDR and RTR as well as making charges against the account's credit total(s) as defined via section 3302. Once again, examples of these options for units of measure can be "days" and various forms of "currency" (e.g., "U.S. Dollars", "Canadian Dollars", "Euros", etc.). Thus, if "days" is selected as the units of measure for the CT(s), and if "U.S. Dollars" is selected as the units of measure for charges against the CT(s), the algorithm for handling charges against the CT(s) (see FIGS. 29(*a*)-(*c*)) can perform a conversion of the CT value, BDR value, and RTR value using the reservation's applicable daily rate to compute the relevant charges and rental costs in terms of a dollar amount.

Through section 3312, the user can define the handling rules for charges against the account's credit total(s) as defined via section 3302. Preferably, through radio buttons within section 3312, the user can select from options such as (1) always charge against the virtual bank if possible (which corresponds to the process flow of FIG. 29(*a*)), (2) charge against the virtual bank on a case-by-case basis in response to instructions from the repair facility (which corresponds to the process flow of FIG. 29(*b*)), (3) always bill to the repair facility (which corresponds to not using the virtual bank at all), and (4) use a periodic reconciliation for the virtual bank account (e.g., end-of-month reconciliation) (which corresponds to the process flow of FIG. 29(*c*)).

After the user has selected the appropriate rules via screen 3300, he/she can select the update button 3314 to store the selections as cost distribution rule(s) 320 in the appropriate business rule(s) 302. If the user does not want to save the selections made via screen 3300, he/she can select the cancel button 3316.

While the present invention has been described above in relation to its preferred embodiment, such description is intended to be merely illustrative of the invention and various modifications may be made thereto that still fall within the invention's scope, as would be recognized by those of ordinary skill in the art upon review of the teachings herein.

For example, it should be noted that a practitioner of the invention can optionally choose to configure the rental calculator software 1110 to automatically adjust a reservation's LAD to match the TCD computed therefor at step 208 of FIG. 2 even if a reservation's previous LAD falls after the newly-computed TCD.

Figure 27:
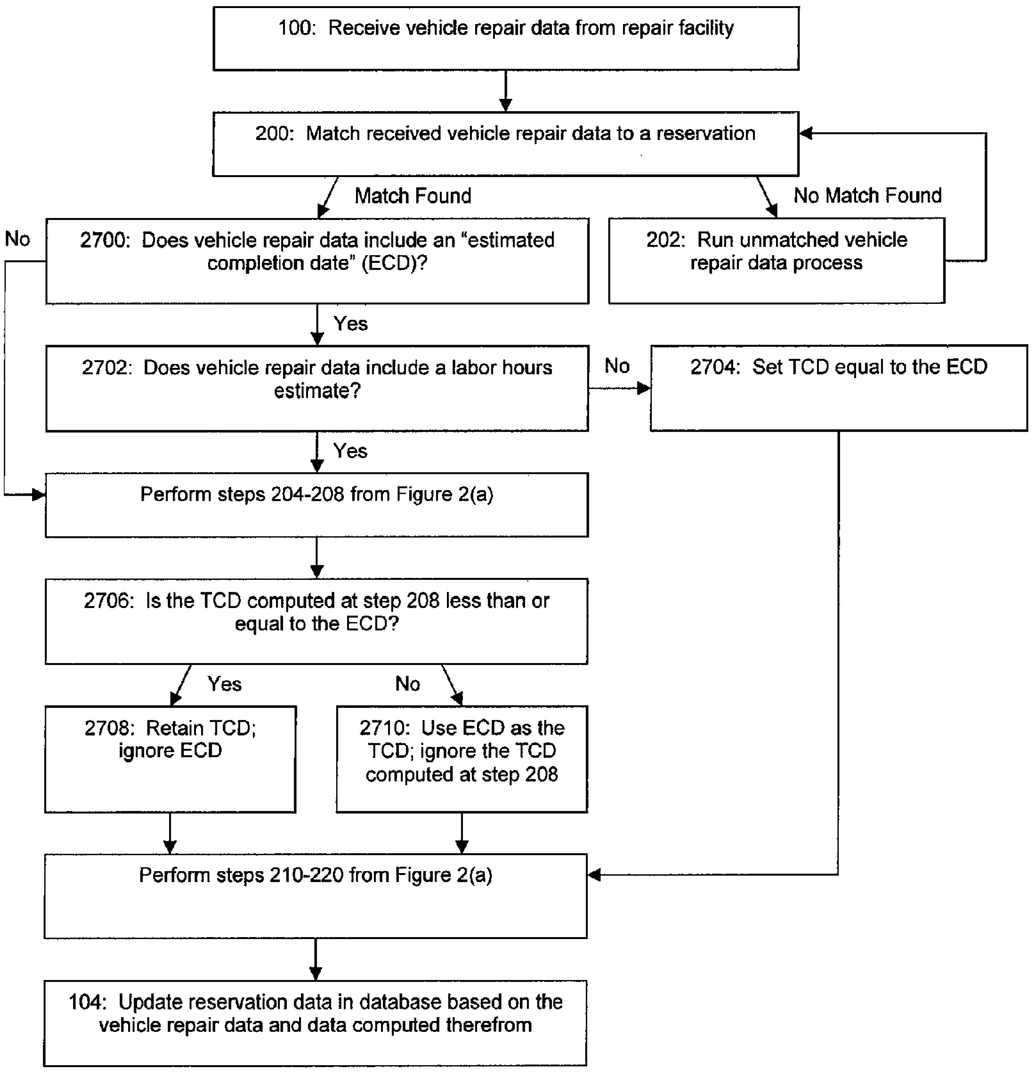
FIG. 27 depicts another embodiment for the process flow of FIG. 1, wherein the vehicle repair data may include both labor hours data and an estimated completion date.

Furthermore, for repair facilities that may provide the automated reservation management computer system 1102 with an "estimated completion date" (ECD) in addition to other vehicle repair data such as labor hours, etc., a process flow such as the one shown in FIG. 27 can be employed. The ECD represents an estimate by the repair facility as to how long the repair facility needs to complete repairs to the subject disabled vehicle. Repair facilities may provide this ECD information independently of and in addition to labor hours estimates. In such a case, the process flow of FIG. 27 operates to decide whether the ECD or the TCD (computed from the labor hours data via formulas (1) and (2)) should be used to control the extension decision making process. Each purchaser can define the situations in which the ECD will control and the situations in which the labor hours-derived TCD will control. In the example of FIG. 27, the controlling value will be the smaller of the ECD and TCD values. However, it should be noted that a purchaser or other party may choose to use the larger of the two values to control the extension process. Further still, rather than comparing the ECD and the TCD to determine which is smaller or larger, it should be noted that the comparison can be made to determine which was most recently updated (e.g., where an initial repair estimate provides labor hours from which the TCD is computed, but a few days later the repair facility provides an updated repair estimate for that disabled vehicle with the same labor hours but now including an ECD, or where an initial repair estimate provides an ECD but no labor hours and a subsequent repair estimate for the same disabled vehicle includes labor hours). In such an embodiment, the flow of FIG. 27 can be modified to use the most recently updated value as between TCD and ECD as the controlling value. The flow of FIG. 27 modifies the flow of FIG. 2(*a*) as follows. Steps 2700 and 2702 are introduced to determine whether either or both of an ECD value and a labor hours value are included in the vehicle repair data for the reservation (in this example, it will be assumed that at least one of these values is present in the vehicle repair data applicable to the reservation). If no labor hours are present, then at step 2704, the TCD is set equal to the ECD value, and the process jumps to step 210 of FIG. 2(*a*). If both an ECD and an estimate of labor hours are present in the vehicle repair data, then the process computes the TCD value from the labor hours as previously described in connection with steps 204-208 of FIG. 2(*a*). Thereafter, at step 2706, the computed TCD value is compared with the ECD value to determine which is smaller. If the TCD value is less than or equal to the ECD value, then the process flow of steps 210-220 of FIG. 2(*a*) are driven by the TCD value (step 2708). If the ECD value is less than the TCD value, then the process flow of steps 210-220 of FIG. 2(*a*) are driven by the ECD value (step 2710). In this manner, the rental calculator 1110 can accommodate repair facilities which may provide ECD data in addition to or instead of labor hours data. It should also be noted that the process flow of FIG. 27 can also be incorporated into the process flow of FIG. 2(*b*).

Further still, when the vehicle repair data includes both an ECD and labor hours, a practitioner of the invention can also choose to follow the flow of FIG. 2(*a*) or 2(*b*), in which case the ECD value will be effectively ignored.

Still further, the formula used to compute f(r) can alternately be expressed as $$f(r) = \frac{LC}{LCS(i)} + ND(i) + A(i, r) \tag{2a}$$

wherein LC represents the labor costs estimated by the repair facility to repair the disabled vehicle (as defined in the received vehicle repair data), and wherein LCS(i) represents a labor costs scalar defined for the purchaser i. The value of the labor costs scalar is preferably selected to scale the labor costs to a number of days (e.g., number of business days) that will be needed to perform the repairs corresponding to the estimated labor costs on the disabled vehicle. As noted for LHS above, the value of LCS can be defined on a purchaser-by-purchaser basis, on a repair facility-by-repair facility basis or some combination of a purchaser and repair facility basis.

In view of such exemplary modifications, the full scope of the present invention is to be defined solely by the appended claims and their legal equivalents.

What is claimed is:

1. A method comprising:

maintaining an account in a memory, the account being associated with a repair facility and storing a credit total for the repair facility;

calculating aggregate data that is indicative of a repair performance quality by the repair facility with respect to a plurality of disabled vehicles that are associated with a plurality of replacement rental vehicle reservations;

calculating an adjusted credit total based on the calculated aggregate data;

comparing the adjusted credit total with a threshold; and in response to the comparison of the calculated adjusted credit total with the threshold indicating that the adjusted credit total falls below the threshold, identifying a remedial action to be taken against the repair facility; and wherein the method steps are performed by a processor.

2. The method of claim 1 wherein the adjusted credit total calculating step comprises:

the processor comparing the calculated aggregate data with a benchmark;

in response to the comparison of the calculated aggregate data with the benchmark indicating that the calculated aggregate data satisfied the benchmark, the processor increasing the credit total in the account; and in response to the comparison of the calculated aggregate data with the benchmark indicating that the calculated aggregate data did not satisfy the benchmark, the processor decreasing the credit total in the account.

3. The method of claim 2 wherein the identifying step comprises allocating a charge to the repair facility for a portion of a cost for the replacement rental vehicle reservations.

4. The method of claim 3 further comprising invoicing the repair facility in accordance with the allocated charge.

5. The method of claim 2 wherein the aggregate data calculating step comprises:

the processor computing an average length of an initial authorization period for the replacement rental vehicle reservations.

6. The method of claim 2 wherein the aggregate data calculating step comprises:

the processor computing an average length of a total authorization period for the replacement rental vehicle reservations.

7. The method of claim 2 wherein the aggregate data calculating step comprises:

the processor computing an average rental cost for the replacement rental vehicle reservations.

8. The method of claim 2 wherein the aggregate data calculating step comprises:

the processor computing an average extension length for the replacement rental vehicle reservations.

9. The method of claim 2 wherein the aggregate data calculating step comprises:

the processor computing an average extension length per extension for the replacement rental vehicle reservations.

10. The method of claim 2 wherein the aggregate data calculating step comprises:

the processor computing a percentage of the replacement rental vehicle reservations that have an authorization period beyond their initial authorization periods.

11. The method of claim 2 wherein the aggregate data calculating step comprises:

the processor computing a percentage of the replacement rental vehicle reservations that ended a predetermined number of days prior to an expiration of their authorization periods.

12. The method of claim 2 further comprising:

the processor determining whether a predetermined time period has elapsed; and in response to a determination that the predetermined time period has elapsed, the processor performing the aggregate data calculating step, the adjusted credit total calculating step, and the step of comparing the adjusted credit total with the threshold.

13. The method of claim 12 wherein the predetermined time period comprises a member of the group consisting of a yearly basis, a quarterly basis, a monthly basis, a weekly basis, and a daily basis.

14. The method of claim 2 wherein the processor and memory are resident within a rental vehicle reservation management computer system.

15. The method of claim 14 further comprising:

the memory storing data describing the replacement rental vehicle reservations;

the processor receiving vehicle repair data relating to the disabled vehicles as an electronic data communication from a computer system of the repair facility; and wherein the aggregate data calculating step comprises the processor calculating the aggregate data based on the stored data and received vehicle repair data.

16. The method of claim 2 wherein the aggregate data calculating step comprises the processor limiting the disabled vehicles subject to the calculation to only those disabled vehicles that are associated with replacement rental vehicle reservations being paid for by a common party.

17. The method of claim 16 wherein the common party comprises an insurance company that is a purchaser for the replacement rental vehicle reservations.

18. An apparatus comprising:

a memory, the memory configured to store an account, the account being associated with a repair facility, and the account comprising a credit total for the repair facility; and a processor configured to (1) calculate aggregate data that is indicative of a repair performance quality by the repair facility with respect to a plurality of disabled vehicles that are associated with a plurality of replacement rental vehicle reservations, (2) calculate an adjusted credit total based on the calculated aggregate data, (3) compare the adjusted credit total with a threshold, and (4) in response to the comparison of the calculated adjusted credit total with the threshold indicating that the adjusted credit total falls below the threshold, identify a remedial action to be taken against the repair facility.

19. The apparatus of claim 18 wherein the processor is further configured to calculate the adjusted credit total by (1) comparing the calculated aggregate data with a benchmark, (2) in response to the comparison of the calculated aggregate data with the benchmark indicating that the calculated aggregate data satisfied the benchmark, increasing the credit total in the account, and (3) in response to the comparison of the calculated aggregate data with the benchmark indicating that the calculated aggregate data did not satisfy the benchmark, decreasing the credit total in the account.

20. The apparatus of claim 19 wherein the processor is further configured to identify the remedial action by allocating a charge to the repair facility for a portion of a cost for the replacement rental vehicle reservations.

21. The apparatus of claim 20 wherein the processor is further configured to generate an invoice to the repair facility in accordance with the allocated charge.

22. The apparatus of claim 19 wherein the processor is further configured to calculate the aggregate data by computing an average length of an initial authorization period for the replacement rental vehicle reservations.

23. The apparatus of claim 19 wherein the processor is further configured to calculate the aggregate data by computing an average length of a total authorization period for the replacement rental vehicle reservations.

24. The apparatus of claim 19 wherein the processor is further configured to calculate the aggregate data by computing an average rental cost for the replacement rental vehicle reservations.

25. The apparatus of claim 19 wherein the processor is further configured to calculate the aggregate data by computing an average extension length for the replacement rental vehicle reservations.

26. The apparatus of claim 19 wherein the processor is further configured to calculate the aggregate data by computing an average extension length per extension for the replacement rental vehicle reservations.

27. The apparatus of claim 19 wherein the processor is further configured to calculate the aggregate data by computing a percentage of the replacement rental vehicle reservations that have an authorization period beyond their initial authorization periods.

28. The apparatus of claim 19 wherein the processor is further configured to calculate the aggregate data by computing a percentage of the replacement rental vehicle reservations that ended a predetermined number of days prior to an expiration of their authorization periods.

29. The apparatus of claim 19 wherein the processor is further configured to (1) determine whether a predetermined time period has elapsed, and (2) in response to a determination that the predetermined time period has elapsed, perform the aggregate data calculation, the adjusted credit total calculation, and the adjusted credit total-to-threshold comparison.

30. The apparatus of claim 29 wherein the predetermined time period comprises a member of the group consisting of a yearly basis, a quarterly basis, a monthly basis, a weekly basis, and a daily basis.

31. The apparatus of claim 19 further comprising a rental vehicle reservation management computer system, the processor and memory being resident within the rental vehicle reservation management computer system.

32. The apparatus of claim 31 wherein the memory is further configured to store data describing the replacement rental vehicle reservations, and wherein the processor is further configured to (1) receive vehicle repair data relating to the disabled vehicles as an electronic data communication from a computer system of the repair facility, and (2) calculate the aggregate data based on the stored data and received vehicle repair data.

33. The apparatus of claim 19 wherein the processor is further configured to limit the disabled vehicles subject to the aggregate data calculation to only those disabled vehicles that are associated with replacement rental vehicle reservations being paid for by a common party.

34. The apparatus of claim 33 wherein the common party comprises an insurance company that is a purchaser for the replacement rental vehicle reservations.

35. A method comprising:

maintaining an account in a memory, the account being associated with a repair facility and storing a credit total for the repair facility;

calculating aggregate data that is indicative of a repair performance quality by the repair facility with respect to a plurality of disabled vehicles that are associated with a plurality of replacement rental vehicle reservations being paid for by a common party;

calculating an adjusted credit total based on the calculated aggregate data;

comparing the adjusted credit total with a threshold; and in response to the comparison of the calculated adjusted credit total with the threshold indicating that the adjusted credit total falls below the threshold, allocating a charge to the repair facility; and wherein the method steps are performed by a processor.

36. The method of claim 35 wherein the charge allocating step comprises allocating a charge to the repair facility for a portion of a cost for the replacement rental vehicle reservations.

37. The method of claim 36 wherein the processor and memory are resident within a rental vehicle reservation management computer system.

38. The method of claim 37 further comprising:

the memory storing data describing the replacement rental vehicle reservations;

the processor receiving vehicle repair data relating to the disabled vehicles from as an electronic data communication from a computer system of the repair facility; and wherein the aggregate data calculating step comprises the processor calculating the aggregate data based on the stored data and received vehicle repair data.

39. The method of claim 38 wherein the adjusted credit total calculating step comprises:

the processor comparing the calculated aggregate data with a benchmark;

in response to the comparison of the calculated aggregate data with the benchmark indicating that the calculated aggregate data satisfied the benchmark, the processor increasing the credit total in the account; and in response to the comparison of the calculated aggregate data with the benchmark indicating that the calculated aggregate data did not satisfy the benchmark, the processor decreasing the credit total in the account.

40. The method of claim 36 wherein the aggregate data calculating step comprises the processor performing at least one member of the group consisting of (1) computing an average length of an initial authorization period for the replacement rental vehicle reservations, (2) computing an average length of a total authorization period for the replacement rental vehicle reservations, (3) computing an average rental cost for the replacement rental vehicle reservations, (4) computing an average extension length for the replacement rental vehicle reservations, (5) computing an average extension length per extension for the replacement rental vehicle reservations, (6) computing a percentage of the replacement rental vehicle reservations that have an authorization period beyond their initial authorization periods, and (7) computing a percentage of the replacement rental vehicle reservations that ended a predetermined number of days prior to an expiration of their authorization periods.

41. An apparatus comprising:

a processor; and a memory, the memory configured to store an account, the account being associated with a repair facility, and the account comprising a credit total for the repair facility; and wherein the processor is configured to (1) calculate aggregate data that is indicative of a repair performance quality by the repair facility with respect to a plurality of disabled vehicles that are associated with a plurality of replacement rental vehicle reservations being paid for by a common party, (2) calculate an adjusted credit total based on the calculated aggregate data, (3) compare the adjusted credit total with a threshold, and (4) in response to the comparison of the calculated adjusted credit total with the threshold indicating that the adjusted credit total falls below the threshold, allocate a charge to the repair facility.

42. The apparatus of claim 41 wherein the processor is further configured to allocate the charge by allocating a charge to the repair facility for a portion of a cost for the replacement rental vehicle reservations.

43. The apparatus of claim 42 further comprising a rental vehicle reservation management computer system, the processor and memory being resident within the rental vehicle reservation management computer system.

44. The apparatus of claim 43 wherein the memory is further configured to store data describing the replacement rental vehicle reservations, and wherein the processor is further configured to (1) receive vehicle repair data relating to the disabled vehicles from as an electronic data communication from a computer system of the repair facility, and (2) calculate the aggregate data based on the stored data and received vehicle repair data.

45. The apparatus of claim 44 wherein the processor is further configured to calculate the adjusted credit total by (1) comparing the calculated aggregate data with a benchmark, (2) in response to the comparison of the calculated aggregate data with the benchmark indicating that the calculated aggregate data satisfied the benchmark, increasing the credit total in the account, and (3) in response to the comparison of the calculated aggregate data with the benchmark indicating that the calculated aggregate data did not satisfy the benchmark, decreasing the credit total in the account.

46. The apparatus of claim 42 wherein the processor is further configured to calculate the aggregate data by performing at least one member of the group consisting of (1) computing an average length of an initial authorization period for the replacement rental vehicle reservations, (2) computing an average length of a total authorization period for the replacement rental vehicle reservations, (3) computing an average rental cost for the replacement rental vehicle reservations, (4) computing an average extension length for the replacement rental vehicle reservations, (5) computing an average extension length per extension for the replacement rental vehicle reservations, (6) computing a percentage of the replacement rental vehicle reservations that have an authorization period beyond their initial authorization periods, and (7) computing a percentage of the replacement rental vehicle reservations that ended a predetermined number of days prior to an expiration of their authorization periods.

* * * * *